(12) United States Patent
Wu et al.

(10) Patent No.: US 12,532,235 B2
(45) Date of Patent: Jan. 20, 2026

(54) CONDITIONAL PROCEDURE OPERATIONS

(71) Applicant: GOOGLE LLC, Mountain View, CA (US)

(72) Inventors: Chih-Hsiang Wu, Taoyuan (TW); Jing Hsieh, Taipei (TW)

(73) Assignee: GOOGLE LLC, Mountain View, CA (US)

( * ) Notice: Subject to any disclaimer, the term of this patent is extended or adjusted under 35 U.S.C. 154(b) by 450 days.

(21) Appl. No.: 17/917,456

(22) PCT Filed: Mar. 1, 2021

(86) PCT No.: PCT/US2021/020266
§ 371 (c)(1),
(2) Date: Oct. 6, 2022

(87) PCT Pub. No.: WO2021/206826
PCT Pub. Date: Oct. 14, 2021

(65) Prior Publication Data
US 2023/0164650 A1    May 25, 2023

Related U.S. Application Data

(60) Provisional application No. 63/028,294, filed on May 21, 2020, provisional application No. 63/008,610, filed on Apr. 10, 2020.

(51) Int. Cl.
*H04W 36/00* (2009.01)
*H04W 36/36* (2009.01)

(52) U.S. Cl.
CPC . *H04W 36/00837* (2018.08); *H04W 36/0061* (2013.01); *H04W 36/362* (2023.05); *H04W 36/00698* (2023.05)

(58) Field of Classification Search
CPC ....... H04W 36/00837; H04W 36/0061; H04W 36/362; H04W 36/00698; H04W 88/085; H04W 92/12; H04W 76/11
See application file for complete search history.

(56) References Cited

U.S. PATENT DOCUMENTS

2018/0279193 A1\* 9/2018 Park ...................... H04W 76/27
2020/0187069 A1\* 6/2020 Hong ................ H04W 36/0061
(Continued)

FOREIGN PATENT DOCUMENTS

| CN | 110536350 A | 12/2019 |
| WO | WO-2019/096023 A1 | 5/2019 |

OTHER PUBLICATIONS

"3rd Generation Partnership Project; Technical Specification Group Radio Access Network; NR; Radio Resource Control (RRC) Protocol Specification (Release 16)," 3GPP Standard (2020).
(Continued)

*Primary Examiner* — Dady Chery
(74) *Attorney, Agent, or Firm* — MARSHALL, GERSTEIN & BORUN LLP

(57) ABSTRACT

To configure a connection with a UE, a central unit (CU) of a distributed base station provides, by processing hardware to the UE, a conditional configuration for a cell of a distributed unit (DU) of the base station (1002). The CU receiving, by the processing hardware, an identifier of the cell of the DU (1004). Additionally, the CU determines, by the processing hardware, that the UE connects to the cell based on the identifier of the cell (1006), and communicates with the UE in accordance with the conditional configuration for the cell (1008).

15 Claims, 31 Drawing Sheets

(56) References Cited

U.S. PATENT DOCUMENTS

2020/0383022 A1\* 12/2020 Shrestha ........... H04W 36/0064
2021/0051545 A1\* 2/2021 Luo ...................... H04W 76/11
2022/0141749 A1 5/2022 Luo et al.

OTHER PUBLICATIONS

CATT, "Discussion on Intra-CU CHO," 3GPP Draft (2019).
Interdigital Inc., "Conditional PSCell Addition/Change," 3GPP Draft (2019).
International Search Report and Written Opinion for Application No. PCT/US2021/020266, dated Jun. 23, 2021.
Qualcomm Incorporated, "Conditional NR PSCell Addition/Change Procedures," 3GPP Draft (2019).
Qualcomm Incorporated, "Intra-CU CHO," 3GPP Draft (2019).
First Examination Report for India Application No. 202247060000, dated Jan. 2, 2023.
Office Action for Canadian Application No. 3,174,864, dated Mar. 10, 2025.

\* cited by examiner

CONDITIONAL PROCEDURE OPERATIONS

CROSS-REFERENCE TO RELATED APPLICATIONS

This application claims priority to and the benefit of the filing date of (1) U.S. Provisional Patent Application No. 63/008,610 entitled "Conditional Procedure Operations," filed on Apr. 10, 2020, and (2) U.S. Provisional Patent Application No. 63/028,294 entitled "Conditional Procedure Operations," filed on May 21, 2020, the entire disclosures of each of which are hereby expressly incorporated by reference.

FIELD OF THE DISCLOSURE

This disclosure relates generally to wireless communications and, more particularly, to conditional procedures such as conditional handover, conditional primary secondary cell (PSCell) addition or change procedures, and conditional secondary node addition or change procedures (i.e., PSCell addition or change procedures with SN change).

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In telecommunication systems, the Packet Data Convergence Protocol (PDCP) sublayer of the radio protocol stack provides services such as transfer of user-plane data, ciphering, integrity protection, etc. For example, the PDCP layer defined for the Evolved Universal Terrestrial Radio Access (EUTRA) radio interface (see 3GPP specification TS 36.323) and New Radio (NR) (see 3GPP specification TS 38.323) provides sequencing of protocol data units (PDUs) in the uplink direction (from a user device, also known as a user equipment (UE), to a base station) as well as in the downlink direction (from the base station to the UE). Further, the PDCP sublayer provides signaling radio bearers (SRBs) and data radio bearers (DRBs) to the Radio Resource Control (RRC) sublayer. Generally speaking, the UE and a base station can use SRBs to exchange RRC messages as well as non-access stratum (NAS) messages, and can use DRBs to transport data on a user plane.

UEs can use several types of SRBs and DRBs. When operating in dual connectivity (DC), the cells associated with the base station operating the master node (MN) define a master cell group (MCG), and the cells associated with the base station operating as the secondary node (SN) define the secondary cell group (SCG). So-called SRB1 resources carry RRC messages, which in some cases include NAS messages over the dedicated control channel (DCCH), and SRB2 resources support RRC messages that include logged measurement information or NAS messages, also over the DCCH but with lower priority than SRB1 resources. More generally, SRB1 and SRB2 resources allow the UE and the MN to exchange RRC messages related to the MN and embed RRC messages related to the SN, and also can be referred to as MCG SRBs. SRB3 resources allow the UE and the SN to exchange RRC messages related to the SN, and can be referred to as SCG SRBs. Split SRBs allow the UE to exchange RRC messages directly with the MN via lower layer resources of the MN and the SN. Further, DRBs using the lower-layer resources of only the MN can be referred as MCG DRBs, DRBs using the lower-layer resources of only the SN can be referred as SCG DRBs, and DRBs using the lower-layer resources of both the MCG and the SCG can be referred to as split DRBs.

The UE in some scenarios can concurrently utilize resources of multiple RAN nodes (e.g., base stations or components of a distributed base station), interconnected by a backhaul. When these network nodes support different radio access technologies (RATs), this type of connectivity is referred to as Multi-Radio Dual Connectivity (MR-DC). When a UE operates in MR-DC, one base station operates as a master node (MN) that covers a primary cell (PCell), and the other base station operates as a secondary node (SN) that covers a primary secondary cell (PSCell). The UE communicates with the MN (via the PCell) and the SN (via the PSCell). In other scenarios, the UE utilizes resources of one base station at a time. One base station and/or the UE determines that the UE should establish a radio connection with another base station. For example, one base station can determine to hand the UE over to the second base station, and initiate a handover procedure.

3GPP technical specifications (TS) 36.300 and 38.300 describe procedures for handover (also called reconfiguration with sync) scenarios. These procedures involve messaging (e.g., RRC signaling and preparation) between RAN nodes that generally causes latency, which in turn increases the probability of failure for handover procedures. Some handover procedures do not involve conditions associated with the UE, and can be referred to as "immediate" handover procedures. Other handover procedures involve conditions associated with the UE, and 3GPP TS 36.331 v16.0.0 and 38.331 v16.0.0 describe conditional handover scenarios.

3GPP specification TS 37.340 v16.1.0 describes procedures for a UE to add or change an SN in DC scenarios. These procedures involve messaging (e.g., RRC signaling and preparation) between radio access network (RAN) nodes. This messaging generally causes latency, which in turn increases the probability that the SN addition or SN change procedure will fail. These procedures, which do not involve conditions that are checked at the UE, can be referred to as "immediate" SN addition and SN change procedures.

UEs can also perform handover procedures to switch from one cell to another, whether in single connectivity (SC) or DC operation. The UE may handover from a cell of a first base station to a cell of a second base station, or from a cell of a first distributed unit (DU) of a base station to a cell of a second DU of the same base station, depending on the scenario. 3GPP specifications 38.401 v16.0.0, 36.300 v16.0.0 and 38.300 v16.0.0 describe a handover procedure that includes several steps (RRC signaling and preparation) between RAN nodes, which causes latency in the handover procedure and therefore increases the risk of handover failure. This procedure, which does not involve conditions that are checked at the UE, can be referred to as an "immediate" handover procedure.

More recently, for both SN or PSCell addition/change, "conditional" procedures have been considered (i.e., conditional SN or PSCell addition/change). Unlike the "immediate" procedures discussed above, these procedures do not add or change the SN or PSCell, or perform the handover, until the UE determines that a condition is satisfied. As used herein, the term "condition" may refer to a single, detectable state or event (e.g., a particular signal quality metric exceeding a threshold), or to a logical combination of such states or events (e.g., "Condition A and Condition B," or "(Condition A or Condition B) and Condition C", etc.).

To configure a conditional procedure, the RAN provides the condition to the UE, along with a configuration (e.g., one or more random-access preambles, etc.) that will enable the UE to communicate with the appropriate base station, or via the appropriate cell, when the condition is satisfied. For a conditional addition of a base station as an SN or a candidate cell as a PSCell, for example, the RAN provides the UE with a condition to be satisfied before the UE can add that base station as the SN or that candidate cell as the PSCell, and a configuration that enables the UE to communicate with that base station or PSCell after the condition has been satisfied.

In an immediate handover procedure, the RAN transmits a handover command including multiple configuration parameters to the UE and the UE attempts to connect to a target PCell configured by the handover command. After the UE successfully connects to the RAN via the target PCell, the UE communicates with the RAN on the single target PCell using the multiple configuration parameters and security key(s) associated to the target PCell and derived from one or more security configuration parameters in the handover command. The RAN also derives security key(s) which are the same as the security key(s) derived by the UE. After the UE successfully connects to the target PCell, the RAN communicates data with the UE using the same security key(s) and the multiple configuration parameters.

In a conditional handover procedure, the RAN can transmit a conditional handover command including multiple configuration parameters for a candidate PCell to the UE. If the UE determines that a condition is satisfied, the UE attempts to connect to the candidate PCell. After the UE successfully connects to the RAN via the candidate PCell, the UE communicates with the RAN on the candidate PCell using the multiple configuration parameters and security key(s) associated to the candidate PCell and derived from one or more security configuration parameters in the conditional handover command. The RAN also derives security key(s) which are the same as the security key(s) derived by the UE. After the UE successfully connects to the candidate PCell, the RAN communicates data with the UE using the same security key(s) and the multiple configuration parameters.

In an immediate PSCell addition or change procedure, the RAN (i.e., MN or SN) transmits an RRC reconfiguration message including multiple configuration parameters to the UE and the UE attempts to connect to a (target) PSCell configured by the RRC reconfiguration message. After the UE successfully connects to the SN via the PSCell, the UE communicates with the SN on the PSCell using the multiple configuration parameters and security key(s) associated to the PSCell and derived from one or more security configuration parameters in the RRC reconfiguration message. The SN also derives security key(s) which are the same as the security key(s) derived by the UE. After the UE successfully connects to the PSCell, the RAN (i.e., SN) communicates data with the UE using the same security key(s) and the multiple configuration parameters.

In a conditional PSCell addition or change procedure, the RAN (i.e., MN or SN) transmits an RRC reconfiguration message including multiple configuration parameters to the UE and the UE attempts to connect to a candidate PSCell configured by the RRC reconfiguration message. After the UE successfully connects to the SN via the candidate PSCell, the UE communicates with the SN on the candidate PSCell using the multiple configuration parameters and security key(s) associated to the candidate PSCell and derived from one or more security configuration parameters in the RRC reconfiguration message. The SN also derives security key(s) which are the same as the security key(s) derived by the UE. After the UE successfully connects to the candidate PSCell, the RAN (i.e., SN) communicates data with the UE using the same security key(s) and the multiple configuration parameters.

In each of the conditional procedures, the RAN can prepare multiple candidate cells operated by a candidate base station for the UE. For each prepared candidate cell, the RAN transmits an RRC message including a set of configuration parameters to the UE, and the RAN communicates with the UE in accordance with the configuration parameters.

However, scenarios involving a disaggregated base station architecture (e.g., a base station including a distributed unit (DU) and a central unit (CU)) can introduce new challenges to conditional procedure schemes. For example, a DU of a candidate base station can operate multiple candidate cells. To configure a conditional procedure, a CU prepares configuration parameters, which may be different for each of the multiple candidate cells. When the UE connects to the DU via one of the multiple candidate cells, the CU does not know which of the multiple candidate cells the UE connected to. As a result, the CU cannot determine which configuration parameters to use to communicate with the CU via the DU.

SUMMARY

An example embodiment of these techniques is a method in a central unit (CU) of a distributed base station for configuring a connection with a UE. The method can be executed by processing hardware and includes providing, to the UE, a conditional configuration for a cell of a distributed unit (DU) of the base station, and receiving an identifier of the cell of the DU. The method further includes determining that the UE connects to the cell based on the identifier of the cell, and communicating with the UE in accordance with the conditional configuration for the cell.

Yet another example embodiment of these techniques is a method in a distributed unit (DU) of a distributed base station for configuring a connection with a UE. The method can be executed by processing hardware and includes receiving, from a central unit (CU) of the base station, a request message to obtain a conditional configuration for connecting to a cell of the DU, and providing, to the CU, the conditional configuration for the cell. The method further includes performing a random access procedure with a UE to connect the UE to the cell, and providing, to the CU, an identifier of the cell of the DU to indicate to the CU that the UE is connected to the cell corresponding to the conditional configuration.

Another example embodiment of these techniques is a base station including processing hardware and configured to execute the methods above.

DETAILED DESCRIPTION OF THE DRAWINGS

In general, the techniques of this disclosure allow a first base station to configure the UE to use multiple conditional configurations related to multiple candidate cells of a second base station (which can be the same or different from the first base station), along with one or more conditions to be satisfied before the UE connects to a particular candidate cell. The techniques also enable the base station to determine which conditional configuration and associated security key (s) to apply to communicate with the UE on the particular candidate cell. The conditional procedure can be, for example, a conditional handover procedure, a conditional SN addition or change procedure, or a conditional PSCell addition or change procedure. In the discussion below, the term "CPAC" is used to refer to conditional PSCell addition or change without SN change. The term "CSAC" is used to refer to conditional SN addition or change.

Figure 1A:
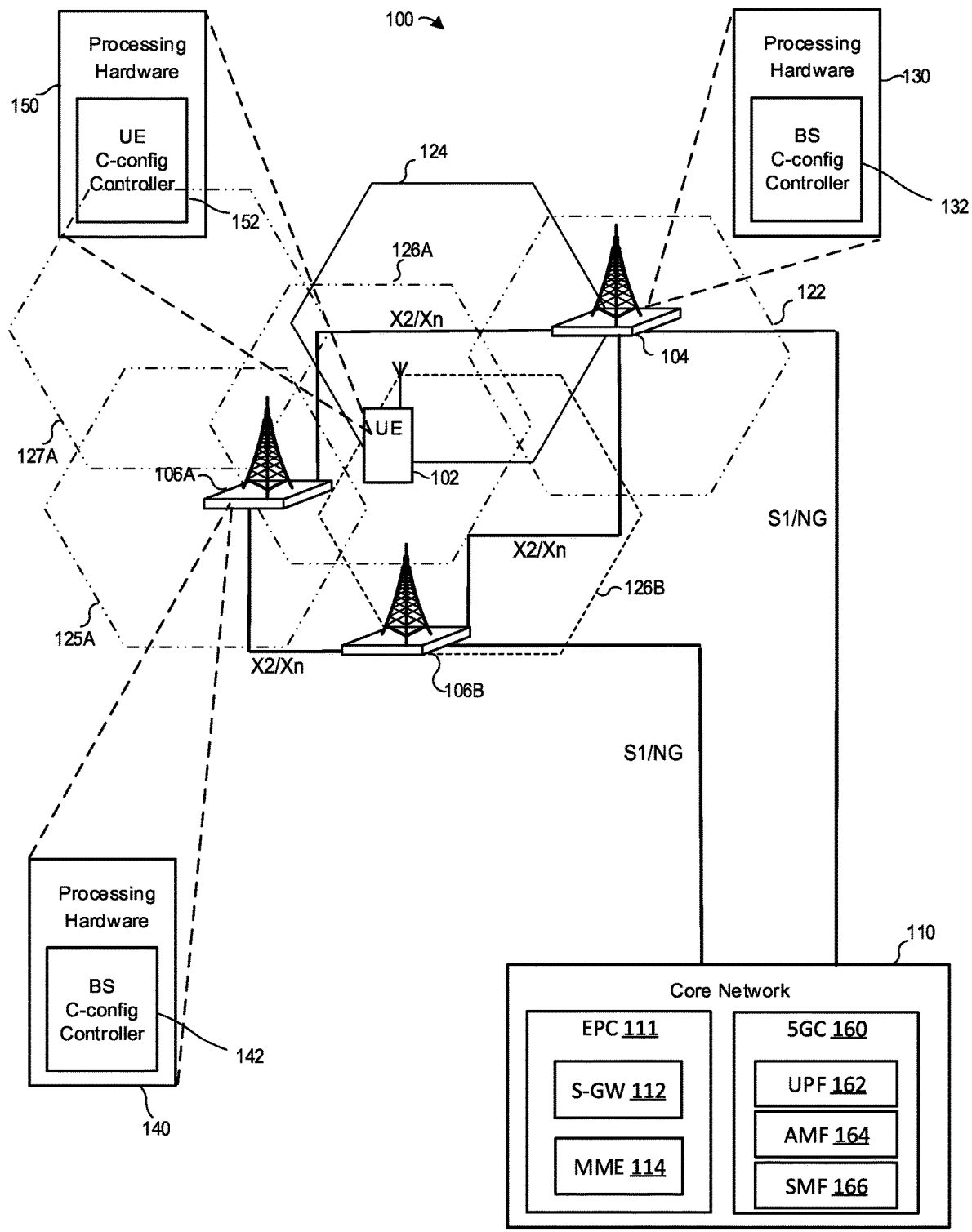
FIG. 1A is a block diagram of an example system in which a radio access network (RAN) and a user device can implement the techniques of this disclosure for managing conditional procedures related to a secondary node (SN)

FIG. 1A depicts an example wireless communication system 100 in which communication devices can implement these techniques. The wireless communication system 100 includes a UE 102, a base station 104, a base station 106A, a base station 106B and a core network (CN) 110. The UE 102 initially connects to the base station 104.

In some scenarios, the base station 104 can perform immediate SN addition to configure the UE 102 to operate in dual connectivity (DC) with the base station 104 and the base station 106A. The base stations 104 and 106A operate as an MN and an SN for the UE 102, respectively. Later on, the MN 104 can perform an immediate SN change to change the SN of the UE 102 from the base station 106A (source SN, or "S-SN") to the base station 106B (target SN, or "T-SN") while the UE 102 is in DC with the MN 104 and the S-SN 106A.

In other scenarios, the base station 104 can perform a conditional SN Addition procedure to first configure the base station 106A as a candidate SN (C-SN) for the UE 102. At this time, the UE 102 can be in single connectivity (SC) with the base station 104 or in DC with the base station 104 and another base station 106B. In contrast to the immediate SN Addition case discussed above, the UE 102 does not immediate attempt to connect to the C-SN 106A. In this scenario, the base station 104 again operates as an MN, but the base station 106A initially operates as a C-SN rather than SN.

More particularly, when the UE 102 receives a configuration for the C-SN 106A, the UE 102 does not connect to the C-SN 106A until the UE 102 has determined that a certain condition is satisfied (the UE 102 in some cases can consider multiple conditions, but for convenience only the discussion below refers to a single condition). When the UE 102 determines that the condition has been satisfied, the UE 102 connects to the candidate SN 106A, so that the C-SN 106A begins to operate as the SN 106A for the UE 102. Thus, while the base station 106A operates as a C-SN rather than an SN, the base station 106A is not yet connected to the UE 102, and accordingly is not yet servicing the UE 102.

In some scenarios, the condition associated with conditional SN addition can be signal strength/quality, which the UE 102 detects on a candidate primary secondary cell (PSCell) of the C-SN 106A, exceeding a certain threshold or otherwise corresponding to an acceptable measurement. For example, when the one or more measurement results the UE 102 obtains on the candidate PSCell (C-PSCell) are above a threshold configured by the MN 104 or above a pre-determined or pre-configured threshold, the UE 102 determines that the condition is satisfied. When the UE 102 determines that the signal strength/quality on C-PSCell of the C-SN 106A is sufficiently good (again, measured relative to one or more quantitative thresholds or other quantitative metrics), the UE 102 can perform a random access procedure with the C-SN 106A to connect to the candidate SN 106A. After the UE 102 successfully completes the random access procedure, the base station 106A begins to operate as an SN, and the C-PSCell becomes a PSCell for the UE 102. The SN 106A then can start communicating data with the UE 102.

In various configurations of the wireless communication system 100, the base station 104 can be implemented as a master eNB (MeNB) or a master gNB (MgNB), and the base station 106A or 106B can be implemented as a secondary gNB (SgNB) or a candidate SgNB (C-SgNB). The UE 102 can communicate with the base station 104 and the base station 106A or 106B (106A/B) via the same RAT such as EUTRA or NR, or different RATs. When the base station 104 is an MeNB and the base station 106A is a SgNB, the UE 102 can be in EUTRA-NR DC (EN-DC) with the MeNB and the SgNB. In this scenario, the MeNB 104 may or may not configure the base station 106B as a C-SgNB to the UE 102. When the base station 104 is an MeNB and the base station 106A is a C-SgNB for the UE 102, the UE 102 can be in SC with the MeNB. In this scenario, the MeNB 104 may or may not configure the base station 106B as another C-SgNB to the UE 102.

In some cases, an MeNB, an SeNB or a C-SgNB is implemented as an ng-eNB rather than an eNB. When the base station 104 is a Master ng-eNB (Mng-eNB) and the base station 106A is a SgNB, the UE 102 can be in next generation (NG) EUTRA-NR DC (NGEN-DC) with the Mng-eNB and the SgNB. In this scenario, the MeNB 104 may or may not configure the base station 106B as a C-SgNB to the UE 102. When the base station 104 is an Mng-NB and the base station 106A is a C-SgNB for the UE 102, the UE 102 can be in SC with the Mng-NB. In this scenario, the Mng-eNB 104 may or may not configure the base station 106B as another C-SgNB to the UE 102.

When the base station 104 is an MgNB and the base station 106A/B is an SgNB, the UE 102 may be in NR-NR DC (NR-DC) with the MgNB and the SgNB. In this scenario, the MeNB 104 may or may not configure the base station 106B as a C-SgNB to the UE 102. When the base station 104 is an MgNB and the base station 106A is a C-SgNB for the UE 102, the UE 102 may be in SC with the MgNB. In this scenario, the MgNB 104 may or may not configure the base station 106B as another C-SgNB to the UE 102.

When the base station 104 is an MgNB and the base station 106A/B is a Secondary ng-eNB (Sng-eNB), the UE 102 may be in NR-EUTRA DC (NE-DC) with the MgNB and the Sng-eNB. In this scenario, the MgNB 104 may or may not configure the base station 106B as a C-Sng-eNB to the UE 102. When the base station 104 is an MgNB and the base station 106A is a candidate Sng-eNB (C-Sng-eNB) for the UE 102, the UE 102 may be in SC with the MgNB. In this scenario, the MgNB 104 may or may not configure the base station 106B as another C-Sng-eNB to the UE 102.

In the scenarios where the UE 102 hands over from the base station 104 to the base station 106A, the base stations 104 and 106A operate as the source base station (S-BS) and a target base station (T-BS), respectively. When the handover is conditional, the base station operates as a conditional T-BS (C-T-BS) or simply C-BS. The UE 102 can operate in DC with the base station 104 and a base station 106B for example prior to the handover, and continue to operate in DC with the base station 106A, and the base station 106B or another base station (not shown in FIG. 1A), after completing the handover. The base stations 104 and 106A in this case operate as a source MN (S-MN) and a target MN (T-MN), respectively, provided the handover is immediate. When the handover is conditional, the base station operates as a conditional T-MN (C-T-MN) or simply C-MN.

The base stations 104, 106A, and 106B can connect to the same core network (CN) 110 which can be an evolved packet core (EPC) 111 or a fifth-generation core (5GC) 160. The base station 104 can be implemented as an eNB supporting an S1 interface for communicating with the EPC 111, an ng-eNB supporting an NG interface for communicating with the 5GC 160, or as a base station that supports the NR radio interface as well as an NG interface for communicating with the 5GC 160. The base station 106A can be implemented as an EN-DC gNB (en-gNB) with an S1 interface to the EPC 111, an en-gNB that does not connect to the EPC 111, a gNB that supports the NR radio interface as well as an NG interface to the 5GC 160, or a ng-eNB that supports an EUTRA radio interface as well as an NG interface to the 5GC 160. To directly exchange messages during the scenarios discussed below, the base stations 104, 106A, and 106B can support an X2 or Xn interface.

Among other components, the EPC 111 can include a Serving Gateway (S-GW) 112 and a Mobility Management Entity (MME) 114. The S-GW 112 in general is configured to transfer user-plane packets related to audio calls, video calls, Internet traffic, etc., and the MME 114 is configured to manage authentication, registration, paging, and other related functions. The 5GC 160 includes a User Plane Function (UPF) 162 and an Access and Mobility Management (AMF) 164, and/or Session Management Function (SMF) 166. Generally speaking, the UPF 162 is configured to transfer user-plane packets related to audio calls, video calls, Internet traffic, etc., the AMF 164 is configured to manage authentication, registration, paging, and other related functions, and the SMF 166 is configured to manage PDU sessions.

As illustrated in FIG. 1A, the base station 104 supports a cell 124, the base station 106A supports a cell 126A, and the base station 106B supports a cell 126B. The cells 124 and 126A can partially overlap, as can the cells 124 and 126B, so that the UE 102 can communicate in DC with the base station 104 (operating as an MN) and the base station 106A (operating as an SN) and, upon completing an SN change, with the base station 104 (operating as MN) and the SN 106B. The base station 106A can also support additional cells 125A and 127A. More particularly, when the UE 102 is in DC with the base station 104 and the base station 106A, the base station 104 operates as an MeNB, an Mng-eNB or an MgNB, and the base station 106A operates as an SgNB or an Sng-eNB. when the UE 102 is in SC with the base station 104, the base station 104 operates as an MeNB, an Mng-eNB or an MgNB, and the base station 106A operates as a C-SgNB or a C-Sng-eNB.

In general, the wireless communication network 100 can include any suitable number of base stations supporting NR cells and/or EUTRA cells. More particularly, the EPC 111 or the 5GC 160 can be connected to any suitable number of base stations supporting NR cells and/or EUTRA cells. Although the examples below refer specifically to specific CN types (EPC, 5GC) and RAT types (5G NR and EUTRA), in general the techniques of this disclosure also can apply to other suitable radio access and/or core network technologies such as sixth generation (6G) radio access and/or 6G core network or 5G NR-6G DC.

With continued reference to FIG. 1A, the base station 104 includes processing hardware 130, which may include one or more general-purpose processors (e.g., central processing units (CPUs)) and a computer-readable memory storing machine-readable instructions executable on the general-purpose processor(s), and/or special-purpose processing units. The processing hardware 130 in the example implementation of FIG. 1 includes a conditional configuration controller 132 that is configured to manage or control the conditional configuration techniques of this disclosure. For example, the conditional configuration controller 132 may be configured to support RRC messaging associated with immediate and conditional handover procedures, and/or to support the necessary operations when the base station 104 operates as an MN relative to an SN. Moreover, in some implementations and/or scenarios, the conditional configuration controller 132 may be responsible for maintaining (for the UE 102 and a number of other UEs not shown in FIG. 1) current sets of conditional configurations in accordance with various implementations discussed below.

The base station 106A includes processing hardware 140, which may include one or more general-purpose processors (e.g., CPUs) and a computer-readable memory storing machine-readable instructions executable on the general-purpose processor(s), and/or special-purpose processing units. The processing hardware 140 in the example implementation of FIG. 1 includes a conditional configuration controller 142 that is configured to manage or control RRC procedures and RRC configurations. For example, the conditional configuration controller 142 may be configured to support RRC messaging associated with immediate and conditional handover procedures, and/or to support the necessary operations when the base station 106A operates as MN, an SN, a candidate MN (C-MN) and/or candidate SN (C-SN). Moreover, in some implementations and/or scenarios, the conditional configuration controller 142 may be responsible for maintaining (for the UE 102 and a number of other UEs not shown in FIG. 1) current sets of conditional configurations in accordance with various implementations discussed below. The base station 106B may include processing hardware similar to the processing hardware 140 of the base station 106A.

Although FIG. 1A illustrates the RRC controllers 132 and 142 as operating in an MN and an SN, respectively, a base station generally can operate as an MN, an SN, a candidate MN or a candidate SN in different scenarios. Thus, the MN 104, the SN 106A, and the SN 106B can implement similar sets of functions and support both MN, SN, conditional MN and conditional SN operations.

The UE 102 includes processing hardware 150, which may include one or more general-purpose processors (e.g., CPUs) and a computer-readable memory storing machine-readable instructions executable on the general-purpose processor(s), and/or special-purpose processing units. The processing hardware 150 in the example implementation of FIG. 1 includes a conditional configuration controller 152 that is configured to manage or control RRC procedures and RRC configurations related to conditional configurations. For example, the conditional configuration controller 152 may be configured to support RRC messaging associated with immediate and conditional handover and/or secondary node addition/modification procedures, and may also be responsible for maintaining a current set of conditional configurations for the UE 102 (e.g., adding, releasing or modifying conditional configurations as needed) in accordance with any of the implementations discussed below.

In operation, the UE 102 can use a radio bearer (e.g., a DRB or an SRB) that at different times terminates at the MN 104 or the SN 106A. The UE 102 can apply one or more security keys when communicating on the radio bearer, in the uplink (from the UE 102 to a base station) and/or downlink (from a base station to the UE 102) direction.

Figure 1B:
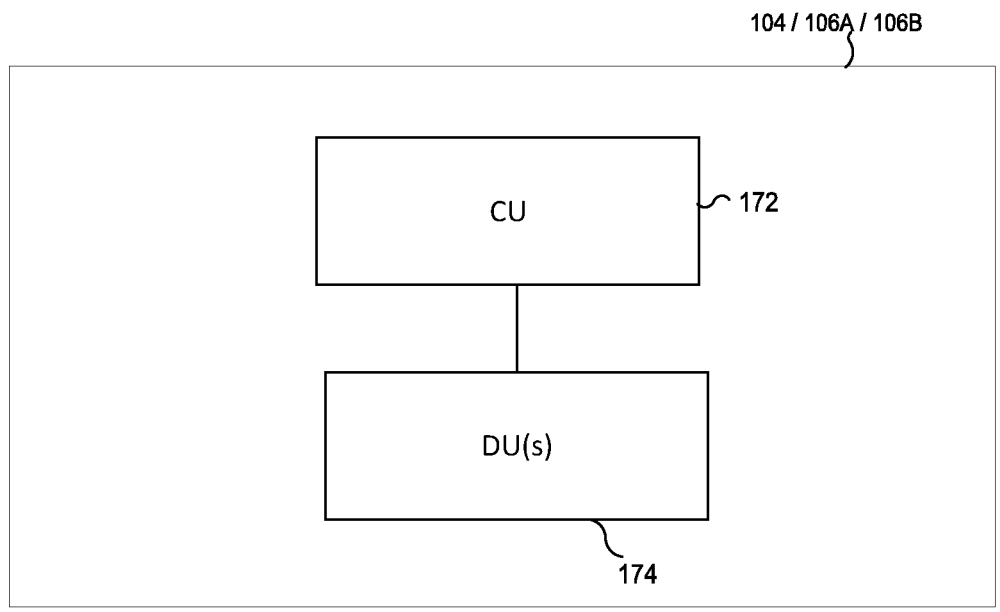
FIG. 1B is a block diagram of an example base station including a centralized unit (CU) and a distributed unit (DU) that can operate in the system of FIG. 1A.

FIG. 1B depicts an example distributed implementation of a base station such as the base station 104, 106A, or 106B. The base station in this implementation can include a centralized unit (CU) 172 and one or more distributed units (DUs) 174. The CU 172 is equipped with processing hardware that can include one or more general-purpose processors such as CPUs and non-transitory computer-readable memory storing machine-readable instructions executable on the one or more general-purpose processors, and/or special-purpose processing units. In one example, the CU 172 is equipped with the processing hardware 130. In another example, the CU 172 is equipped with the processing hardware 140. The processing hardware 140 in an example implementation includes an (C-)SN RRC controller 142 configured to manage or control one or more RRC configurations and/or RRC procedures when the base station 106A operates as an SN or a candidate SN (C-SN). The base station 106B can have hardware same as or similar to the base station 106A. The DU 174 is also equipped with processing hardware that can include one or more general-purpose processors such as CPUs and non-transitory computer-readable memory storing machine-readable instructions executable on the one or more general-purpose processors, and/or special-purpose processing units. In some examples, the processing hardware in an example implementation includes a medium access control (MAC) controller configured to manage or control one or more MAC operations or procedures (e.g., a random access procedure) and a radio link control (RLC) controller configured to manage or control one or more RLC operations or procedures when the base station 106A operates as an MN, an SN or a candidate SN (C-SN). The process hardware may include further a physical layer controller configured to manage or control one or more physical layer operations or procedures.

Figure 2:
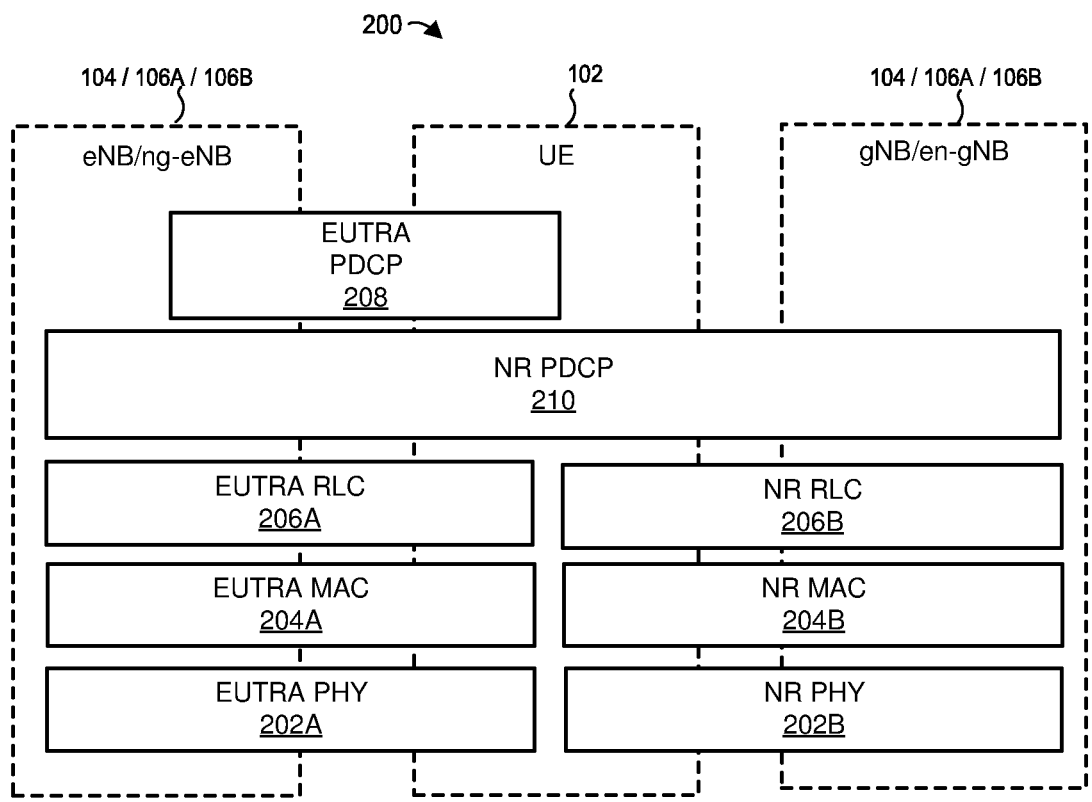
FIG. 2 is a block diagram of an example protocol stack according to which the UE of FIG. 1A communicates with base stations.

Next, FIG. 2 illustrates in a simplified manner a radio protocol stack according to which the UE 102 can communicate with an eNB/ng-eNB or a gNB. Each of the base stations 104, 106A, or 106B can be the eNB/ng-eNB or the gNB.

The physical layer (PHY) 202A of EUTRA provides transport channels to the EUTRA Medium Access Control (MAC) sublayer 204A, which in turn provides logical channels to the EUTRA Radio Link Control (RLC) sublayer 206A, and the EUTRA RLC sublayer in turn provides RLC channels to the EUTRA PDCP sublayer 208 and, in some cases, NR PDCP sublayer 210. Similarly, the PHY 202B of NR provides transport channels to the NR MAC sublayer 204B, which in turn provides logical channels to the NR RLC sublayer 206B, and the NR RLC sublayer 206B in turn provides RLC channels to the NR PDCP sublayer 210. The UE 102 in some implementations supports both the EUTRA and the NR stack, to support handover between EUTRA and NR base stations and/or DC over EUTRA and NR interfaces. Further, as illustrated in FIG. 2A, the UE 102 can support layering of NR PDCP 210 over EUTRA RLC 206A.

The EUTRA PDCP sublayer 208 and the NR PDCP sublayer 210 receive packets (e.g., from the Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 provide SRBs to exchange Radio Resource Control (RRC) messages, for example. On a user plane, the EUTRA PDCP sublayer 208 and the NR PDCP sublayer 210 provide DRBs to support data exchange.

When the UE 102 operates in EUTRA/NR DC (EN-DC), with the base station 104 operating as a MeNB and the base station 106A or 106B operating as a SgNB, the network can provide the UE 102 with an MN-terminated bearer that uses EUTRA PDCP 208 or MN-terminated bearer that uses NR PDCP 210. The network in various scenarios also can provide the UE 102 with an SN-terminated bearer, which use only NR PDCP 210. The MN-terminated bearer can be an MCG bearer or a split bearer. The SN-terminated bearer can be a SCG bearer or a split bearer. The MN-terminated bearer can be an SRB (e.g., SRB1 or SRB2) or a DRB. The SN-terminated bearer can an SRB (e.g., SRB) or a DRB.

Figure 8:
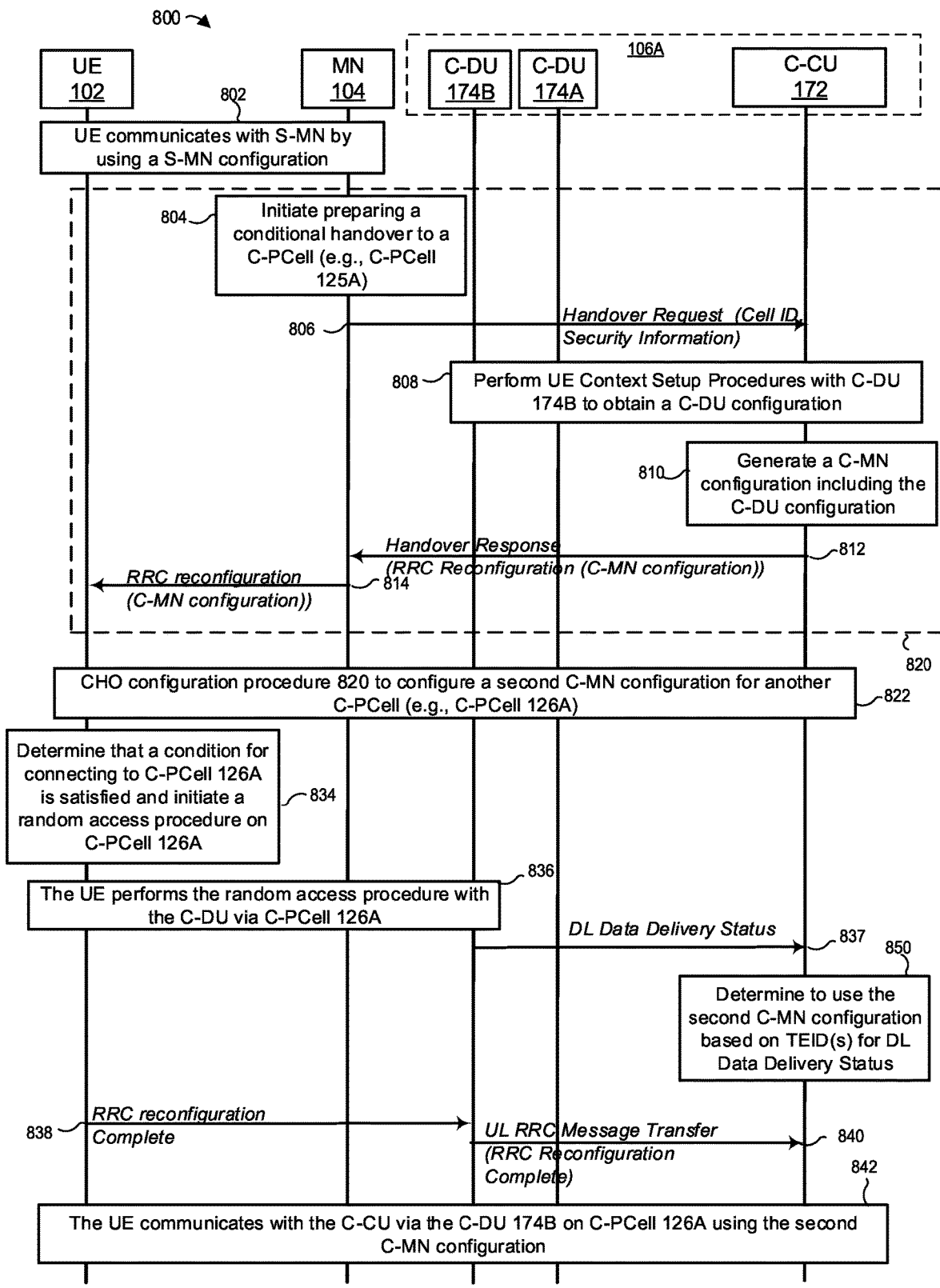
FIG. 8 is a messaging diagram of an example scenario for inter-base-station mobility in which a C-DU of a target base station sends a DL Data Delivery Status message to a CU of the target base station after detecting that a UE connected to the C-PCell, and the C-CU determines to use a particular C-MN configuration based on the TEID(s) for the DL Data Delivery Status message, in accordance with the techniques of this disclosure.
Figure 9:
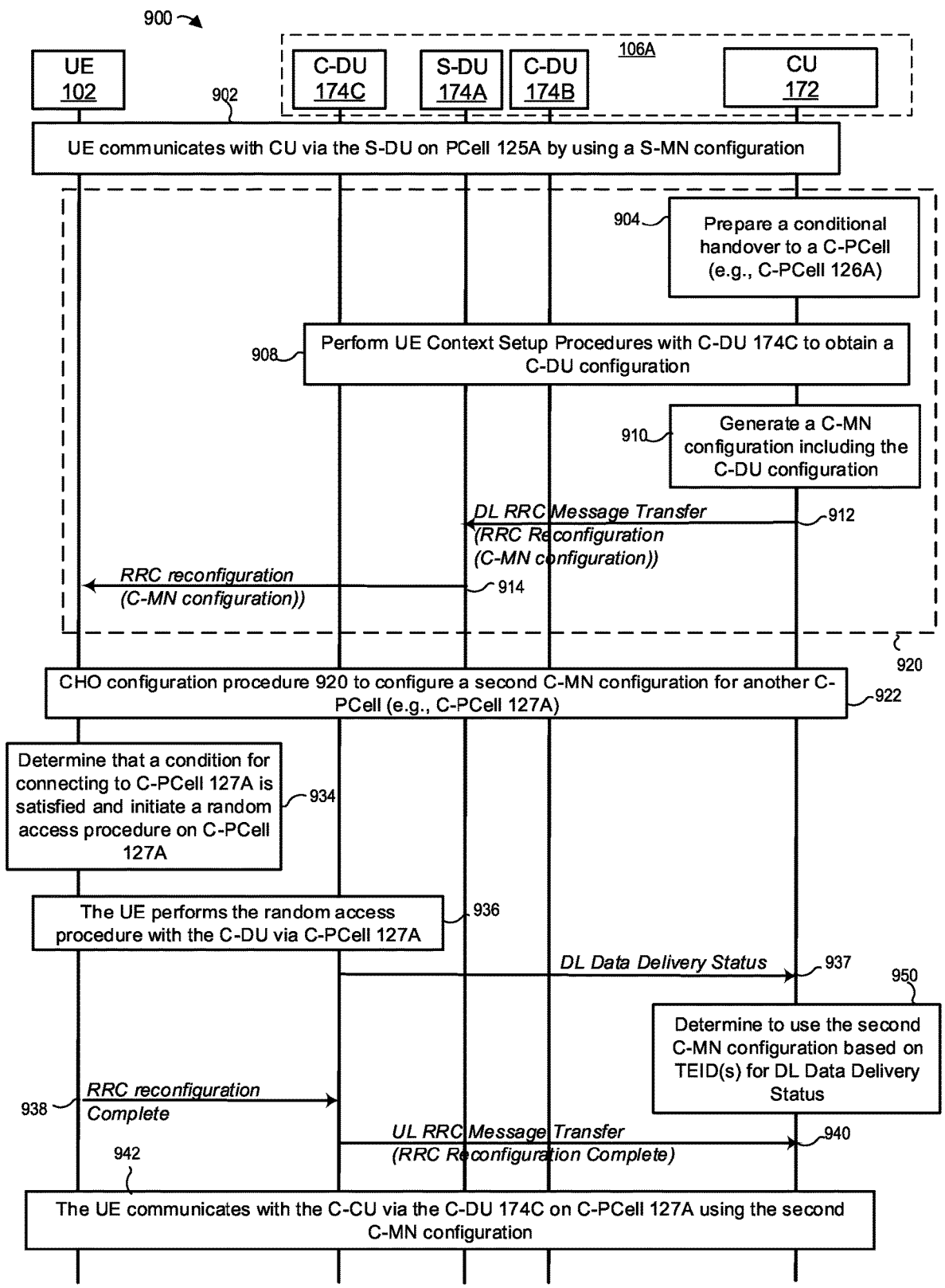
FIG. 9 is a messaging diagram of an example scenario for intra-base-station mobility in which a C-DU of a base station sends a DL Data Delivery Status message to a CU of the target base station after detecting that a UE connected to the C-PCell, and the C-CU determines to use a particular C-MN configuration based on the TEID(s) for the DL Data Delivery Status message, in accordance with the techniques of this disclosure.

Next, several example scenarios in which a base station initiates a conditional PSCell addition or change (CPAC) procedure, a conditional SN addition or change (CSAC) procedure, or a condition handover procedure are discussed. FIG. 3 (i.e., 3A through 3F) depict scenarios in which a base station initiates a CPAC procedure for a UE and FIG. 4 (i.e., 4A through 4C) depict scenarios in which a base station initiates a CSAC procedure for a UE. FIG. 5 (i.e., 5A through 5F) depict scenarios in which a base station initiates a CPAC or CSAC procedure for a UE. FIG. 6 (i.e., 6A and 6B), FIG. 7 (i.e., 7A and 7B), FIG. 8 and FIG. 9 depict handover scenarios in which a base station initiates a conditional handover procedure for a UE.

Figure 3A:
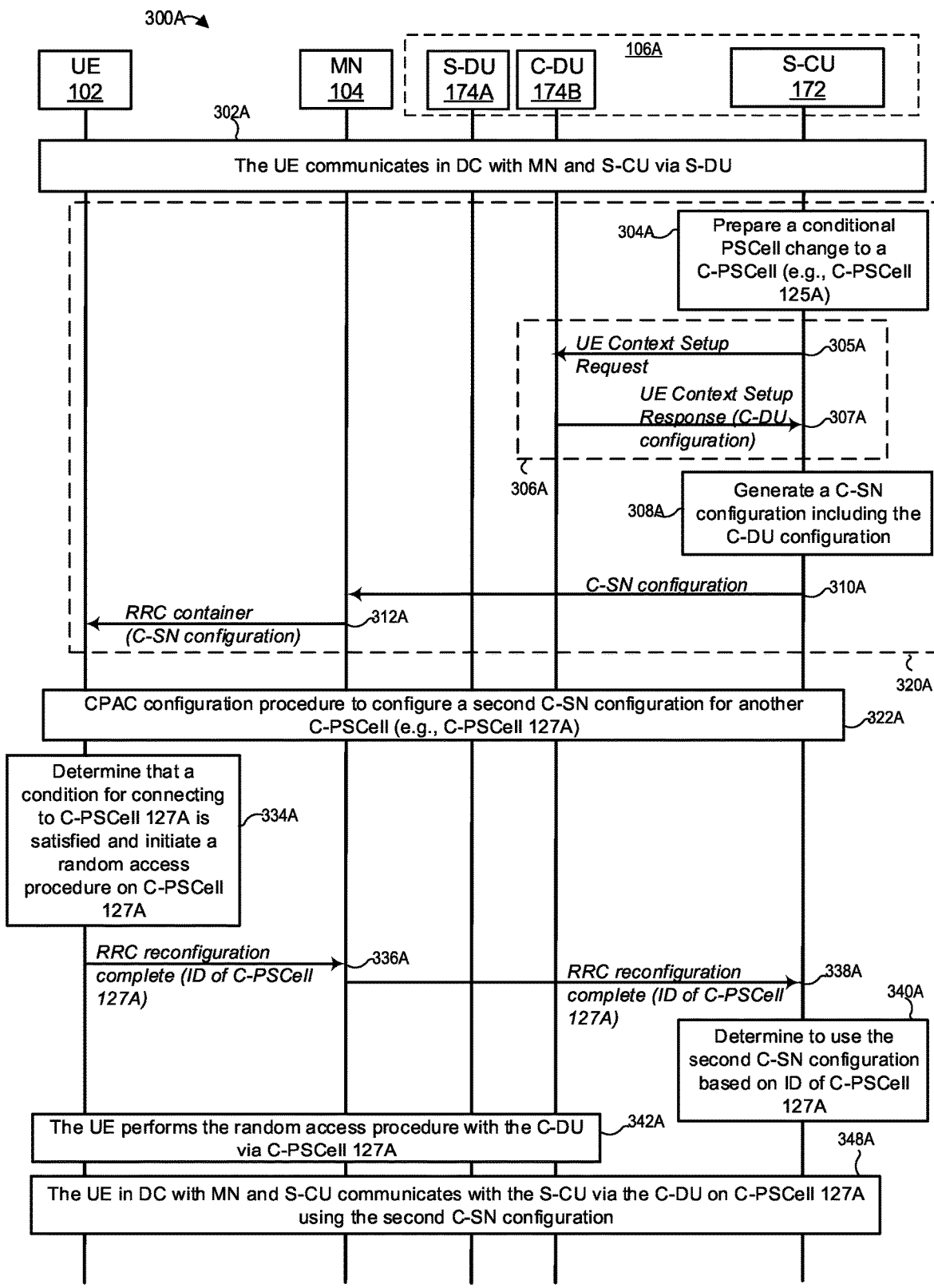
FIG. 3A is a messaging diagram of an example scenario in which a UE in dual connectivity (DC) transmits an identity of a candidate primary secondary cell (C-PSCell) to a central unit (CU) of an SN via an MN, and the CU determines to use a particular C-SN configuration based on the identity of the C-PSCell, in accordance with the techniques of this disclosure.

Referring first to FIG. 3A, in a scenario 300A, the base station 104 operates as an MN and the base station 106A operates as an SN that includes both a secondary source CU (referred to here as S-CU 172), a secondary source DU (referred to here as S-DU 174A) and a C-DU 174B. Initially, the UE 102 (operating in DC) communicates 302A data (e.g., uplink and/or downlink data PDUs) with the MN 104 (via cell 124), e.g., in accordance with an MN configuration, and communicates 302A data (e.g., uplink and/or downlink data PDUs) with the S-CU 172 via the S-DU 174A (via cell 126A) in accordance with a source SN configuration.

The S-CU 172 at some point determines 304A that it should prepare a conditional PSCell change to a C-PSCell (e.g., C-PSCell 125A) operated by the C-DU 174B for the UE 102. The S-CU 172 can make this determination based on one or more measurement results received from the UE 102, for example, or another suitable event. In response to this determination, the S-CU 172 sends 305A an UE Context Setup Request message to the C-DU 174B to obtain a C-DU configuration. In response to receiving UE Context Setup Request message, the C-DU 174B includes a first C-DU configuration in a UE Context Setup Response message for the UE 102. The first C-DU configuration included in this message can include one or more configuration parameters for communication on the C-PSCell 125A. The DU 174B then sends 307A the UE Context Setup Response message to the S-CU 172. After receiving the UE Context Setup Response message, the S-CU 172 generates 308A a first C-SN configuration including the first C-DU configuration. Then, the S-CU 172 sends 310A the first C-SN configuration to the MN 104, which in turn transmits 312A an RRC container message including the first C-SN configuration to the UE 102. The events 305A and 307A are collectively referred to in FIG. 3A as the UE Context Setup procedure 306A. The events 304A, 305A, 307A, 308A, 310A and 312A are collectively referred to in FIG. 3A as the CPAC configuration procedure 320A.

In some implementations, the S-CU 172 can indicate to the C-DU 174B a particular candidate cell (e.g., a C-PSCell 125A or a C-PSCell 127A) for which the C-DU 174B generates a C-DU configuration. The S-CU 172 can include an identity of the particular candidate cell in a UE Context Setup Request message. In other implementations, the C-DU 174B indicates a particular candidate cell (e.g., a C-PSCell 125A or a C-PSCell 127A) for which the C-DU 174B generates a C-DU configuration in a UE Context Setup Response message in response to the UE Context Setup Request message. In such implementations, the S-CU 172 can determine an association between the C-DU configuration (or a C-SN configuration including the C-DU configuration) and identity of the particular candidate cell. The S-CU 172 can store the association for determining to use the C-DU configuration (or the C-SN configuration). For example, the S-CU 172 can associate an identity of the C-PSCell 125A with the first C-SN configuration (or the first C-DU configuration) at event 308A or upon receiving the UE Context Setup Response message 307A in the CPAC configuration procedure 320A. The S-CU 172 can store the association for the determination 340A.

In some implementations, the S-CU 172 can generate an RRC reconfiguration message including the first C-SN configuration and send 310A the RRC reconfiguration message to the MN 104. In turn, the MN 104 transmits 312A the RRC container message including the RRC reconfiguration message to the UE 102. In one implementation, the S-CU 172 can send 310A an SN message (e.g., SN Modification Required message, RRC Transfer message, etc.) including the first C-SN configuration or the RRC reconfiguration message to the MN 104. In some implementations, the UE 102 can transmit an RRC container response message to the MN 104 in response to the RRC container message. In one implementation, the UE 102 transmits an RRC container response message including an RRC reconfiguration complete message. The MN 104 can send an SN message (e.g., SN Reconfiguration Complete message) including the RRC reconfiguration complete message to the S-CU 172. The RRC reconfiguration complete message can respond to the RRC reconfiguration message. The RRC container response message can respond to the RRC container message.

The S-CU 172, in some implementations, can perform 322A the CPAC configuration procedure with the C-DU 174B, the MN 104 and the UE 102 to configure the UE 102 a second C-SN configuration including a second C-DU configuration for another C-PSCell (e.g., C-PSCell 127A operated by the C-DU 174B), similar to the CPAC configuration procedure 320A. In other implementations, the S-CU 172 can perform 322A the CPAC configuration procedure with the S-DU 174A, the MN 104 and the UE 102 to configure the UE 102 a second C-SN configuration including a second C-DU configuration for another C-PSCell (e.g., C-PSCell 127A operated by the S-DU 174A), similar to the CPAC configuration procedure 320A. In these implementations, the S-CU 172 may perform a UE Context Modification procedure with the S-DU 174A to obtain a second C-DU configuration instead of the UE Context Setup procedure. In the UE Context Modification procedure, the S-CU 172 can send a UE Context Modification Request message to the S-DU 174A, similar to the UE Context Setup Request message and the S-DU 174A responds with a UE Context Modification Response message including a second DU configuration. In these implementations, event 342A and 348A would occur between the UE 102 and the S-DU 174A. The S-CU 172 can perform the CPAC configuration procedures 322A in parallel with or after the CPAC configuration procedure 320A. In some implementations, the S-CU 172 can associate an identity of the C-PSCell 127A with the second C-SN configuration (or the second C-DU configuration) at event 308A or upon receiving the UE Context Setup Response message 307A (or the UE Context Modification Response message) in the CPAC configuration procedure 322A. The S-CU 172 can store the association for the determination 340A.

In some implementations, the S-CU 172 can include a first C-CU configuration in the first C-SN configuration and a second C-CU configuration in the second C-SN configuration. The first C-CU configuration and the second C-CU configuration can have the same content or different contents. In other implementations, the S-CU 172 does not include a C-CU configuration in the first C-SN configuration and the S-CU 172 does not include a C-CU configuration in the second C-SN configuration. The first C-DU configuration and the second C-DU configuration can have some portions that are different.

Later in time, the UE 102 determines (or detects) 334A that a condition for connecting to a C-PSCell 127A is met and initiates a random access procedure on the C-PSCell 127A in response to the detection. For convenience, this discussion may refer to the condition or a configuration in the singular, but it will be understood that there may be multiple conditions, and that the RRC reconfiguration message generated by the S-CU 172 can include one or multiple configuration parameters to specify the condition or the multiple conditions.

In response to the determination 334A, the UE 102 transmits 336A an RRC reconfiguration complete message including an identity of the C-PSCell 127A to the MN 104, which in turn sends 338A the RRC reconfiguration complete message to the S-CU 172. In some implementations, the UE 102 can include frequency information (e.g., absolute radio-frequency channel number and/or frequency band number) of the C-PSCell 127A in the RRC reconfiguration message 336A. The S-CU 172 determines 340A to use the second C-SN configuration (or the second C-DU configuration and/or the second CU configuration) as a new S-SN configuration (as a new S-DU configuration) based on the identity of the C-PSCell 127A. In one implementation, the MN 104 can send 338A an SN message (e.g., an SN Reconfiguration Complete message, an SN Modification Request message, or an RRC Transfer message) including the RRC reconfiguration complete message to the S-CU 172. Alternatively, the MN 104 obtains the identity of the C-PSCell 127A and optionally the frequency information (if included) from the RRC reconfiguration message, includes the identity of the C-PSCell 127A and the frequency information (if included) in at least one IE, and sends an SN message (e.g., an SN Reconfiguration Complete message, an SN Modification Request message, or an RRC Transfer message) including the at least one IE to the S-CU 172. In another implementation, the RRC reconfiguration message 336A may be transparent to the MN 104 so that the S-CU 172 can send the MN 104 one or more SN messages (e.g., SN Modification Required message, SN configuration update message, SN information update message, etc.) including the identity of the C-PSCell 127A and optionally the frequency information (if received or derived by the S-CU 172 based on the identity of the C-PSCell 127A).

In some implementations, the UE 102 can generate an RRC container message (e.g., ULInformationTransfer-MRDC message) including the RRC reconfiguration complete message and transmit 336A the RRC container message to the MN 104. The MN 104 in turn extracts the RRC reconfiguration complete message from the RRC container message and sends 338A the RRC reconfiguration complete message to the S-CU 172. In one implementation, the UE 102 can include the identity of the C-PSCell 127A and optionally include the frequency information in the RRC container message. In other implementations, the UE 102 can generate an RRC container response message (similar to the RRC container message described above) including the RRC reconfiguration complete message and transmit 336A the RRC container response message to the MN 104. The MN 104 in turn extracts the RRC reconfiguration complete message from the RRC container response message and sends 338A the RRC reconfiguration complete message to the S-CU 172. In one implementation, the UE 102 can include the identity of the C-PSCell 127A and optionally include the frequency information in the RRC container response message.

In response to the determination 334A, the UE 102 then performs 342A a random access procedure with the C-DU 174B via the C-PSCell 127A, e.g., using one or more random access configurations in the second C-DU configuration. If the UE 102 successfully completes the random access procedure (e.g., succeeds the contention resolution in the random access procedure), the UE 102 communicates 348A with the C-DU 174 via the C-PSCell 127A using the second C-DU configuration and communicates with the S-CU 172 via the C-DU 174 using the second CU configuration. In some implementations, the UE 102 may disconnect from the PSCell 126A to perform the random access procedure, i.e., to connect the C-PSCell 127A. In other implementations, the UE 102 does not disconnect from the PSCell 126A while performing the random access procedure. If the C-DU 174B identifies the UE 102 in the random access procedure, the C-DU 174B becomes an S-DU 174B and communicates 348A with the UE 102 via the C-PSCell 127A. The S-DU 174B can send a message (e.g., a DL Data Delivery Status message in FIG. 3C) to indicate to the S-CU 172 that the UE 102 is connected, after or response to identifying the UE 102 in the random access procedure. Later on, if the S-CU 172 initiates an immediate DU change from the S-DU 174B to a DU of the S-CU 172 (e.g., the DU 174A or another DU not shown in FIG. 3A), the S-CU 172 can send the second C-SN configuration (i.e., the new S-SN configuration) or the second C-DU configuration (e.g., the new S-DU configuration) to the DU. Later on, if the S-CU 172 initiates immediate SN change to the base station 106B or if the MN 104 requests the latest SN configuration, the S-CU 172 can send the second C-SN configuration to the MN 104.

In some implementations, the random access procedure can be a four-step random access procedure or a two-step random access procedure. The UE 102 can transmit a Message A including a UE identity (ID) to the C-DU 174B in the two-step random access procedure. In other implementations, the random access procedure can be a contention-based random access procedure or a contention-free random access procedure. In the contention-based random access procedure, the UE 102 can transmit a Message 3 including a UE ID to the C-DU 174B. The C-DU 174B can assign the UE ID in the second DU configuration. The UE ID can be a cell-radio network temporary identifier (C-RNTI). In the contention-free random access procedure, the UE 102 can transmit a dedicated preamble to the C-DU 174B. The C-DU 174B can assign the dedicated preamble in the second DU configuration. The C-DU 174B can assign the UE ID in the second DU configuration. If the C-DU 174B receives the UE ID or the dedicated preamble, the C-DU 174B identifies the UE 102. After the UE 102 successfully completes 342A the random access procedure (e.g., succeeds the contention resolution in the random access procedure), the C-PSCell 127A begins to operate as the PSCell 127A, and the UE 102 begins to operate 348A in DC with the MN 104 via the PCell 124 and the SN 106A via the PSCell 127A. In particular, the UE 102 communicates 348A with the SN 106A via the C-PSCell 127A (i.e., new PSCell 127A) in accordance with the second C-SN configuration.

Because the S-CU 172 receives the identity of the C-PSCell 127A, the S-CU 172 does not select the first C-SN configuration (or the first C-DU configuration) for the C-PSCell 125A. The S-CU 172 uses the second C-SN configuration, and does not use the first C-SN configuration, to communicate with the UE 102 while the UE 102 is connected to the C-DU 174B on the C-PSCell 127A, thereby avoiding a communication failure due to configuration mismatch.

In some implementations, the identity of the C-PSCell 127A can be a cell global identity (CGI). In other implementations, the identity of the C-PSCell 127A can be a cell identity in a system information block broadcast on the C-PSCell 127A. In yet other implementations, the identity of the C-PSCell 127A can be a physical cell identity (PCI) that the UE 102 obtains from synchronization signals received by the UE 102 on the C-PSCell 127A. In various implementations, the S-CU 172 maintains a table for mapping between a CGI and a PCI or another suitable identifier of a particular cell in the wireless communication system 100 for the purpose of identifying a particular C-SN configuration.

In some implementations, S-CU 172 can include at least one first security configuration parameter in the second C-SN configuration. In other implementations, the S-CU 172 can send the at least one first security configuration parameter with the first C-SN configuration at event 310A and the MN 104 include the at least one first security configuration parameter in the RRC container message at event 312A. The S-CU 172 can generate the at least one first security key (security key(s)) from the at least one first security configuration parameters and a first security base key (e.g., $K_{SN}$ or $K_{SN^*}$). For example, the first security key(s) can include a first ciphering key for encryption and decryption and/or include a first integrity key for integrity protection and check.

In other implementations, S-CU 172 can include at least one second security configuration parameter in the second C-SN configuration. In other implementations, the S-CU 172 can send the at least one second security configuration with the second C-SN configuration during procedure 322A at an event similar to event 310A, and the MN 104 can include the security configuration in the RRC container message during procedure 322A at an event similar to event 312A. The S-CU 172 can generate at least one second security key (security key(s)) from the at least one second security configuration parameter and a second security base key (e.g., $K_{SN}$ or $K_{SN^*}$). For example, the second security key(s) can include a second ciphering key for encryption and decryption and/or include a second integrity key for integrity protection and check. In one implementation, the S-CU 172 determines to use the at least one second security configuration parameter and the second security base key to generate the second security key(s) according to the identity of the C-PSCell 127A. In another implementation, the S-CU 172 determines to use the second security key(s) according to the identity of the C-PSCell 127A. The UE 102 can generate the second security key(s) (which is the same as the second security key(s) generated by the SN 106A) from the at least one second security configuration parameter and the security base key. In one implementation, the UE 102 can generate the second security key(s) from the at least one second security configuration parameter and the security base key after event 334A or receiving the RRC container message during the CPAC procedure 322A. Thus, the UE 102 in DC communicates 348A with the S-CU 172 via the S-DU 174B using the second C-SN configuration and the second security key(s). In one implementation, the first security base key and the second security base key can be the same or identical. In another implementation, the first security base key and the second security base key can be different. The S-CU 172 can determine which security base key or which security key(s) based on the identity of the C-PCell 126A.

In yet other implementations, if the RRC container message at event 312A (in CPAC procedure 320A or CPAC procedure 322A) does not include any security configuration parameter for the UE 102 to communicate with the S-CU 172 via the C-DU 174B, the UE 102 in DC communicates 348A with the S-CU 172 via the S-DU 174B using the second C-SN configuration and security key(s) which was configured at a dual connectivity configuration (e.g., an SN Addition procedure) procedure at event 302A.

In some implementations, the first C-DU configuration can include multiple configuration parameters such as physical layer configuration parameters, MAC configuration parameters, RLC configuration parameters, and/or the one or more random access configurations needed by the UE 102 to perform 342A the random access procedure with the C-DU 174B on the C-PSCell 125A (if the UE 102 determines that a condition for connecting the C-PSCell 125A is satisfied). The second C-DU configuration can include multiple configuration parameters such as physical layer configuration parameters, MAC configuration parameters, RLC configuration parameters, and/or the one or more random access configurations needed by the UE 102 to perform 342A the random access procedure with the C-DU 174B on the C-PSCell 127A. In other implementations, the first C-DU configuration can be CellGroupConfig information element (IE) that configures the C-PSCell 125A and zero, one, or more C-SCells of the C-DU 174B. The second C-DU configuration can be CellGroupConfig IE that configures the C-PSCell 127A and zero, one, or more C-SCells of the C-DU 174B. In yet other implementations, the first C-DU configuration can include configurations in ConfigPartSCG-r12 IE and the second C-DU configuration can include configurations in ConfigPartSCG-r12 IE.

In some implementations, the first C-CU configuration may include a radio bearer configuration and/or measurement configuration. The second C-CU configuration may include a radio bearer configuration and/or measurement configuration. For example, the radio bearer configuration can be a RadioBearerConfig IE, DRB-ToAddModList IE or SRB-ToAddModList IE, DRB-ToAddMod IE or SRB-ToAddMod IE. The measurement configuration can be a MeasConfig IE.

In some implementations, the first C-SN configuration can be an RRCReconfiguration message or an RRCReconfiguration-IEs conforming to 3GPP TS 38.331. The second C-SN configuration can be an RRCReconfiguration message or an RRCReconfiguration-IEs conforming to 3GPP TS 38.331. In other implementations, the first C-SN configuration can be an RRCConnectionReconfiguration message or RRCConnectionReconfiguration-IEs conforming to 3GPP TS 36.331. The second C-SN configuration can be an RRCConnectionReconfiguration message or RRCConnectionReconfiguration-IEs conforming to 3GPP TS 36.331.

In some implementations, the MN configuration includes a RadioBearerConfig IE, an RRCReconfiguration message, an RRCReconfiguration-IEs, a CellGroupConfig IE and/or MeasConfig IE conforming to 3GPP TS 38.331. In other implementations, the MN configuration includes an RRCConnectionReconfiguration message or RRCConnectionReconfiguration-IEs conforming to 3GPP TS 36.331. In still other implementations, the MN configuration includes configurations in the RadioBearerConfig IE, the CellGroupConfig IE, RRCReconfiguration-IEs, and/or or RRCConnectionReconfiguration-IEs.

In some implementations, the S-SN configuration includes a RadioBearerConfig IE, an RRCReconfiguration message, an RRCReconfiguration-IEs, a CellGroupConfig IE and/or MeasConfig IE conforming to 3GPP TS 38.331. In other implementations, the S-SN configuration includes an RRCConnectionReconfiguration message or RRCConnectionReconfiguration-IEs conforming to 3GPP TS 36.331. In still other implementations, the S-SN configuration includes configurations in the RadioBearerConfig IE, the CellGroupConfig IE, RRCReconfiguration-IEs, and/or or RRCConnectionReconfiguration-IEs. In some implementations, the S-SN configuration can include a S-DU configuration. The S-DU configuration can include multiple configuration parameters such as physical layer configuration parameters, MAC configuration parameters, RLC configuration parameters. The S-DU configuration can be CellGroupConfig IE or include configurations in ConfigPartSCG-r12 IE.

In some implementations, if the MN 104 is a gNB, the RRC container message message is an RRCReconfiguration message, and the RRC container response message is an RRCReconfigurationComplete message, respectively. In other implementations, if the MN 104 is an eNB or an ng-eNB, the RRC container message is an RRCConnectionReconfiguration message, and the RRC container response message is an RRCConnectionReconfigurationComplete message, respectively.

In some implementations, if the SN 106A is a gNB, the RRC reconfiguration and RRC reconfiguration complete messages are RRCReconfiguration and RRCReconfigurationComplete messages, respectively. In other implementations, if the SN 106A is an eNB or ng-eNB, the RRC reconfiguration and RRC reconfiguration complete messages are RRCConnectionReconfiguration and RRCConnectionReconfigurationComplete messages, respectively.

Figure 3B:
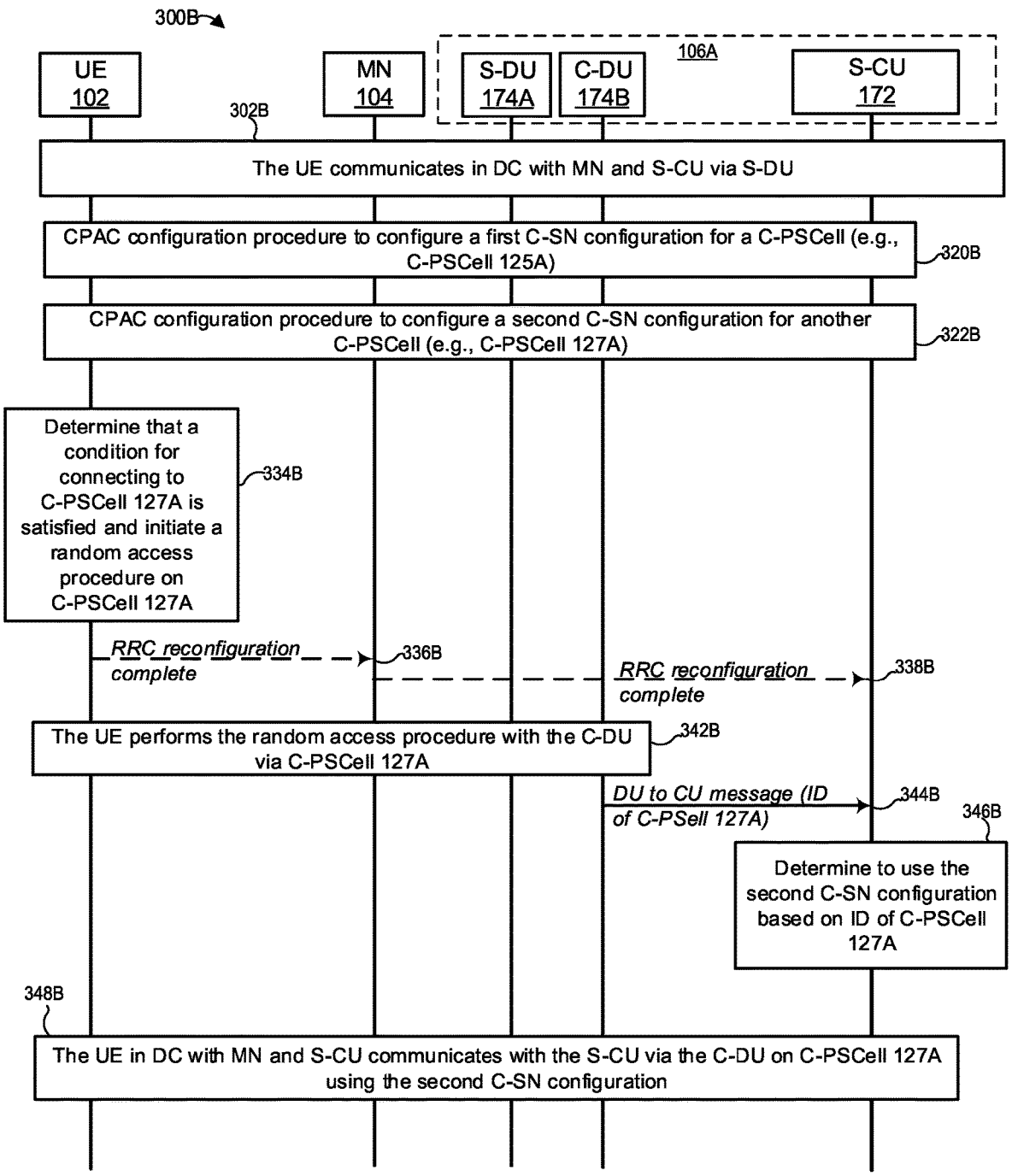
FIG. 3B is a messaging diagram of another example scenario in which a candidate DU (C-DU) sends an identity of a C-PSCell to a CU of an SN upon detecting that a UE connected to the C-PSCell, and the CU determines to use a particular C-SN configuration based on the identity of C-PSCell, in accordance with the techniques of this disclosure.

Now referring to FIG. 3B, a scenario 300B involves a CPAC without SN change, i.e., a conditional change of a PSCell of an SN when the UE is already in DC with the MN and SN. In this scenario, the base station 104 operates as an MN and the base station 106A operates as an SN that includes both a secondary CU (referred to here as S-CU 172), a secondary DU (referred to here as S-DU 174A) and a C-DU 174B. Events in this scenario similar to those discussed above are labeled with the same reference numbers and the examples and implementations for FIG. 3A can apply to FIG. 3B. The differences between the scenarios of FIG. 3A and FIG. 3B are discussed below.

In the scenario 300B, the UE 102 may not transmit the RRC reconfiguration complete message 336B or may transmit the 336B RRC reconfiguration complete message not including the identity of the C-PSCell 127A to the MN 104. After the C-DU 174B identifies the UE 102 during the random access procedure at event 342B, the C-DU 174 can transmit 344B a DU to CU message including the identity of the C-PSCell 127A to the S-CU 172 to indicate that the UE 102 is connected on the C-PSCell 127A, so that the S-CU 172 can determine 346B to use the second C-SN configuration (or the second C-DU configuration) as a new S-SN configuration (or as a new S-DU configuration) based on the identity of the C-PSCell 127A. In some implementations, the DU to CU message can be a F1AP message or a DL Data Delivery Status message. For example, the F1AP message can be a UL RRC Message Transfer message including a dummy RRC message or excluding an RRC message. In another example, the F1AP message can be a new F1AP message excluding an RRC message. In another example, the F1AP message can be a UL RRC Message Transfer message including an RRC container IE. The C-DU 174B can include a dummy or fake RRC message (i.e., an RRC message not received from the UE 102) in the RRC container IE. The C-DU 174B can include an indicator indicating ignoring (or discarding) the RRC container IE in the UL RRC Message Transfer message. The S-CU 172 ignores (or discard, does not use) the RRC container IE (i.e., the dummy or fake RRC message) in response to the indicator.

Because the S-CU 172 receives the identity of the C-PSCell 127A, the S-CU 172 does not select the first C-SN configuration (or the first C-DU configuration) for the C-PSCell 125A. Thus, the S-CU 172 does not use the first C-SN configuration to communicate with the UE 102 while the UE 102 connects to the C-DU 174B on the C-PSCell 127A, thereby avoiding a communication failure due to configuration mismatch.

Figure 3C:
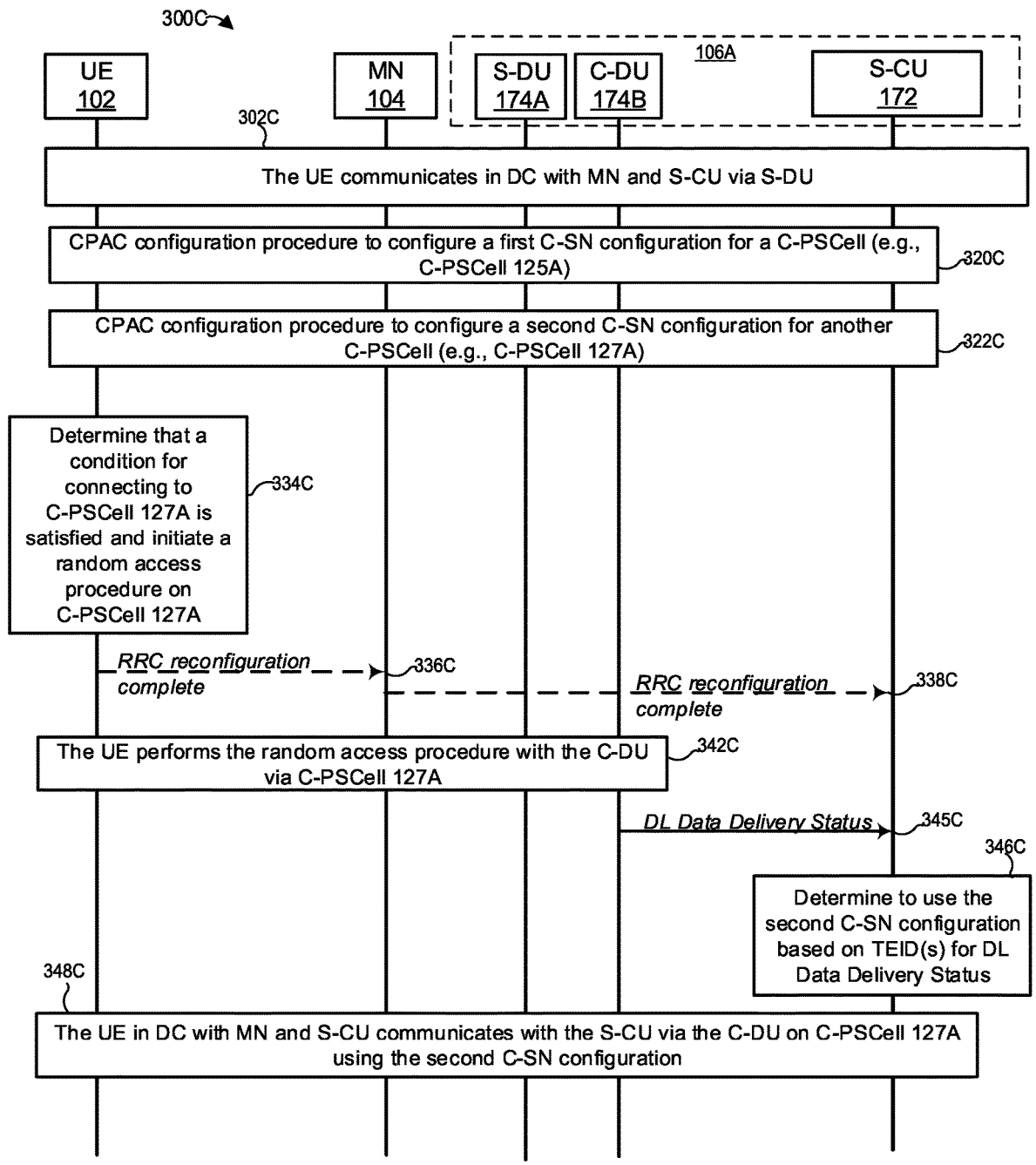
FIG. 3C is a messaging diagram of an example scenario in which a C-DU of an SN sends a DL Data Delivery Status message to a CU of an SN after detecting that a UE connected to the C-PSCell, and the CU determines to use a particular C-SN configuration based on tunnel endpoint identifier(s) (TEID(s)) for the DL Data Delivery Status message, in accordance with the techniques of this disclosure.

Now referring to FIG. 3C, a scenario 300C involves a CPAC without SN change, i.e., a conditional change of a PSCell of an SN when the UE is already in DC with the MN and SN. In this scenario, the base station 104 operates as an MN and the base station 106A operates as an SN that includes both a secondary CU (referred to here as S-CU 172), a secondary DU (referred to here as S-DU 174A) and a C-DU 174B. Events in this scenario similar to those discussed above are labeled with the same reference numbers and the examples and implementations for FIG. 3A can apply to FIG. 3C. The differences between the scenarios of FIG. 3C and FIGS. 3A-3B are discussed below.

In the scenario 300C, the UE 102 may not transmit the RRC reconfiguration complete message 336C or may transmit the 336C RRC reconfiguration complete message not including the identity of the C-PSCell 127A to the MN 104. After the C-DU 174B identifies the UE 102 during the random access procedure at event 342C, the C-DU 174 can send 345C a DL Data Delivery Status message to the S-CU 172. In some implementations, the C-DU 174 can send 345C a General Packet Radio Service (GPRS) Tunneling Protocol (GTP) packet including the DL Data Delivery Status message to the S-CU 172. The GTP packet can include one or more tunnel endpoint identifiers (TEID(s)). The TEID(s) can include at least one of (1) a TEID for the S-CU 172 endpoint of a F1 transport bearer for delivery of UL PDUs or (2) a TEID for the C-DU 174B endpoint of the F1 transport bearer for delivery of DL PDUs. The S-CU 172 can assign the TEID(s) with the C-DU 174B in a UE Context Setup procedure 306C. The S-CU 172 can assign a TEID for the S-CU 172 endpoint of a F1 transport bearer for delivery of UL PDUs in the UE Context Setup Request message. The C-DU 174B can assign a TEID for the C-DU 174B endpoint of the F1 transport bearer for delivery of DL PDUs in the UE Context Setup Response message in the UE Context Setup procedure 306C. The TEID(s) can be the same value or different values. The S-CU 172 can associate the TEID(s) with a C-DU configuration (obtained in the UE Context Setup procedure) and a C-CU configuration (if generated by the S-CU 172) so that the S-CU 172 can determine to use a particular C-SN configuration (or a particular C-DU configuration) as a new S-SN configuration (as a new S-DU configuration) based on the TEID(s) received in the GTP packet. In the scenario 300C, the S-CU 172 can determine 346C to use the second C-SN configuration (or the second C-DU configuration) as a new S-SN configuration (as a new S-DU configuration) based on the TEID(s) received in a GTP packet including the DL Data Delivery Status message 345C. The S-CU 172 can establish or store an association between particular TEID(s) and a particular C-SN configuration (or a particular C-DU configuration included in the particular C-SN configuration) so that the S-CU 172 can determine the particular C-SN configuration (or the particular C-DU configuration) based on the particular TEID(s) received in a GTP packet including a DL Data Delivery Status message. For example, the S-CU 172 can establish particular TEID(s) and a particular C-SN configuration (or a particular C-DU configuration included in the C-SN configuration) after performing a UE Context Setup procedure (or a UE Context Modification procedure) with the C-DU 174B (or S-DU 174A) to obtain a C-DU configuration for a candidate cell. The S-CU 172 can also associate an identity of a particular candidate cell (e.g., C-PSCell 125A or C-PSCell 127A) with the particular C-SN configuration (or the particular C-DU configuration included in the particular C-SN configuration) as described for FIG. 3A. Thus, the S-CU 172 can establish or store an association between the identity of the particular candidate cell, the particular TEID(s), and the particular C-SN configuration (or the particular C-DU configuration included in the particular C-SN configuration). The S-CU 172 can determine the identity of the particular candidate cell based on the TEID(s) received in the GTP packet including the DL Data Delivery Status message. The S-CU 172 can send the identity of the particular candidate cell to the MN 104 as described above.

For example, in the UE Context Setup procedure in the CPAC configuration 320C, the S-CU 172 can assign a first TEID for the S-CU 172 endpoint of a F1 transport bearer for delivery of UL PDUs in the UE Context Setup Request message. The C-DU 174B can assign a second TEID for the C-DU 174B endpoint of the F1 transport bearer for delivery of DL PDUs in the UE Context Setup Response message in the UE Context Setup procedure 306C. The first and second TEIDs can be the same or different. The S-CU 172 associates the first C-SN configuration (or the C-DU configuration) with the first and/or second TEIDs. In the UE Context Setup procedure in the CPAC configuration 322C, the S-CU 172 can assign a third TEID for the S-CU 172 endpoint of a F1 transport bearer for delivery of UL PDUs in the UE Context Setup Request message. The C-DU 174B can assign a fourth TEID for the C-DU 174B endpoint of the F1 transport bearer for delivery of DL PDUs in the UE Context Setup Response message in the UE Context Setup procedure 306C. The third and fourth TEIDs can be the same or different and are different from the first and second TEIDs. The S-CU 172 associates the first C-SN configuration (or the C-DU configuration) with the third and/or fourth TEIDs.

The C-DU 174B includes the third and/or the fourth TEIDs in the GTP packet including the DL Data Delivery Status message and transmits 345C the GTP packet to the S-CU 172, the S-CU 172 can determine to use the second C-SN configuration (or the second C-DU configuration) as a new S-SN configuration (as a new S-DU configuration) from the third and/or the fourth TEIDs received in the GTP packet.

Based on the TEID(s) in the GTP packet including the DL Data Delivery Status message 345C, the S-CU 172 does not select the first CU configuration for the C-PSCell 125A. Thus, the S-CU 172 does not use the first CU configuration for the C-PSCell 125A to communicate with the UE 102 while the UE 102 connects to the C-DU 174B on the C-PSCell 127A, thereby avoiding a communication failure due to configuration mismatch.

Figure 3D:
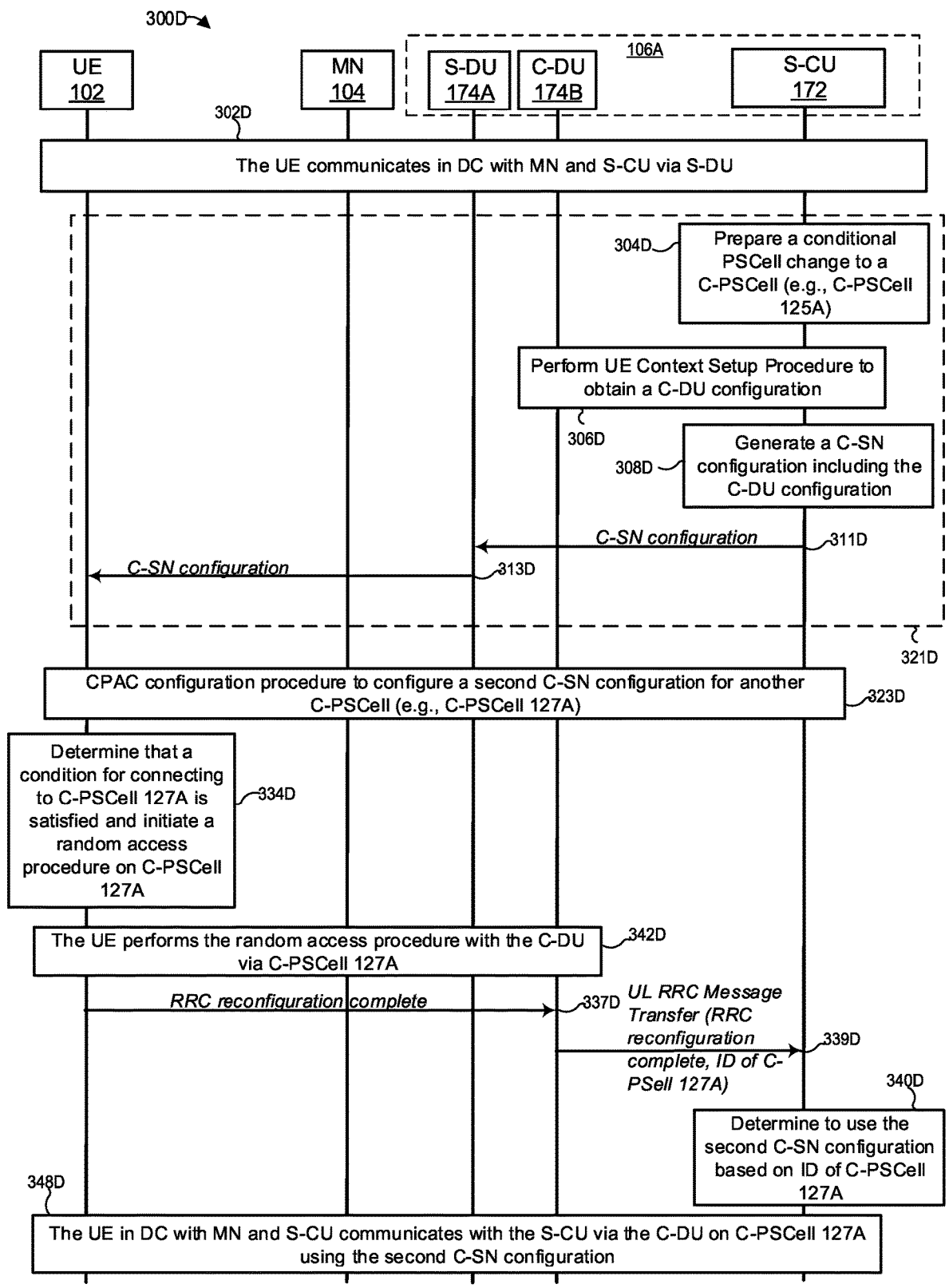
FIG. 3D is a messaging diagram of an example scenario in which a C-DU of an SN sends an identity of a C-PSCell to a CU of an SN upon detecting that a UE connected to the C-PSCell, and the CU determines to use a particular C-SN configuration based on the identity of C-PSCell, in accordance with the techniques of this disclosure.

Now referring to FIG. 3D, a scenario 300D involves a CPAC without SN change, i.e., a conditional change of a PSCell of an SN when the UE is already in DC with the MN and SN. In this scenario, the base station 104 operates as an MN and the base station 106A operates as an SN that includes both a secondary CU (referred to here as S-CU 172), a secondary DU (referred to here as S-DU 174A) and a C-DU 174B. Events in this scenario similar to those discussed above are labeled with the same reference numbers and the examples and implementations for FIG. 3A can apply to FIG. 3D. The differences between the scenarios of FIG. 3D and FIG. 3A are discussed below.

The CPAC configuration procedure 321D is generally similar to the CPAC configuration procedure 320A of FIG. 3A. However, in the scenario 300D the S-CU 172 sends 311D the first C-SN configuration to the S-DU 174A, which in turn transmits 313D the first C-SN configuration to the UE 102, rather than transmitting the first C-SN configuration to the UE 102 via the MN 104, as the S-CU 172 does in the scenario 300A of FIG. 3A. In some implementations, the S-CU 172 configures a first SRB for the UE 102 via the MN 104 and transmits the first C-SN configuration via the first SRB to the UE 102 via the S-DU 174A. For example, the SN 106A transmits an SRB configuration configuring the first SRB (e.g., SRB3) to the MN 104, and the MN 104 transmits the SRB configuration to the UE via a second SRB (e.g., SRB1) between the MN 104 and the UE 102.

In some implementations, the S-CU 172 can generate an RRC reconfiguration message including the first C-SN configuration and send 311D, 313D the RRC reconfiguration message on the first SRB via the S-DU 174A. In one implementation, the S-CU 172 can send 311D a F1AP message (e.g., DL RRC Message Transfer message, UE Context Modification Request message, etc.) including the RRC reconfiguration message to the S-DU 174A. In some implementations, the UE 102 can transmit an RRC reconfiguration complete message on the first SRB to the S-DU 174A in response to the RRC reconfiguration message. In turn, the S-DU 174A sends the RRC reconfiguration complete message to the S-CU 172. In one implementation, the S-DU 174A can send a F1AP message (e.g., UL RRC Message Transfer message, UE Context Modification Response message, etc.) including the RRC reconfiguration complete message to the S-CU 172.

The S-CU 172, in some implementations, can perform 323D the CPAC configuration procedure with the C-DU 174B, the S-DU 174A, and the UE 102 to configure the UE 102 a second C-SN configuration including a second C-DU configuration for another C-PSCell (e.g., C-PSCell 127A operated by the C-DU 174B), similar to the CPAC configuration procedure 321D. In other implementations, the S-CU 172 can perform 323D the CPAC configuration procedure with the S-DU 174A and the UE 102 to configure the UE 102 a second C-SN configuration including a second C-DU configuration for another C-PSCell (e.g., C-PSCell 127A operated by the S-DU 174A), similar to the CPAC configuration procedure 321D. In these implementations, the S-CU 172 may perform a UE Context Modification procedure with the S-DU 174A to obtain a second C-DU configuration instead of the UE Context Setup procedure. In the UE Context Modification procedure, the S-CU 172 can send a UE Context Modification Request message to the S-DU 174A, similar to the UE Context Setup Request message and the S-DU 174A responds with a UE Context Modification Response message including a second DU configuration. In these implementations, event 342D and 348D would occur between the UE 102 and the S-DU 174A. The S-CU 172 can perform the CPAC configuration procedures 323D in parallel with or after the CPAC configuration procedure 321D.

Later in time, the UE 102 determines (or detects) 334D that a condition for connecting to a C-PSCell 127A is met and initiates a random access procedure on the C-PSCell 127A in response to the detection. For convenience, this discussion may refer to the condition or a configuration in the singular, but it will be understood that there may be multiple conditions, and that the RRC reconfiguration message generated by the S-CU 172 can include one or multiple configuration parameters to specify the condition or the multiple conditions.

In response to the determination 334D, the UE 102 then performs 342D a random access procedure with the C-DU 174B via the C-PSCell 127A, e.g., using one or more random access configurations in the second C-DU configuration. If the UE 102 successfully completes the random access procedure (e.g., succeeds the contention resolution in the random access procedure), the UE 102 communicates 348D with the C-DU 174 via the C-PSCell 127A using the second C-DU configuration and communicates with the S-CU 172 via the C-DU 174 using the second CU configuration. In some implementations, the UE 102 may disconnect from the PSCell 126A to perform the random access procedure, i.e., to connect the C-PSCell 127A. In other implementations, the UE 102 does not disconnect from the PSCell 126A while performing the random access procedure. If the C-DU 174B identifies the UE 102 in the random access procedure, the C-DU 174B becomes an S-DU 174B and communicates 348D with the UE 102 via the C-PSCell 127A. The S-DU 174B can send a message (e.g., a DL Data Delivery Status message as in FIG. 3C) to indicate to the S-CU 172 that the UE 102 is connected, after or response to identifying the UE 102 in the random access procedure. Later on, if the S-CU 172 initiates an immediate DU change from the S-DU 174B to a DU of the S-CU 172 (e.g., the DU 174A or another DU not shown in FIG. 3D), the S-CU 172 can send the second C-SN configuration (i.e., the new S-SN configuration) or the second C-DU configuration (e.g., the new S-DU configuration) to the DU. Later on, if the S-CU 172 initiates an immediate SN change to the base station 106B or the MN 104 requests the latest SN configuration, the S-CU 172 can send the second C-SN configuration to the MN 104.

During or after the random access procedure, the UE 102 transmits 337D an RRC reconfiguration complete message to the C-DU 174B, which in turn sends 339D a UL RRC Message Transfer message including the RRC reconfiguration complete message and the identity of the C-PSCell 127A to the S-CU 172. The S-CU 172 determines 340C to use the second C-SN configuration (or the second C-DU configuration) as a new S-SN configuration (as a new S-DU configuration) based on the identity of the C-PSCell 127A. In one implementation, the UE 102 may not include the identity of the C-PSCell 127A in the RRC reconfiguration complete message 337D.

In some implementations, the random access procedure can be a four-step random access procedure or a two-step random access procedure. The UE 102 can include a UE ID and the RRC reconfiguration complete message 337D in a Message A and transmit the Message A to the C-DU 174B in the two-step random access procedure. In other implementations, the random access procedure can be a contention-based random access procedure or a contention-free random access procedure. In the contention-based random access procedure, the UE 102 can include a UE ID and the RRC reconfiguration complete message 337D in a Message 3 and transmit the Message 3 to the C-DU 174B. The C-DU 174B can assign the UE ID in the second DU configuration. The UE ID can be a C-RNTI. In the contention-free random access procedure, the UE 102 can transmit a dedicated preamble to the C-DU 174B. The C-DU 174B can assign the dedicated preamble in the second DU configuration. The C-DU 174B can assign the UE ID in the second DU configuration. If the C-DU 174B receives the UE ID or the dedicated preamble, the C-DU 174B identifies the UE 102. After the UE 102 successfully completes 342D the random access procedure (e.g., succeeds the contention resolution in the random access procedure), the C-PSCell 127A begins to operate as the PSCell 127A, and the UE 102 begins to operate 348D in DC with the MN 104 via the PCell 124 and the SN 106A via the PSCell 127A. In particular, the UE 102 communicates 348D with the SN 106A via the C-PSCell 127A (i.e., new PSCell 127A) in accordance with the second C-SN configuration.

In some implementations, before the event 337D, the UE 102 can transmit an RRC message (e.g., RRC reconfiguration complete message, UEAssistanceInformation message or ULInformationTransferMRDC message) including the identity of the C-PSCell 127A to the MN 104, which in turn sends the identity of the C-PSCell 127A to the S-CU 172. In one implementation, the MN 104 can send an SN message (e.g., an SN Reconfiguration Complete message, an SN Modification Request message, or an RRC Transfer message) including the identity of the C-PSCell 127A or the RRC message to the S-CU 172. In such implementations, the C-DU 174B may not include the identity of the C-PSCell 127A in the UL RRC Message Transfer message at event 339D.

Because the S-CU 172 receives the identity of the C-PSCell 127A, the S-CU 172 does not select the first C-SN configuration (or the first C-DU configuration) for the C-PSCell 125A. Thus, the S-CU 172 does not use the first C-SN configuration to communicate with the UE 102 while the UE 102 connects to the C-DU 174B on the C-PSCell 127A, thereby avoiding a communication failure due to configuration mismatch.

Figure 3E:
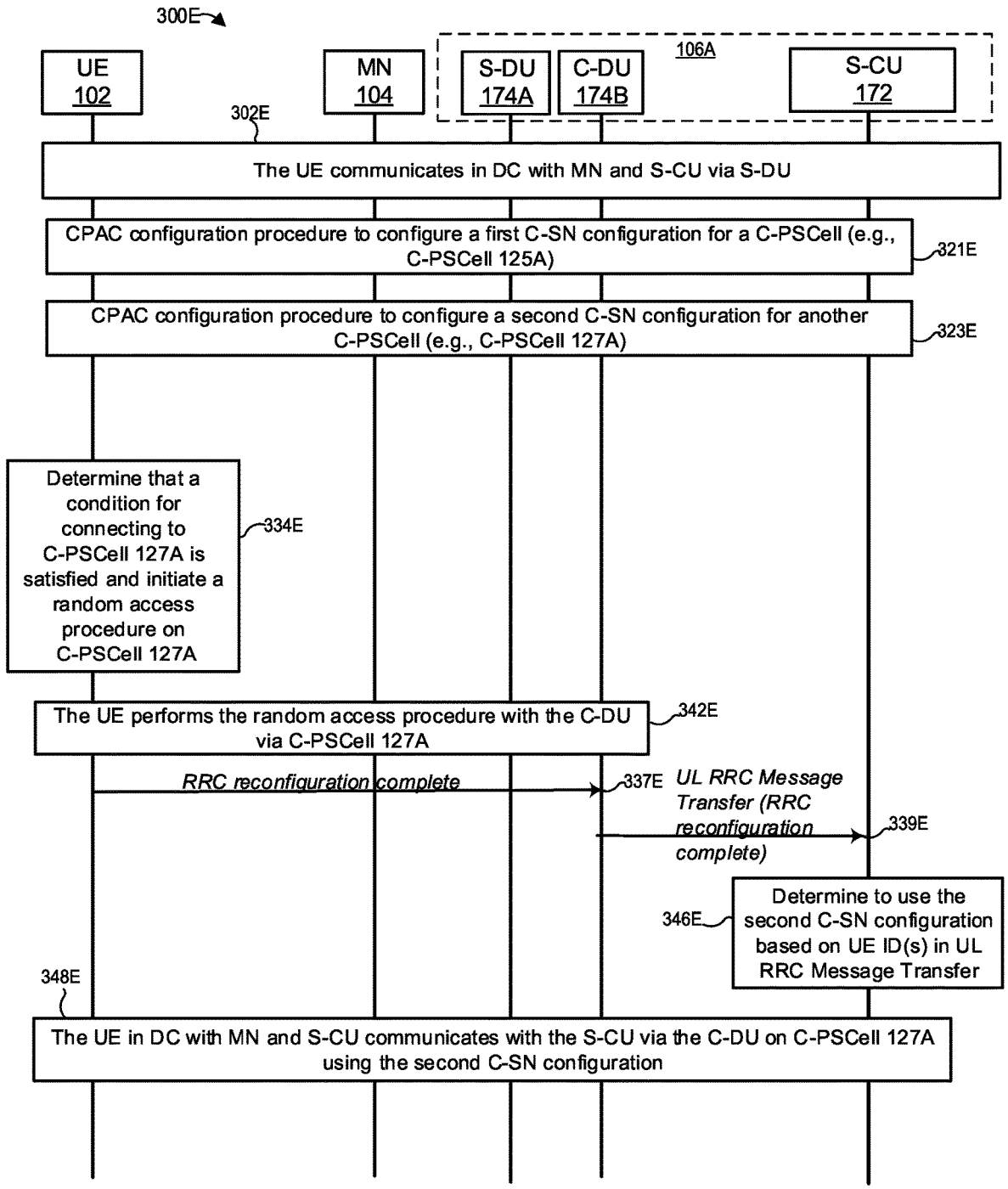
FIG. 3E is a messaging diagram of an example scenario in which a C-DU of an SN sends a UL RRC Message Transfer message to a CU of an SN after detecting that a UE connected to the C-PSCell, and the CU determines to use a particular C-SN configuration based on UE ID(s) in the UL RRC Message Transfer message, in accordance with the techniques of this disclosure.

Now referring to FIG. 3E, a scenario 300E involves a CPAC without SN change, i.e., a conditional change of a PSCell of an SN when the UE is already in DC with the MN and SN. In this scenario, the base station 104 operates as an MN and the base station 106A operates as an SN that includes both a secondary CU (referred to here as S-CU 172), a secondary DU (referred to here as S-DU 174A) and a C-DU 174B. Events in this scenario similar to those discussed above are labeled with the same reference numbers and the examples and implementations for FIGS. 3A and 3D can apply to FIG. 3E. The differences between the scenarios of FIG. 3E and FIGS. 3A and 3D are discussed below.

Unlike the event 339D, the C-DU 174B does not include the identity of the C-PSCell 127A in the UL RRC Message Transfer message at event 339E. The S-CU 172 can determine to use a particular C-SN configuration (or a particular C-DU configuration) as a new S-SN configuration (as a new S-DU configuration) based on one or more UE ID(s) included in a UL RRC Message Transfer message. In the scenario, the S-CU 172 determines 346E to use the second C-SN configuration (or the second C-DU configuration) as a new S-SN configuration (as a new S-DU configuration) based on the UE ID(s) included in the UL RRC Message Transfer message 339E.

In some implementations, the UE ID(s) can include UE F1AP ID(s) which can include at least one of a CU F1AP ID and a DU F1AP ID. The S-CU 172 can include a CU F1AP ID in a UE Context Setup Request message and the C-DU 174B can include a DU F1AP ID in a UE Context Setup Response message. For example, the S-CU 172 can include a first CU F1AP ID in the UE Context Setup Request message in the CPAC configuration procedure 321E and include a second CU F1AP ID in the UE Context Setup Request message in the CPAC configuration procedure 323E. In another example, the C-DU 174B can include a first DU F1AP ID in the UE Context Setup Response message in the CPAC configuration procedure 321E and include a second DU F1AP ID in the UE Context Setup Response message in the CPAC configuration procedure 323E. Thus, the S-CU 172 can associate the first CU UE F1AP ID and/or the first DU F1AP ID to the first C-SN configuration (or the first C-DU configuration) and associate the second CU UE F1AP ID and/or the second DU F1AP ID to the second C-SN configuration (or the second C-DU configuration), respectively. After the C-DU 174B identifies the UE 102 in the random access procedure on the C-PSCell 127A, the C-DU 174B can include the second CU UE F1AP ID and/or the second DU UE F1AP ID in the UL RRC Message Transfer message 339E. Thus, the S-CU 172 determines 346E to use the second C-SN configuration (or the second C-DU configuration) based on the second CU UE F1AP ID and/or the second DU UE F1AP ID in the UL RRC Message Transfer message 339E.

As described above, the S-CU 172 can establish or store an association between particular UE ID(s) and a particular C-SN configuration (or a particular C-DU configuration included in the particular C-SN configuration) so that the S-CU 172 can determine the particular C-SN configuration (or the particular C-DU configuration) based on the particular UE ID(s) received in a UL RRC Message Transfer message. For example, the S-CU 172 can establish particular UE ID(s) and a particular C-SN configuration (or a particular C-DU configuration included in the C-SN configuration) after performing a UE Context Setup procedure with the C-DU 174B to obtain a C-DU configuration for a candidate cell. The S-CU 172 can also associate an identity of a particular candidate cell (e.g., C-PSCell 125A or C-PSCell 127A) with the particular C-SN configuration (or the particular C-DU configuration included in the particular C-SN configuration) as described for FIG. 3A. Thus, the S-CU 172 can establish or store an association between the identity of the particular candidate cell, the particular UE ID(s), and the particular C-SN configuration (or the particular C-DU configuration included in the particular C-SN configuration). The S-CU 172 can determine the identity of the particular candidate cell based on the UE ID(s) received in the GTP packet including the DL Data Delivery Status message. The S-CU 172 can send the identity of the particular candidate cell to the MN 104 as described above.

In other implementations, the UE ID can include a C-RNTI. The C-DU 174B can include a first C-RNTI in the UE Context Setup Response message or the first C-DU configuration in the CPAC configuration procedure 321E, and include a second C-RNTI in the UE Context Setup Response message or the second C-DU configuration in the CPAC configuration procedure 323E. Thus, the S-CU 172 can obtain the first and second C-RNTIs from the UE Context Setup Response messages, and associate the first and second RNTIs to the first C-SN configuration (or the first C-DU configuration) and second C-SN configuration (or the second C-DU configuration), respectively. After the C-DU 174B identifies the UE 102 in the random access procedure on the C-PSCell 127A, the C-DU 174B can include the second C-RNTI in the UL RRC Message Transfer message 339E. Thus, the S-CU 172 determines 346E to use the second C-SN configuration (or the second C-DU configuration) from the second C-RNTI in the UL RRC Message Transfer message 339E.

Based on the UE ID(s) in the UL RRC Message Transfer message, the S-CU 172 does not select the first C-SN configuration (or first C-DU configuration) for the C-PSCell 125A. The S-CU 172 does not use the first C-SN configuration to communicate with the UE 102 while the UE 102 connects to the C-DU 174B on the C-PSCell 127A, thereby avoiding a communication failure due to configuration mismatch.

Figure 3F:
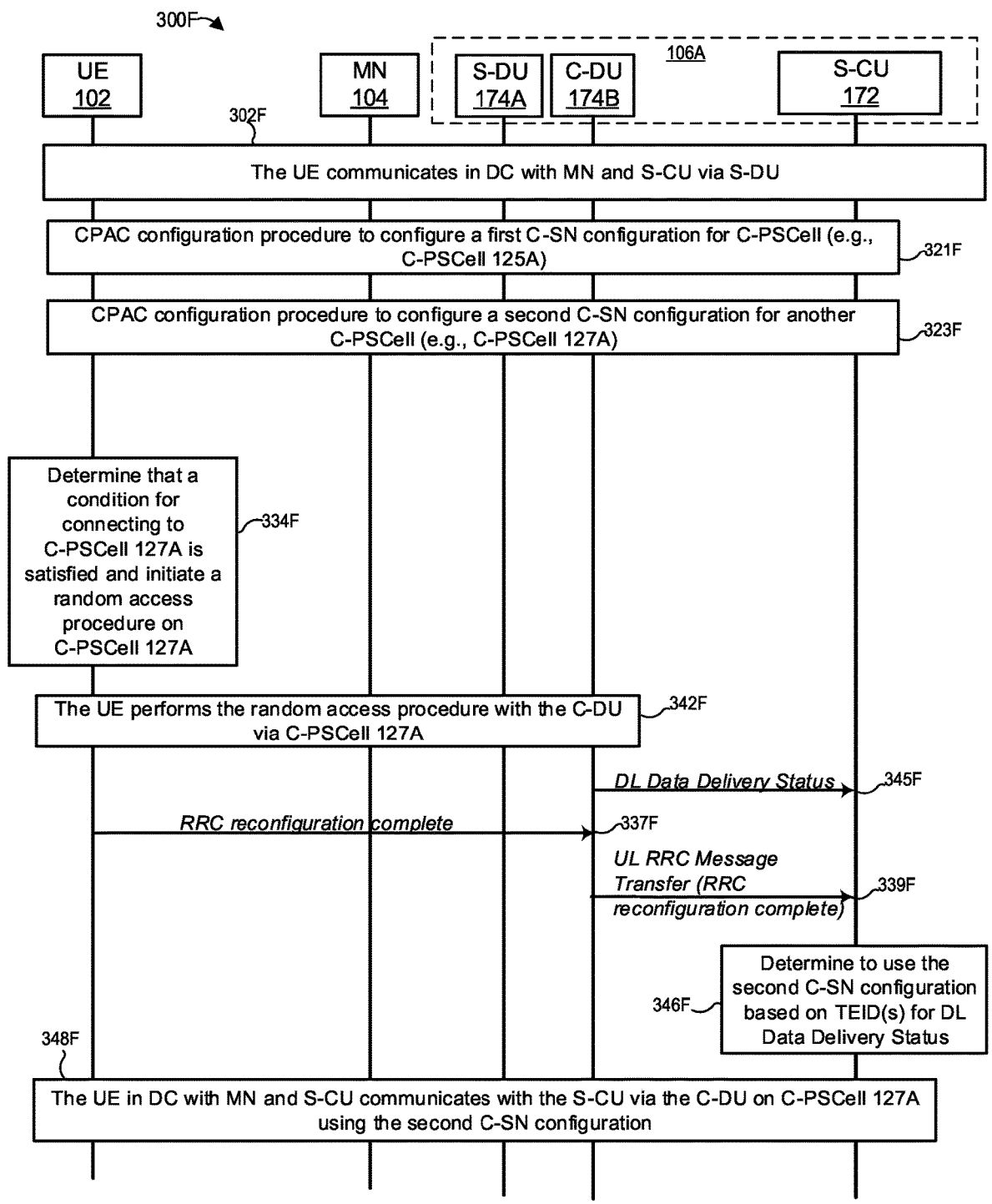
FIG. 3F is a messaging diagram of an example scenario in which a C-DU of an SN sends a DL Data Delivery Status message to a CU of an SN after detecting that a UE connected to the C-PSCell, and the CU determines to use a particular C-SN configuration based on TEID(s) for the DL Data Delivery Status message, in accordance with the techniques of this disclosure.

Now referring to FIG. 3F, a scenario 300F involves a CPAC without SN change, i.e., a conditional change of a PSCell of an SN when the UE is already in DC with the MN and SN. In this scenario, the base station 104 operates as an MN and the base station 106A operates as an SN that includes both a secondary CU (referred to here as S-CU 172), a secondary DU (referred to here as S-DU 174A) and a C-DU 174B. Events in this scenario similar to those discussed above are labeled with the same reference numbers and the examples and implementations for FIGS. 3C and 3D can apply to FIG. 3F.

In the scenario 300F, after the C-DU 174B identifies the UE 102 during the random access procedure at event 342F, the C-DU 174B can send 345F a DL Data Delivery Status message to the S-CU 172 (similar to event 345C). Similar to event 346C, the S-CU 172 determines 346F to use the second C-SN configuration based on TEID(s) for the DL Data Delivery Status message received at event 345F.

Several example scenarios involving CSAC are discussed next with reference to FIGS. 4A-C.

Figure 4A:
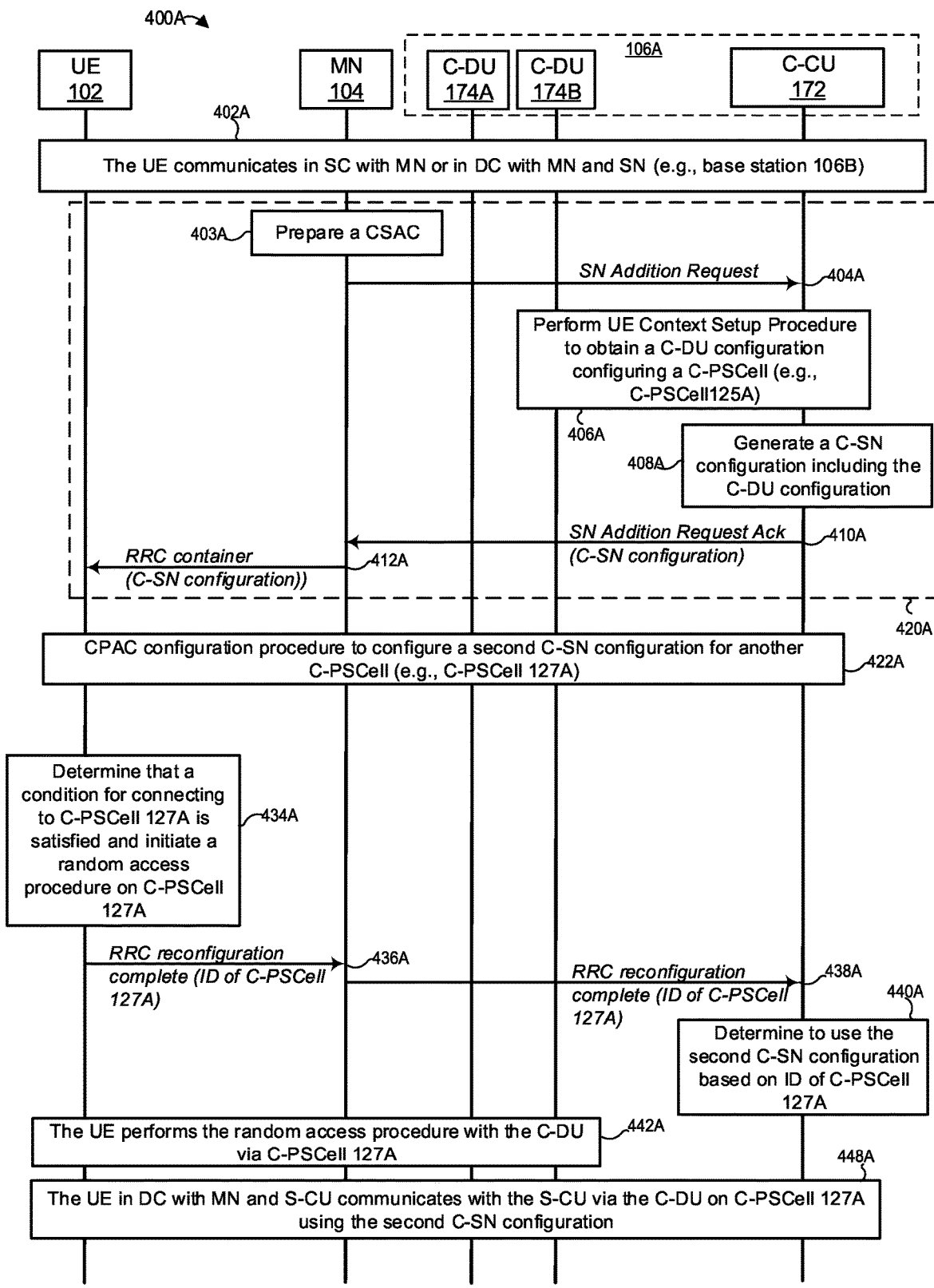
FIG. 4A is a messaging diagram of an example scenario in which a UE in single connectivity (SC) or DC sends an identity of a C-PSCell to a CU of an SN via an MN, and the CU determines to use a particular C-SN configuration based on the identity of the C-PSCell, in accordance with the techniques of this disclosure.

Referring first to a scenario 400A of FIG. 4A, which involves a CSAC, i.e., a conditional addition of a C-PSCell of a C-SN when the UE is in SC with the MN, or a conditional change of a PSCell of an SN to a C-PSCell of a C-SN when the UE is already in DC with the MN and SN (e.g., base station 106B). In this scenario, the base station 104 operates as an MN and the base station 106A operates as an SN that includes both a C-CU (referred to here as C-CU 172) and a C-DU 174B. At the beginning of this scenario, the UE 102 communicates 402A UL PDUs and/or DL PDUs in SC with the MN 104 (via a PCell 124) or in DC with the MN 104 (via a PCell 124) and SN 106B (via a PCell 126B). Events 406A, 408A, 434A, 436A, 438A, 440A, 442A and 448A are similar to events 306A, 308A, 334A, 336A, 338A, 340A, 342A and 348A. The description, examples and implementations for FIG. 3A can apply to FIG. 4A. The differences between the scenarios of FIG. 3A and FIG. 4A are discussed below.

The MN 104 at some point determines 403A that it should initiate a CSAC procedure to configure the base station 106A as a C-SN for the UE 102. The MN 104 can make this determination based on one or more measurement results received from the UE 102 or based on a Conditional SN Change Required message from SN 106B, for example, or another suitable event. In response to this determination, the MN 104 sends 404A an SN Addition Request message to the C-CU 172 to initiate a conditional SN Addition procedure. In response to receiving 404A the SN Addition Request message, the C-CU 172 performs a UE Context Setup procedure with the C-DU 174B to obtain a first C-DU configuration for configuring a C-PSCell (e.g. C-PSCell 125A), similar to the UE Context Setup procedure 306A. The C-CU 172 generates 408A a first C-SN configuration including the first C-DU configuration and includes the first C-SN configuration in an SN Addition Request Acknowledge message for the UE 102. The SN 106A then sends 410A the SN Addition Request Acknowledge message to the MN 104, in response to the SN Addition Request message. The first C-SN configuration included in this message can include one or more configuration parameters for the C-PSCell 125A. In turn, the MN 104 transmits 412A an RRC container message including the first C-SN configuration to the UE 102. The events 403A, 404A, 406A, 408A, 410A and 412A are collectively referred to in FIG. 4A as the CSAC configuration procedure 420A.

In some implementations, the UE 102 can transmit an RRC container response message to the MN 104 in response to the RRC container message. In one implementation, the MN 104 can generate an RRC reconfiguration message including the first C-SN configuration, include the RRC reconfiguration message in the RRC container message and send 412A the RRC container message to the UE 102.

The C-CU 172 can perform 422A the CSAC configuration procedure with the C-DU 174B and the UE 102 to configure the UE 102 a second C-SN configuration including a second C-DU configuration for another C-PSCell (e.g., C-PSCell 127A), similar to the CSAC configuration procedure 420A. The C-CU 172 can perform the CSAC configuration procedure 422A in parallel with or after the CSAC configuration procedure 420A.

Later in time, the UE 102 determines (or detects) 434A that a condition for connecting to a C-PSCell 127A is met and initiates a random access procedure on the C-PSCell 127A in response to the detection. For convenience, this discussion may refer to the condition or a configuration in the singular, but it will be understood that there may be multiple conditions, and that the RRC reconfiguration message generated by the MN 104 can include one or multiple configuration parameters to specify the condition or the multiple conditions.

In response to the determination 434A, the UE 102 transmits 436A an RRC reconfiguration complete message including an identity of the C-PSCell 127A to the MN 104, which in turn sends 438A the RRC reconfiguration complete message to the C-CU 172. In some implementations, the UE 102 can include frequency information (e.g., absolute radio-frequency channel number and/or frequency band number) of the C-PSCell 127A in the RRC reconfiguration message 436A. The C-CU 172 determines to use the second C-SN configuration (or the second C-DU configuration) as a new SN configuration (as a new S-DU configuration) based on the identity of the C-PSCell 127A. In one implementation, the MN 104 can send 438A an SN message (e.g., an SN Reconfiguration Complete message, a SN Modification Request message, or an RRC Transfer message) including the RRC reconfiguration complete message to the C-CU 172. Alternatively, the MN 104 obtains the identity of the C-PSCell 127A and optionally the frequency information (if included) from the RRC reconfiguration message, includes the identity of the C-PSCell 127A and the frequency information (if included) in at least one IE and sends an SN message (e.g., an SN Reconfiguration Complete message, an SN Modification Request message, or an RRC Transfer message) including the at least one IE to the S-CU 172. In another implementation, the RRC reconfiguration message 436A may be transparent to the MN 104 so that the C-CU 172 can send the MN 104 one or more SN messages (e.g., SN Modification Required message, SN configuration update message, SN information update message, etc.) including the identity of the C-PSCell 127A and optionally the frequency information (if received or derived by the C-CU 172 based on the identity of the C-PSCell 127A).

In some implementations, the UE 102 can generate an RRC container message (e.g., ULInformationTransfer-MRDC message) including the RRC reconfiguration complete message and transmit 436A the RRC container message to the MN 104. The MN 104 in turn extracts the RRC reconfiguration complete message from the RRC container message and sends 438A the RRC reconfiguration complete message to the C-CU 172. In one implementation, the UE 102 can include the identity of the C-PSCell 127A and optionally include the frequency information in the RRC container message. In other implementations, the UE 102 can generate an RRC container response message (similar to the RRC container message described above) including the RRC reconfiguration complete message and transmit 436A the RRC container response message to the MN 104. The MN 104 in turn extracts the RRC reconfiguration complete message from the RRC container response message and sends 438A the RRC reconfiguration complete message to the C-CU 172. In another implementation, the UE 102 can include the identity of the C-PSCell 127A and optionally include the frequency information in the RRC container response message.

If the C-DU 174B identifies the UE 102 in the random access procedure, the C-CU 172, the C-DU 174B and the C-PSCell 127A become an S-CU 172, an S-DU 174B, and an PSCell 127A, respectively. The S-DU 174B communicates 448A with the UE 102 via the PSCell 127A using the S-DU configuration after identifying the UE 102. The S-DU 174B can send a message (e.g., a DL Data Delivery Status message in FIG. 3C) to indicate to the S-CU 172 that the UE 102 is connected, after or response to identifying the UE 102 in the random access procedure. Later on, if the S-CU 172 initiates an immediate DU change from the S-DU 174B to a DU of the S-CU 172 (e.g., the DU 174A or another DU not shown in FIG. 4A), the S-CU 172 can send the second C-SN configuration (i.e., the new SN configuration) or the second C-DU configuration (e.g., the new S-DU configuration) to the DU. Later on, if the S-CU 172 initiates immediate SN change to another base station (e.g., the base station 106B or a base station not shown in FIG. 1A) or is requested by the MN 104 to provide the latest SN configuration, the S-CU 172 can send the second C-SN configuration to the MN 104.

Because the C-CU 172 receives the identity of the C-PS-Cell 127A, the C-CU 172 does not select the first C-SN configuration (or the first C-DU configuration) for the C-PS-Cell 125A. Thus, the C-CU 172 does not use the first C-SN configuration to communicate with the UE 102 while the UE 102 connects to the C-DU 174B on the C-PSCell 127A, thereby avoiding a communication failure due to configuration mismatch.

Figure 4B:
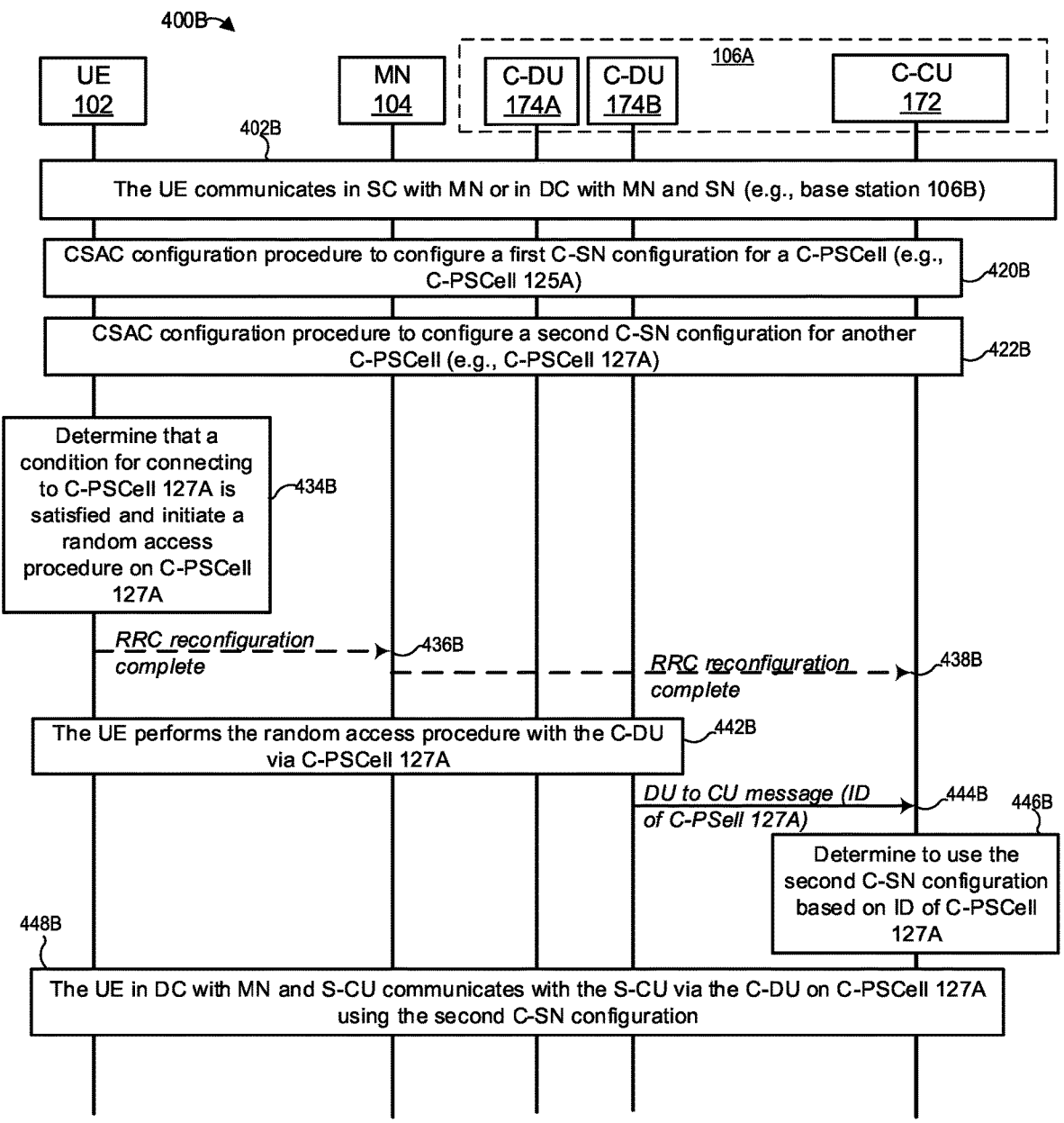
FIG. 4B is a messaging diagram of an example scenario in which a C-DU of an SN sends an identity of a C-PSCell to a CU of the SN upon detecting that a UE connected to the C-PSCell, and a CU of the SN determines to use a particular C-SN configuration based on the identity of the C-PSCell, in accordance with the techniques of this disclosure.

Now referring to FIG. 4B, a scenario 400B involves a CSAC, i.e., a conditional addition of a C-PSCell of a C-SN when the UE is in SC with the MN, or a conditional change of a PSCell of an SN to a C-PSCell of a C-SN when the UE is already in DC with the MN and SN (e.g., base station 106B). In this scenario, the base station 104 operates as an MN and the base station 106A operates as an SN that includes both a C-CU (referred to here as C-CU 172) and a C-DU 174B. Events in this scenario similar to those discussed above are labeled with the same reference numbers. Events 406B, 408B, 434B, 436B, 438B, 440B, 442B, 444B and 448B are similar to events 306B, 308B, 334B, 336B, 338B, 340A, 342B, 344B and 348B. The description, examples and implementations for FIGS. 4A and 3B can apply to FIG. 4B. The differences between the scenarios of FIG. 4B and FIG. 4A are discussed below.

In the scenario 400B, the UE 102 may not transmit the RRC reconfiguration complete message 436B or may transmit the 436B RRC reconfiguration complete message not including the identity of the C-PSCell 127A to the MN 104. After the C-DU 174B identifies the UE 102 during the random access procedure at event 442B, the C-DU 174 can transmit 444B a DU to CU message including the identity of the C-PSCell 127A to the S-CU 172 to indicate that the UE 102 is connected on the C-PSCell 127A, so that the S-CU 172 can determine to use the second C-SN configuration (or the second C-DU configuration) as a new S-SN configuration (as a new S-DU configuration) based on the identity of the C-PSCell 127A. In some implementations, the DU to CU message can be a F1AP message or a DL Data Delivery Status message. For example, the F1AP message can be a UL RRC Message Transfer message including a dummy RRC message or excluding an RRC message. In another example, the FLAP message can be a new F1AP message excluding an RRC message. In another example, the F1AP message can be a UL RRC Message Transfer message including an RRC container IE. The C-DU 174B can include a dummy or fake RRC message (i.e., an RRC message not received from the UE 102) in the RRC container IE. The C-DU 174B can include an indicator indicating ignoring (or discarding) the RRC container IE in the UL RRC Message Transfer message. The C-CU 172 ignores (or discard, does not use) the RRC container IE (i.e., the dummy or fake RRC message) in response to the indicator.

Because of the receives the C-PSCell 127A, the C-CU 172 does not select the first C-SN configuration (or the first C-DU configuration) for the C-PSCell 125A. Thus, the C-CU 172 does not use the first C-SN configuration to communicate with the UE 102 while the UE 102 connects to the C-DU 174B on the C-PSCell 127A, thereby avoiding a communication failure due to configuration mismatch.

Figure 4C:
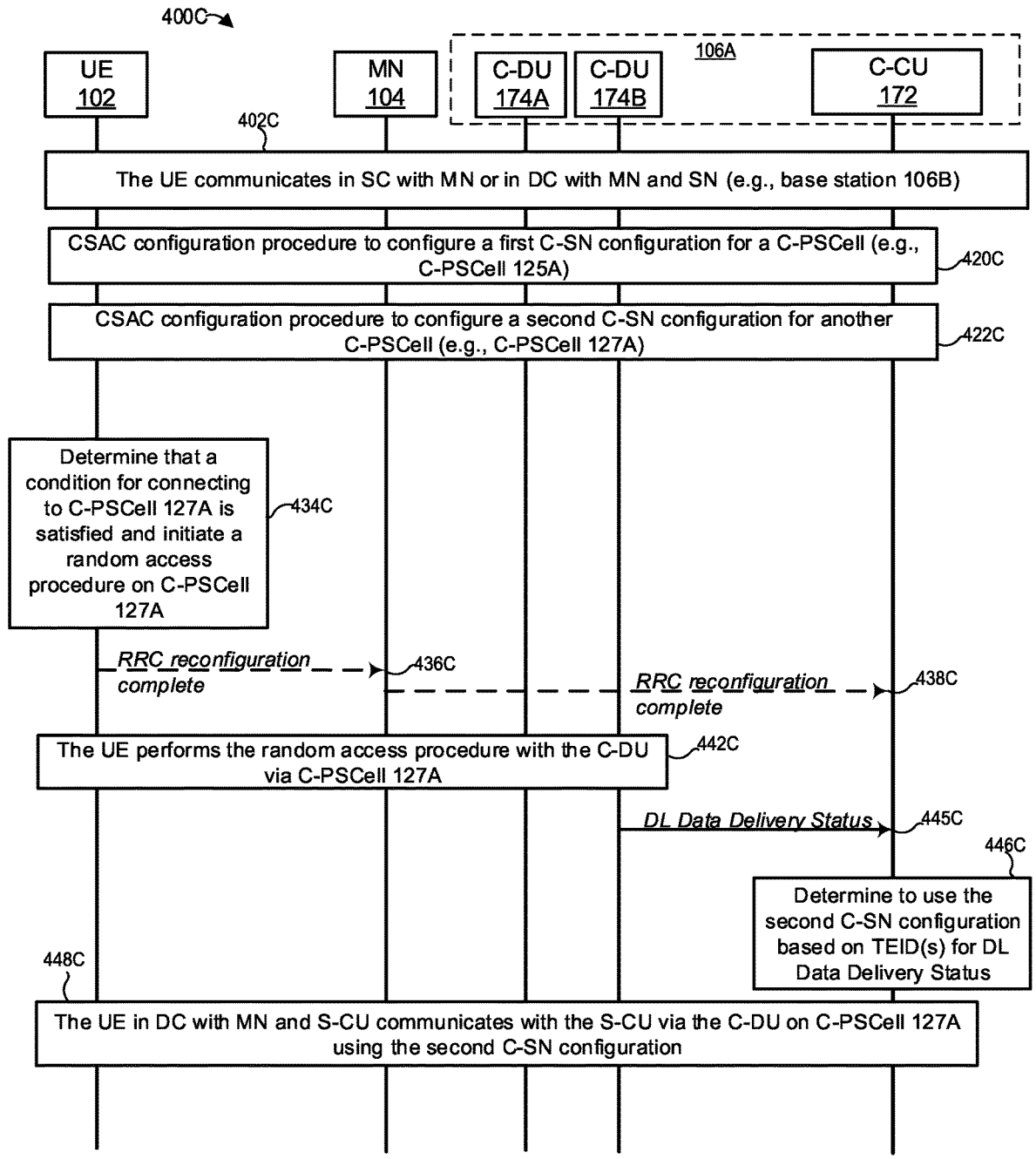
FIG. 4C is a messaging diagram of an example scenario in which a C-DU of an SN sends a DL Data Delivery Status message to a CU of an SN after detecting that a UE in SC or DC connected to the C-PSCell, and the CU determines to use a particular C-SN configuration based on TEID(s) for the DL Data Delivery Status message, in accordance with the techniques of this disclosure.

Now referring to FIG. 4C, a scenario 400C involves a CSAC, i.e., a conditional addition of a C-PSCell of a C-SN when the UE is in SC with the MN, or a conditional change of a PSCell of an SN to a C-PSCell of a C-SN when the UE is already in DC with the MN and SN (e.g., base station 106B). In this scenario, the base station 104 operates as an MN and the base station 106A operates as an SN that includes both a C-CU (referred to here as C-CU 172) and a C-DU 174B. Events in this scenario similar to those discussed above are labeled with the same reference numbers. Events 406C, 408C, 434C, 436C, 438C, 440C, 442C, 445C and 448C are similar to events 306C, 308C, 334C, 336C, 338C, 340C, 342C, 345C and 348C. The description, examples and implementations for FIGS. 4A and 3C can apply to FIG. 4C. The differences between the scenarios of FIG. 4C and FIG. 4A are discussed below.

In the scenario 400C, the UE 102 may not transmit the RRC reconfiguration complete message 436C or may transmit the 436C RRC reconfiguration complete message not including the identity of the C-PSCell 127A to the MN 104. After the C-DU 174B identifies the UE 102 during the random access procedure at event 442C, the C-DU 174B can send 445C a DL Data Delivery Status message to the C-CU 172. Similar to events 346C and 346F, the C-CU 172 determines 446C to use the second C-SN configuration based on TEID(s) for the DL Data Delivery Status message received at event 445C.

Several example scenarios involving CPAC or CSAC are discussed next with reference to FIGS. 5A-5C. Several example scenarios involving CPAC are also discussed with reference to FIGS. 5D-5F.

Figure 5A:
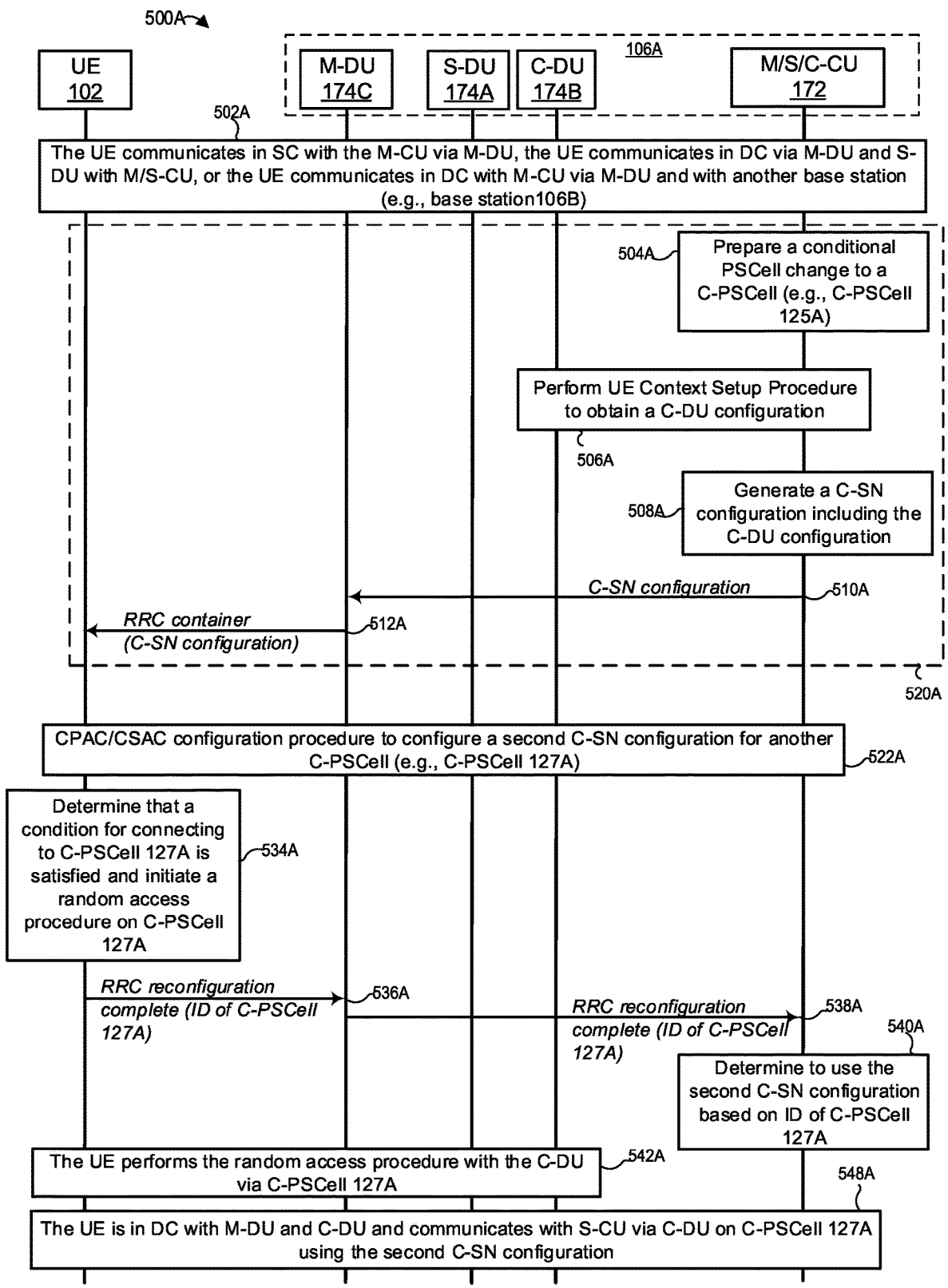
FIG. 5A is a messaging diagram of an example scenario in which a UE in SC or DC transmits an identity of a C-PSCell to a CU of an SN via an MN, and the CU determines to use a particular C-SN configuration based on the identity of the C-PSCell, in accordance with the techniques of this disclosure.

Referring first to a scenario 500A of FIG. 5A, which involves a CPAC, or a CSAC, i.e., a conditional addition of a C-PSCell of a C-SN when the UE is in SC with the MN, a conditional change of a PSCell of an SN to a C-PSCell of a C-SN when the UE is already in DC with the MN and SN (e.g., base station 106B). In this scenario, the base station 106A operates as an MN that includes a CU 172 (operated as a master CU (M-CU) 172) and a master DU (M-DU) 174C, and the base station 106A can operate as a C-SN that includes the CU 172 (operated as a S-CU 172) and a C-DU 174B. Alternatively, the base station 106A can operate as an SN that includes the CU 172 (operated as a S-CU 172), a C-DU 174B and a S-DU 174A.

At the beginning of this scenario, the UE 102 communicates 502A UL PDUs and/or DL PDUs in SC with the MN 106A (via a PCell 126A) or in DC with the MN 106A (via a PCell 126A) and SN 106A (via a PSCell not shown in FIG. 1A). In cases where the UE 102 is in DC with the MN 106A and the SN 106A, events 504A, 506A, 508A, 510A, 512A, 522A, 534A, 536A, 538A, 542A and 548A are similar to events 304A, 306A, 308A, 310A, 312A, 322A, 334A, 336A, 338A, 340A, 342A and 348A. In cases where the UE 102 is in SC with the MN 106A or in DC with the MN 106A and another base station (e.g., the base station 106B), event 504A is similar to event 304A, and events 506A, 508A, 510A, 512A, 522A, 534A, 536A, 538A, 542A and 548A are similar to events 406A, 408A, 410A, 412A, 422A, 434A, 436A, 438A, 440A, 442A and 448A. The description, examples and implementations for FIGS. 3A and 4A can apply to FIG. 5A. The differences between the scenarios of FIG. 5A and FIGS. 3A and 4A are discussed below.

In the scenario 500A, the M/S-CU 172 at some point determines 504A that it should prepare a conditional PSCell change to a C-PSCell (e.g., C-PSCell 125A) operated by the C-DU 174B for the UE 102. The M/S-CU 172 can make this determination based on one or more measurement results received from the UE 102 or based on a Conditional SN Change Required message from SN 106B, for example, or another suitable event. In response to this determination, the M/S-CU 172 performs a UE Context Setup procedure with the C-DU 174B to obtain a first C-DU configuration for configuring a C-PSCell (e.g. C-PSCell 125A), similar to the UE Context Setup procedure 306A. The first C-DU configuration can include one or more configuration parameters for communication on the C-PSCell 125A. The M/S-CU 172 generates 508A a first C-SN configuration including the first C-DU configuration. After generating the first C-SN configuration, the M/S-CU 172 sends 510A the first C-SN configuration to the M-DU 174C, which in turn transmits 512A an RRC container message including the first C-SN configuration to the UE 102. If the UE 102 is in DC with the MN 106A and the SN 106A, the events 504A, 506A, 508A, 510A and 512A can be collectively referred to in FIG. 5A as the CPAC configuration procedure 520A, similar to the CPAC configuration procedure 320A. If the UE 102 is in SC with the MN 106A or in DC with the MN 106A and the SN 106B, the events 504A, 506A, 508A, 510A and 512A can be collectively referred to in FIG. 5A as the CSAC configuration procedure 520A, similar to the CSAC configuration procedure 420A.

If the UE 102 is in DC with the MN 106A and the SN 106A, the S-CU 172, in some implementations, can generate an RRC reconfiguration message including the first C-SN configuration. Then, the M-CU 172 can include the RRC reconfiguration message in the RRC container message and send 510A a F1 application protocol (F1AP) message (e.g., DL RRC Message Transfer message, UE Context Modification Request message, UE Context Setup Request message, etc.) including the RRC container message to the M-DU 174C. In turn, the M-DU 174C transmits 512A the RRC container message to the UE 102. The M-DU 174C may send a F1AP response message (e.g., UE Context Modification Response message, UE Context Setup Response message, etc.) to the M-CU 172 in response to the F1AP message (e.g., UE Context Modification Request message, UE Context Setup Request message, etc.).

If the UE 102 is in SC with the MN 106A or in DC with the MN 106A and the SN 106B, the C-CU 172, in some implementations, can generate an RRC reconfiguration message including the first C-SN configuration. Then, the M-CU 172 can include the RRC reconfiguration message in the RRC container message and send 510A a F1 application protocol (F1AP) message (e.g., DL RRC Message Transfer message, UE Context Modification Request message, UE Context Setup Request message, etc.) including the RRC container message to the M-DU 174C. In turn, the M-DU 174C transmits 512A the RRC container message to the UE 102. The M-DU 174C may send a F1AP response message (e.g., UE Context Modification Response message, UE Context Setup Response message, etc.) to the M-CU 172 in response to the F1AP message (e.g., UE Context Modification Request message, UE Context Setup Request message, etc.).

If the UE 102 is in DC with the MN 106A and the SN 106A, the S-CU 172 can perform 522A the CPAC configuration procedure with the C-DU 174B and the UE 102 to configure the UE 102 a second C-SN configuration including a second C-DU configuration for another C-PSCell (e.g., C-PSCell 127A), similar to the CPAC configuration procedure 322A. The S-CU 172 can perform the CPAC configuration procedure 522A in parallel with or after the CPAC configuration procedure 520A. In other implementations, the S-CU 172 can perform 522A the CPAC configuration procedure with the S-DU 174A and the UE 102 to configure the UE 102 a second C-SN configuration including a second C-DU configuration for another C-PSCell (e.g., C-PSCell 127A operated by the S-DU 174A), similar to the CPAC configuration procedure 520A.

If the UE 102 is in SC with the MN 106A or in DC with the MN 106A and the SN 106B, the M-CU 172 can perform 522A the CSAC configuration procedure with the C-DU 174B and the UE 102 to configure the UE 102 a second C-SN configuration including a second C-DU configuration for another C-PSCell (e.g., C-PSCell 127A), similar to the CSAC configuration procedure 422A. The M-CU 172 can perform the CSAC configuration procedure 522A in parallel with or after the CSAC configuration procedure 520A.

Later in time, the UE 102 determines (or detects) 534A that a condition for connecting to a C-PSCell 127A is met and initiates a random access procedure on the C-PSCell 127A in response to the detection. For convenience, this discussion may refer to the condition or a configuration in the singular, but it will be understood that there may be multiple conditions, and that the RRC reconfiguration message generated by the CU 172 can include one or multiple configuration parameters to specify the condition or the multiple conditions.

In response to the determination 534A, the UE 102 transmits 536A an RRC reconfiguration complete message including an identity of the C-PSCell 127A to the M-DU 174C, which in turn sends 538A the RRC reconfiguration complete message to the M/S/C-CU 172. In some implementations, the UE 102 can include frequency information (e.g., absolute radio-frequency channel number and/or frequency band number) of the C-PSCell 127A in the RRC reconfiguration message 536A. The S/C-CU 172 determines 540A to use the second C-SN configuration (or the second C-DU configuration) as a new SN configuration (as a new S-DU configuration) based on the identity of the C-PSCell 127A.

In some implementations, the UE 102 can generate an RRC container message (e.g., ULInformationTransfer-MRDC message) including the RRC reconfiguration complete message and transmit 536A the RRC container message to the M-DU 174C, which in turn sends 538A the RRC container message to the M/S/C-CU 172. In one implementation, the UE 102 can include the identity of the C-PSCell 127A and optionally include the frequency information in the RRC container message. In other implementations, the UE 102 can generate an RRC container response message (similar to the RRC container message described above) including the RRC reconfiguration complete message and transmit 536A the RRC container response message to the M-DU 174C, which in turn sends 538A the RRC container message to the M/S/C-CU 172. In one implementation, the UE 102 can include the identity of the C-PSCell 127A and optionally include the frequency information in the RRC container response message.

Because the S/C-CU 172 receives the identity of the C-PSCell 127A, the S/C-CU 172 does not select the first C-SN configuration (or the first C-DU configuration) for the C-PSCell 125A. Thus, the S/C-CU 172 does not use the first C-SN configuration for the C-PSCell 125A to communicate with the UE 102 while the UE 102 connects to the C-DU 174B on the C-PSCell 127A, thereby avoiding a communication failure due to configuration mismatch.

Figure 5B:
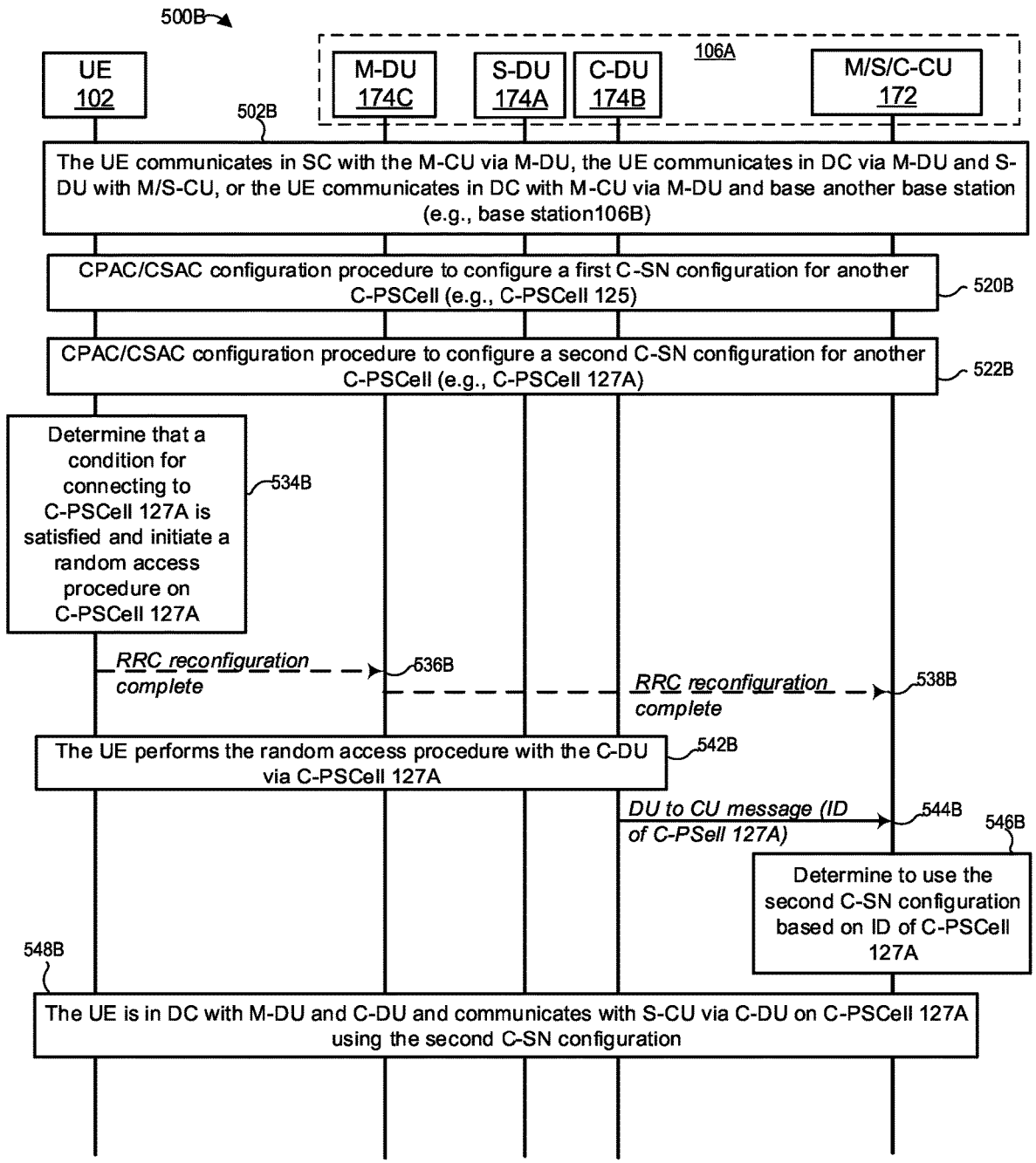
FIG. 5B is a messaging diagram of an example scenario in which a C-DU sends an identity of a C-PSCell to a CU of an SN upon detecting that a UE in SC or DC connected to the C-PSCell, and the SN determines to use a particular C-SN configuration based on the identity of the C-PSCell, in accordance with the techniques of this disclosure.

Now referring to FIG. 5B, a scenario 500B involves a CPAC, or a CSAC, i.e., a conditional addition of a C-PSCell of a C-SN when the UE is in SC with the MN, a conditional change of a PSCell of an SN to a C-PSCell of a C-SN when the UE is already in DC with the MN and SN (e.g., base station 106B). In this scenario, the base station 106A operates as an MN that includes a CU 172 (operated as a master CU (M-CU) 172) and a master DU (M-DU) 174C, and the base station 106A can operate as a C-SN that includes the CU 172 (operated as a S-CU 172) and a C-DU 174B. Alternatively, the base station 106A can operate as an SN that includes the CU 172 (operated as a S-CU 172), a C-DU 174B and a S-DU 174A. Events in this scenario similar to those discussed above are labeled with the same reference numbers. The description, examples and implementations for FIG. 5A and FIG. 3B can apply to FIG. 5B. The differences between the scenarios of FIG. 5B and FIG. 5A are discussed below.

In the scenario 500B, the UE 102 may not transmit the RRC reconfiguration complete message 536B or may transmit the 536B RRC reconfiguration complete message not including the identity of the C-PSCell 127A to the MN 106A (i.e., to the M-CU 172 via the M-DU 174C).

After the C-DU 174B identifies the UE 102 during the random access procedure at event 542B, the C-DU 174 can transmit 544B a DU to CU message including the identity of the C-PSCell 127A to the S/C-CU 172 to indicate that the UE 102 is connected on the C-PSCell 127A, so that the S/C-CU 172 can determine 546B to use the second C-SN configuration (or the second C-DU configuration) as a new S-SN configuration (as a new S-DU configuration) based on the identity of the C-PSCell 127A. In some implementations, the DU to CU message can be a FLAP message or a DL Data Delivery Status message. For example, the F1AP message can be a UL RRC Message Transfer message including a dummy RRC message or excluding an RRC message. In another example, the F1AP message can be a new F1AP message excluding an RRC message. In another example, the F1AP message can be a UL RRC Message Transfer message including an RRC container IE. The C-DU 174B can include a dummy RRC message or a fake RRC message (i.e., an RRC message not received from the UE 102) in the RRC container IE. The C-DU 174B can include an indicator indicating ignoring (or discarding) the RRC container in the UL RRC Message Transfer message. The C-CU 172 ignores (or discard, does not use) the RRC container IE (i.e., the dummy or fake RRC message) in response to the indicator.

Because the S/C-CU 172 receives the identity of the C-PSCell 127A, the S/C-CU 172 does not select the first C-SN configuration (or the first C-DU configuration) for the C-PSCell 125A. Thus, the S/C-CU 172 does not use the first C-SN configuration to communicate with the UE 102 while the UE 102 connects to the C-DU 174B on the C-PSCell 127A, thereby avoiding communication failure due to configuration mismatch.

Figure 5C:
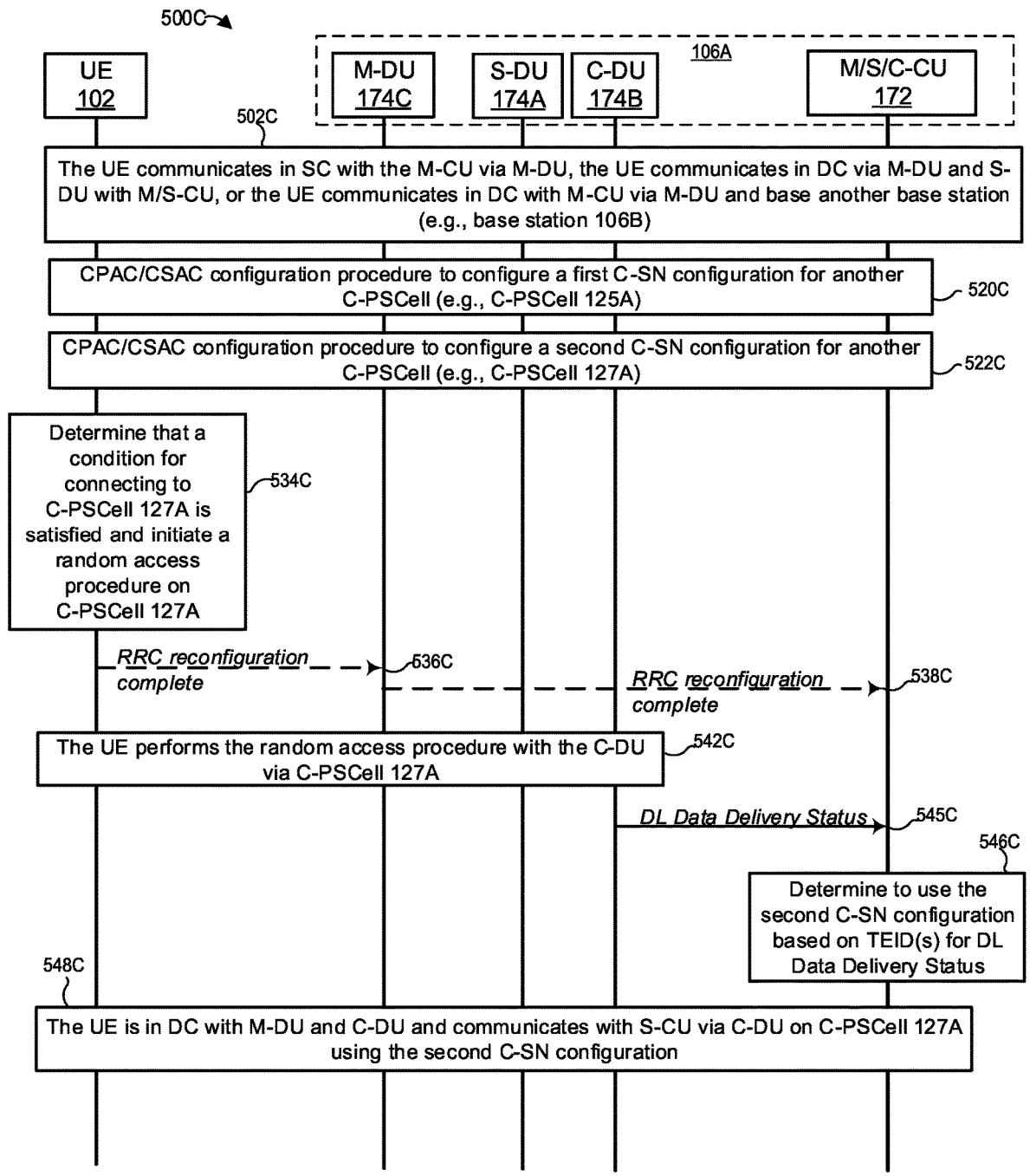
FIG. 5C is a messaging diagram of an example scenario in which a C-DU of an SN sends a DL Data Delivery Status message to a CU of an SN after detecting that a UE in SC or DC connected to the C-PSCell, and the CU determines to use a particular C-SN configuration based on TEID(s) for the DL Data Delivery Status message, in accordance with the techniques of this disclosure.

Now referring to FIG. 5C, a scenario 500C involves a CPAC, or a CSAC, i.e., a conditional addition of a C-PSCell of a C-SN when the UE is in SC with the MN, a conditional change of a PSCell of an SN to a C-PSCell of a C-SN when the UE is already in DC with the MN and SN (e.g., base station 106B). In this scenario, the base station 106A operates as an MN that includes a CU 172 (operated as a master CU (M-CU) 172) and a master DU (M-DU) 174C, and the base station 106A can operate as a C-SN that includes the CU 172 (operated as a S-CU 172) and a C-DU 174B. Alternatively, the base station 106A can operate as an SN that includes the CU 172 (operated as a S-CU 172), a C-DU 174B and a S-DU 174A. Events in this scenario similar to those discussed above are labeled with the same reference numbers. The description, examples and implementations for FIG. 5A and FIG. 3C can apply to FIG. 5C. The differences between the scenarios of FIG. 5C and FIG. 5A are discussed below.

In the scenario 500C, the UE 102 may not transmit the RRC reconfiguration complete message 536C or may transmit the 536C RRC reconfiguration complete message not including the identity of the C-PSCell 127A to the MN 106A (i.e., to the M-CU 172 via the M-DU 174C). The S/C-CU 172 receives 545C a DL Data Delivery Status message from the C-DU 174B, and determines 546C to use the second C-SN configuration based on TEID(s) for the DL Data Delivery Status message.

Figure 5D:
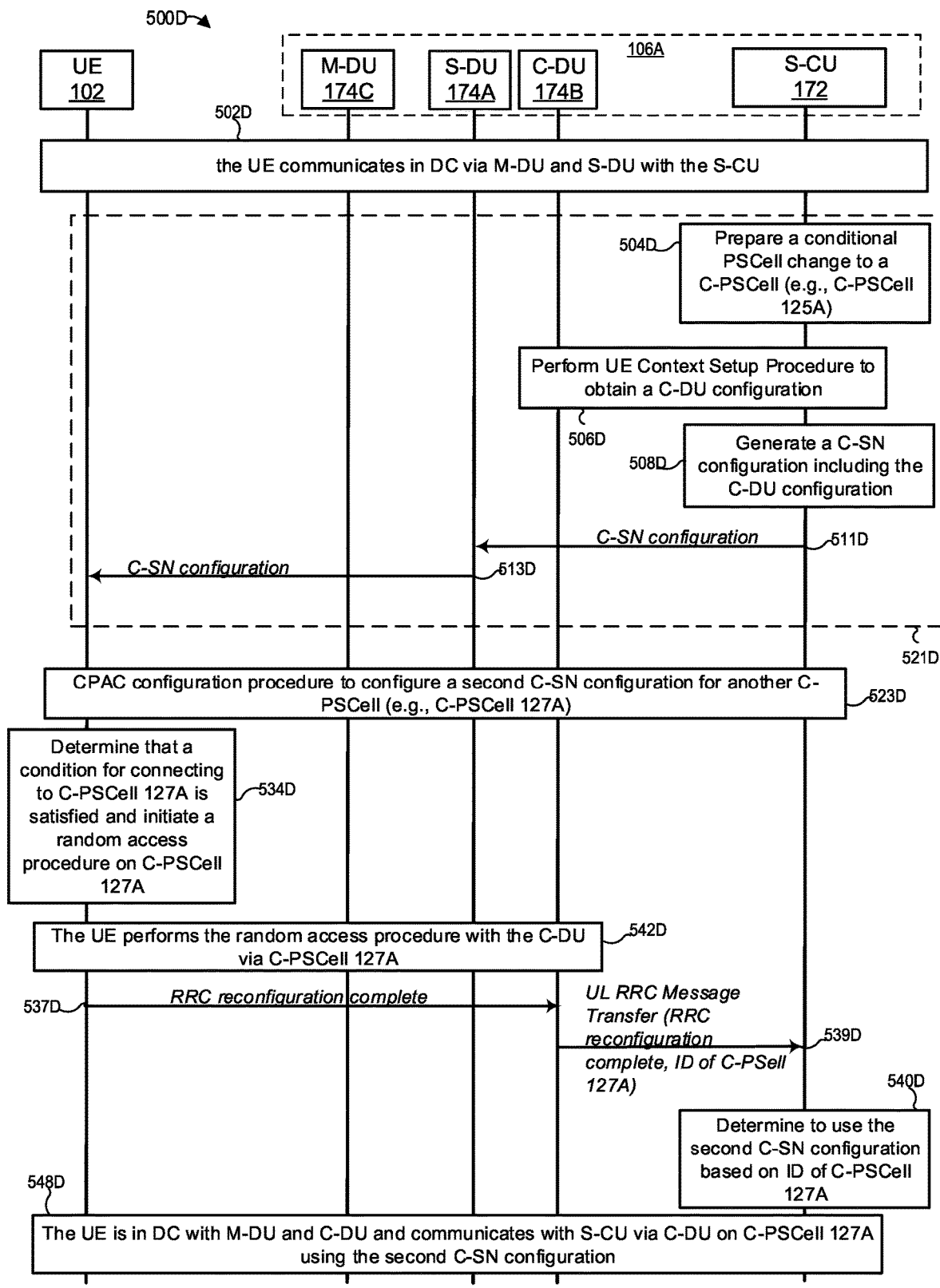
FIG. 5D is a messaging diagram of an example scenario in which a C-DU of an SN sends an identity of a C-PSCell to a CU of an SN upon detecting that a UE in DC connected to the C-PSCell, and the CU determines to use a particular C-SN configuration based on the identity of the C-PSCell, in accordance with the techniques of this disclosure.

Now referring to FIG. 5D, a scenario 500D involves a CPAC, i.e., a conditional addition of a C-PSCell of an SN when the UE is already in DC with the MN and SN. In this scenario, the base station 106A operates as an MN that includes a CU 172 (operated as a master CU (M-CU) 172) and a master DU (M-DU) 174C, and the base station 106A can operate as an SN that includes the CU 172 (operated as a S-CU 172), a C-DU 174B and a S-DU 174A. Events in this scenario similar to those discussed above are labeled with the same reference numbers. Events 504D, 506D, 508D, 511D, 513D, 523D, 534D, 542D, 537D, 539D, 540D, 548D are similar to events 304D, 306D, 308D, 311D, 313D, 323D, 334D, 342D, 337D, 339D, 340D, 348D. The description, examples and implementations for FIG. 5A and FIG. 3D can apply to FIG. 5D.

Figure 5E:
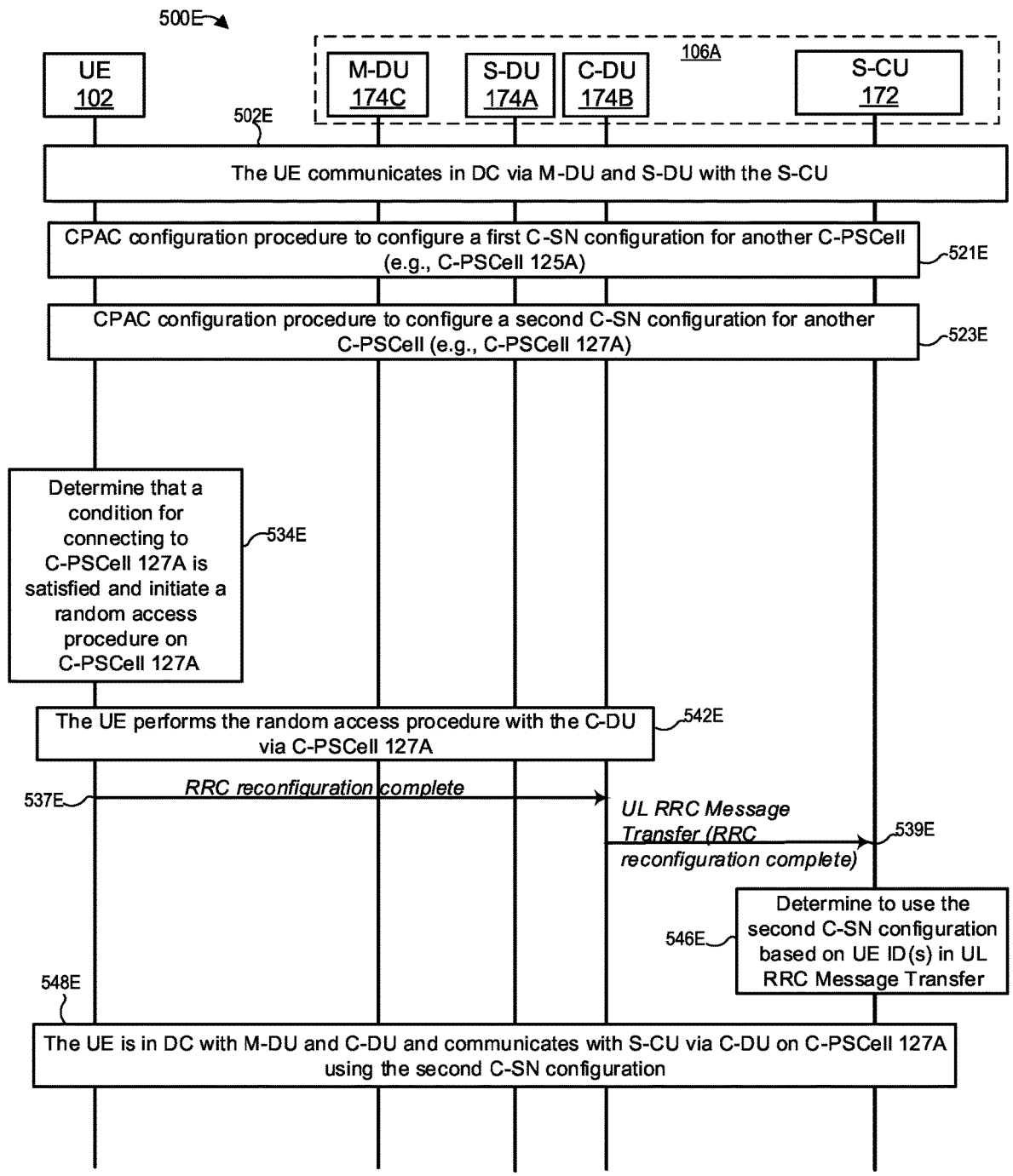
FIG. 5E is a messaging diagram of an example scenario in which a C-DU of an SN sends a UL RRC Message Transfer message to a CU of an SN after detecting that a UE in DC connected to the C-PSCell, and the CU determines to use a particular C-SN configuration based on UE ID(s) included in the UL RRC Message Transfer message, in accordance with the techniques of this disclosure.

Now referring to FIG. 5E, a scenario 500E involves a CPAC, i.e., a conditional addition of a C-PSCell of an SN when the UE is already in DC with the MN and SN. In this scenario, the base station 106A operates as an MN that includes a CU 172 (operated as a master CU (M-CU) 172) and a master DU (M-DU) 174C, and the base station 106A can operate as an SN that includes the CU 172 (operated as a S-CU 172), a C-DU 174B and a S-DU 174A. Events in this scenario similar to those discussed above are labeled with the same reference numbers. Events 521E, 523E, 534E, 542E, 537E, 539E, 546E, 548E are similar to events 321E, 323E, 334E, 342E, 337E, 339E, 346E, 348E. The description, examples and implementations for FIG. 5A and FIG. 3E can apply to FIG. 5E.

Figure 5F:
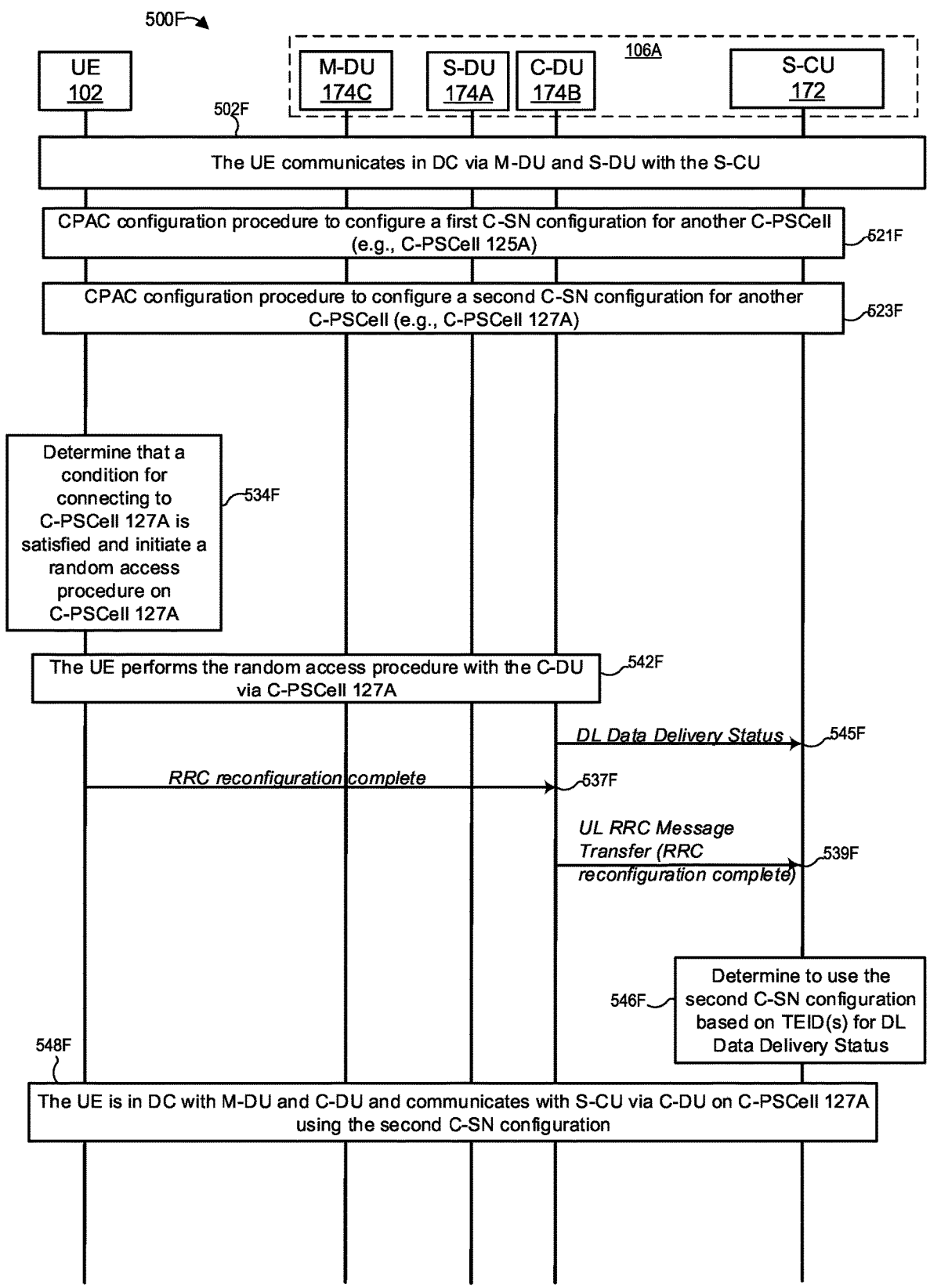
FIG. 5F is a messaging diagram of an example scenario in which a C-DU of an SN sends a DL Data Delivery Status message to a CU of an SN after detecting that a UE in DC connected to the C-PSCell, and the CU determines to use a particular C-SN configuration based on TEID(s) for the DL Data Delivery Status message, in accordance with the techniques of this disclosure.

Now referring to FIG. 5F, a scenario 500F involves a CPAC, i.e., a conditional addition of a C-PSCell of an SN when the UE is already in DC with the MN and SN. In this scenario, the base station 106A operates as an MN that includes a CU 172 (operated as a master CU (M-CU) 172) and a master DU (M-DU) 174C, and the base station 106A can operate as an SN that includes the CU 172 (operated as a S-CU 172), a C-DU 174B and a S-DU 174A. Events in this scenario similar to those discussed above are labeled with the same reference numbers. Events 521F, 523F, 534F, 542F, 537F, 539F, 545F, 548F are similar to events 321F, 323F, 334F, 342F, 337F, 339F, 345F, 348F. The description, examples and implementations for FIG. 5A and FIG. 3F can apply to FIG. 5F.

FIGS. 6A-6B, 7A-7B, 8, and 9 depict handover scenarios in which a base station initializes a conditional handover procedure for the UE 102.

Figure 6A:
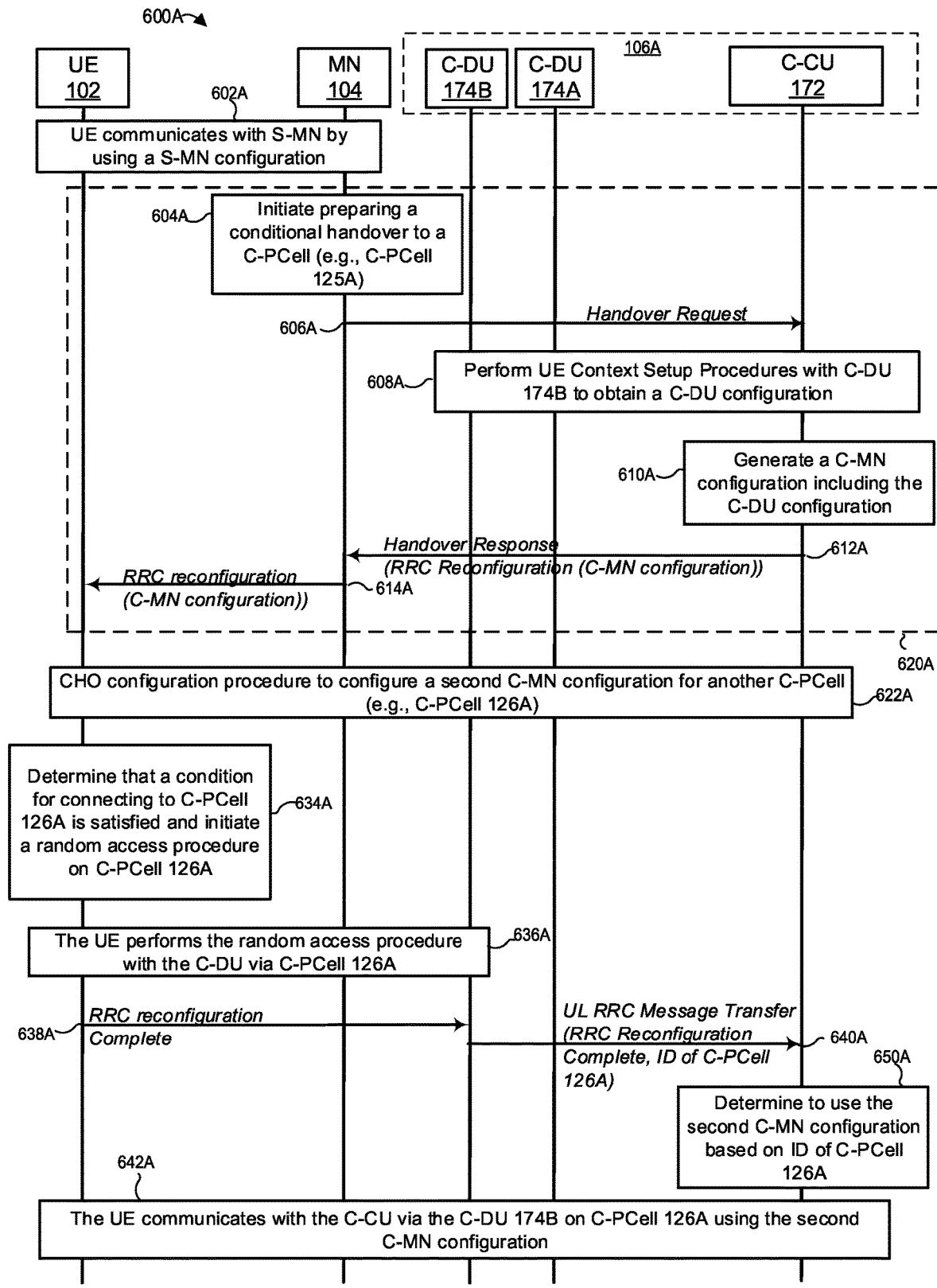
FIG. 6A is a messaging diagram of an example scenario in which a C-DU of a target base station sends an identity of a C-PSCell to a CU of the target base station upon detecting that a UE in SC or DC connected to the C-PCell, and the CU determines to use a particular C-SN configuration based on the identity of the C-PCell, in accordance with the techniques of this disclosure.

Referring to FIG. 6A, in a scenario 600A, the base station 104 operates as an MN and the base station 106A operates as a candidate base station that includes both a candidate CU (referred to here as C-CU 172), a candidate DU (referred to here as C-DU 174B) and optionally another C-DU 174A. Initially, the UE 102 communicates 602A data (e.g., uplink and/or downlink data PDUs) with the MN 104 (via cell 124), e.g., according to an S-MN configuration. Several events in the scenario 600A are similar to events in the scenarios 300A. The differences between the scenarios of FIG. 3A and FIG. 6A are described below.

The MN 104 at some point determines 604A that it should prepare a conditional handover to a C-PCell (e.g., C-PCell 125A) operated by the C-DU 174B for the UE 102. The MN 104 can make this determination based on one or more measurement results received from the UE 102, for example, or another suitable event. In response to this determination, the MN sends 606A a Handover Request message to the C-CU 172. The C-CU 172 performs 608A UE Context Setup Procedures with the C-DU 174B to obtain a C-DU configuration, similar to the procedure 306A in FIG. 3. In some implementation, the Handover Request message includes a target Cell ID (e.g. CGI of the C-PCell 125A) and the C-CU 172 determines the C-DU to perform the UE Context Setup procedures based on the Cell ID. The C-CU 172 generates 610A a first C-MN configuration including the obtained C-DU configuration. The C-CU 172 sends 612A a Handover Response message including an RRC Reconfiguration message, which includes the first C-MN configuration, to the MN 104. The MN 104 transmits 614A an RRC reconfiguration message including the C-MN configuration to the UE 102. The events 604A, 606A, 306A, 610A, 612A, and 614A are collectively referred to in FIG. 6A as the conditional handover (CHO) configuration procedure 620A.

The MN 104 can perform 622A the CHO configuration procedure with the C-DU 174B and the UE 102 to configure the UE 102 a second C-MN configuration including a second C-DU configuration for another C-PCell (e.g., C-PCell 126A), similar to the CHO configuration procedure 620A. The C-CU 172 can perform the CHO configuration procedures 620A, 622A in parallel or sequentially.

In some implementations, the MN 104 can include a first C-CU configuration in the first C-MN configuration and a second C-CU configuration in the second C-MN configuration. The first C-CU configuration and the second C-CU configuration can have the same content or different contents. In other implementations, the MN 104 does not include a C-CU configuration in the first C-MN configuration and the MN 104 does not include a C-CU configuration in the second C-MN configuration. The first C-DU configuration and the second C-DU configuration can have some portions that are different.

Later in time, the UE 102 determines (or detects) 634A that a condition for connecting to a C-PCell 126A is met and initiates a random access procedure on the C-PCell 126A in response to the detection. For convenience, this discussion may refer to the condition or a configuration in the singular, but it will be understood that there may be multiple conditions, and that the conditional configuration can include one or multiple configuration parameters to specify the condition or the multiple conditions. In response to the determination, the UE 102 transmits 638A an RRC reconfiguration complete message to the C-DU 174B, and the C-DU 174B in turn sends 640A a UL RRC Message Transfer including the RRC reconfiguration complete message and an identity of the C-PCell 126A to the C-CU 172. The C-CU 172 determines 650A to use the second C-MN configuration (or the second C-DU configuration and/or second C-CU configuration) as a new S-MN configuration (as a new M-DU configuration and/or a new M-CU configuration) based on the identity of the C-PCell 126A.

In some implementations, the identity of the C-PSCell 126A can be a cell global identity (CGI). In other implementations, the identity of the C-PSCell 126A can be a cell identity in a system information block broadcast on the C-PSCell 126A. In yet other implementations, the identity of the C-PSCell 126A can be a PCI that the UE 102 obtains from synchronization signals received by the UE 102 on the C-PSCell 126A. In various implementations, the C-CU 172 maintains a table for mapping between a CGI and a PCI or another suitable identifier of a particular cell in the wireless communication system 100 for the purpose of identifying a particular C-MN configuration.

In response to the determination 634A, the UE 102 then performs 636A a random access procedure with the C-DU 174B via the C-PCell 126A, e.g., using one or more random access configurations in the second C-DU configuration. If the UE 102 successfully completes the random access procedure, the UE 102 communicates 642A with the C-DU 174B via the C-PCell 126A using the second C-DU configuration and communicates with the C-CU 172 via the C-DU 174B using the second C-CU configuration. The UE 102 can transmit 638A the RRC reconfiguration complete message during or after the random access procedure. In some implementations, the UE 102 may disconnect from the PCell 124 to perform the random access procedure, i.e., to connect the C-PCell 126A. In other implementations, the UE 102 does not disconnect from the PCell 124 while performing the random access procedure. If the C-DU 174B identifies the UE 102 in the random access procedure, the C-DU 174B becomes DU 174B and communicates 642A with the UE 102 via the C-PCell 126A. The DU 174B can send a message (e.g., a DL Data Delivery Status message in FIG. 3C) to indicate to the CU 172 that the UE 102 is connected, after or response to identifying the UE 102 in the random access procedure.

In some implementations, the random access procedure can be a four-step random access procedure or a two-step random access procedure. The UE 102 can transmit the RRC reconfiguration complete message 638A in a Message A of the two-step random access procedure. In other implementations, the random access procedure can be a contention-based random access procedure or a contention-free random access procedure. In the contention-based random access procedure, the UE 102 can transmit the RRC reconfiguration complete message 638A in a Message 3 of the contention-based random access procedure. In case of the contention-free random access procedure, the UE 102 can transmit the RRC reconfiguration complete message 638A after the contention-free random access procedure.

Because the C-CU 172 receives the C-PCell 126A in the UL RRC Message Transfer message 640A, the C-CU 172 does not select the first C-MN configuration (or the first C-DU configuration and/or the first C-CU configuration) for the C-PCell 125A. Thus, the C-CU 172 does not use the first C-MN configuration to communicate with the UE 102 while the UE 102 connects to the C-DU 174B on the C-PCell 126A, thereby avoiding a communication failure due to configuration mismatch can be avoided.

In some implementations, C-CU 172 can include at least one first security configuration parameter in the second C-MN configuration. In other implementations, the C-CU 172 can send the at least one first security configuration parameter with the first C-MN configuration at event 612A and the MN 104 forwards it at event 614A. The C-CU 172 can generate the at least one first security key (security key(s)) from the at least one first security configuration parameters and a first security base key (e.g., $K_{MN}$ or $K_{NG-RAN^*}$). For example, the first security key(s) can include a first ciphering key for encryption and decryption and/or include a first integrity key for integrity protection and check.

In other implementations, C-CU 172 can include at least one second security configuration parameter in the second C-MN configuration. In other implementations, the C-CU 172 can send the at least one second security configuration with the second C-MN configuration during procedure 622A at an event similar to 612A and the MN 104 can forward it at an event similar to 614A. The C-CU 172 can generate at least one second security key (security key(s)) from the at least one second security configuration parameter and a second security base key (e.g., $K_{MN}$ or $K_{NG-RAN*}$). For example, the second security key(s) can include a second ciphering key for encryption and decryption and/or include a second integrity key for integrity protection and check. In one implementation, the C-CU 172 determines to use the at least one second security configuration parameter and the second security base key to generate the second security key(s) according to the identity of the C-PCell 126A. In another implementation, the C-CU 172 determines to use the second security key(s) according to the identity of the C-PCell 126A. The UE 102 can generate the second security key(s) (same as the second security key(s) generated by the candidate base station 106A) from the at least one second security configuration parameter and the second security base key. In one implementation, the UE 102 can generate the second security key(s) from the at least one second security configuration parameter and the second security base key after event 634A or receiving the RRC reconfiguration message during the CHO configuration procedure 622A. Thus, the UE 102 communicates 642A with the C-CU 172 via the C-DU 174B using the second C-MN configuration and the second security key(s). In one implementation, the first security base key and the second security base key can be the same or identical. In another implementation, the first security base key and the second security base key can be different. The C-CU 172 can determine which security base key or which security key(s) based on the identity of the C-PCell 126A.

In some implementations, the first C-DU configuration can include multiple configuration parameters such as physical layer configuration parameters, MAC configuration parameters, RLC configuration parameters, and/or the one or more random access configurations needed by the UE 102 to perform 636A the random access procedure with the C-DU 174A on the C-PCell 125A. The second C-DU configuration can include multiple configuration parameters such as physical layer configuration parameters, MAC configuration parameters, RLC configuration parameters, and/or the one or more random access configurations needed by the UE 102 to perform 636A the random access procedure with the C-DU 174A on the C-PCell 125A. In other implementations, the first C-DU configuration can be CellGroupConfig information element (IE) that configures the C-PCell 125A and zero, one, or more C-SCells of the C-DU 174A. The second C-DU configuration can be CellGroupConfig IE that configures the C-PCell 126A and zero, one, or more C-SCells of the C-DU 174B.

In some implementations, the first C-CU configuration may include a radio bearer configuration and/or measurement configuration. The second C-CU configuration may include a radio bearer configuration and/or measurement configuration. For example, the radio bearer configuration can be a RadioBearerConfig IE, DRB-ToAddModList IE or SRB-ToAddModList IE, DRB-ToAddMod IE or SRB-ToAddMod IE. The measurement configuration can be a MeasConfig IE.

In some implementations, the first C-MN configuration can be an RRCReconfiguration message or an RRCReconfiguration-IEs conforming to 3GPP TS 38.331. The second C-MN configuration can be an RRCReconfiguration message or an RRCReconfiguration-IEs conforming to 3GPP TS 38.331. In other implementations, the first C-SN configuration can be an RRCConnectionReconfiguration message or RRCConnectionReconfiguration-IEs conforming to 3GPP TS 36.331. The second C-SN configuration can be an RRCConnectionReconfiguration message or RRCConnectionReconfiguration-IEs conforming to 3GPP TS 36.331.

In some implementations, the S-MN configuration includes a RadioBearerConfig IE, an RRCReconfiguration message, an RRCReconfiguration-IEs, a CellGroupConfig IE and/or MeasConfig IE conforming to 3GPP TS 38.331. In other implementations, the S-MN configuration includes an RRCConnectionReconfiguration message or RRCConnectionReconfiguration-IEs conforming to 3GPP TS 36.331. In still other implementations, the S-MN configuration includes configurations in the RadioBearerConfig IE, the CellGroupConfig IE, RRCReconfiguration-IEs, and/or or RRCConnectionReconfiguration-IEs. In some implementations, the Handover Request message can be a Handover Request message defined in 3GPP TS 36.423 or TS 38.423 and the Handover Response message can be Handover Request Acknowledge message defined in 3GPP TS 36.423 or TS 38.423. In some implementation, the S-MN configuration includes an M-CU configuration and/or an M-DU configuration. The M-CU configuration in some implementation is as defined for the C-CU configuration in this disclosure. The M-DU configuration in some implementation is as defined for the C-DU configuration in this disclosure for a PCell and zero, one, or more SCells operated by the M-DU.

In some implementations, if the base station 106A is a gNB, the RRC reconfiguration and RRC reconfiguration complete messages are RRCReconfiguration and RRCReconfigurationComplete messages, respectively. In other implementations, if the SN 106A is an eNB or ng-eNB, the RRC reconfiguration and RRC reconfiguration complete messages are RRCConnectionReconfiguration and RRCConnectionReconfigurationComplete messages, respectively.

Figure 6B:
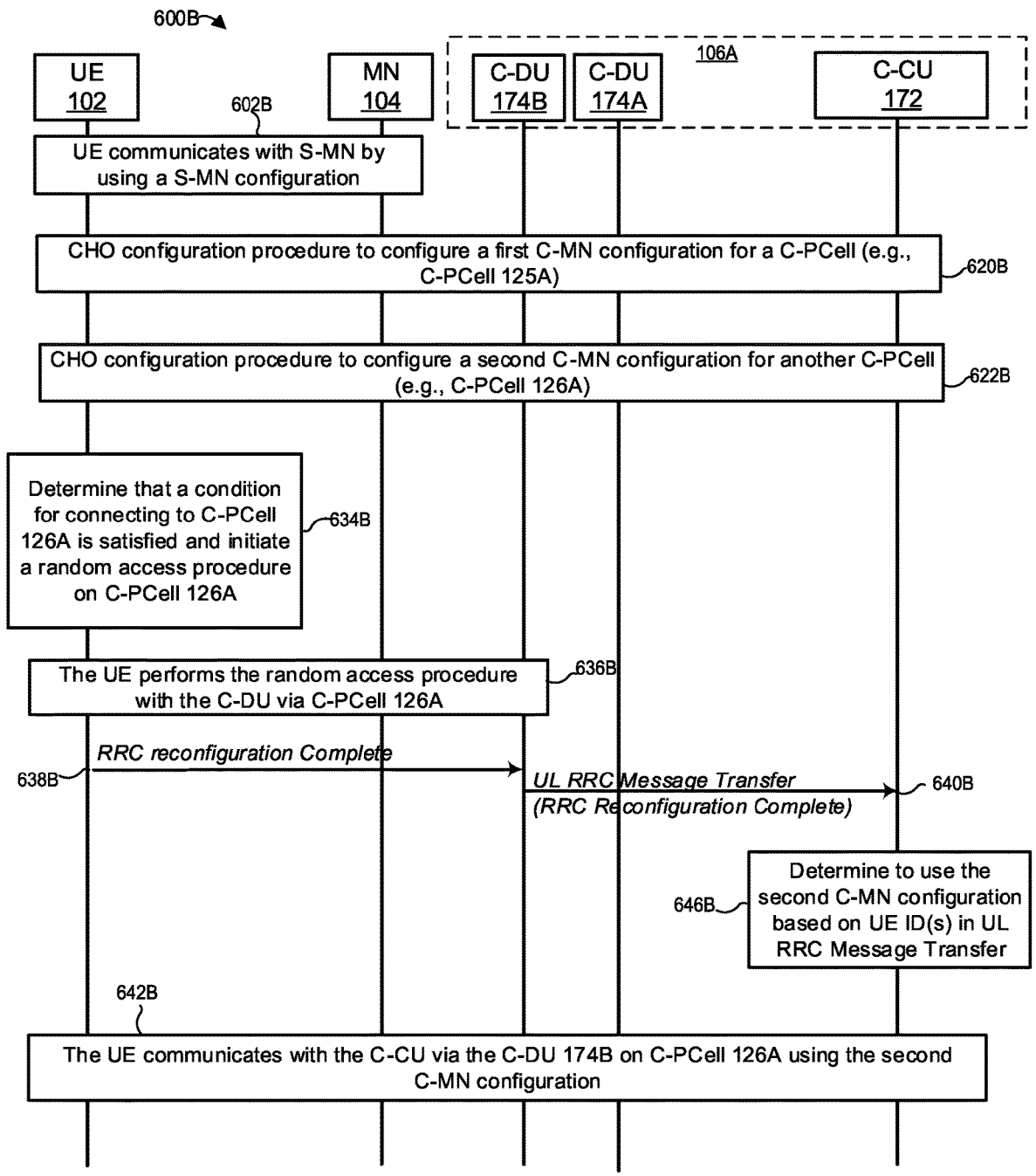
FIG. 6B is a messaging diagram of an example scenario in which a C-DU of a target base station sends a DL Data Delivery Status message to a CU of the target base station after detecting that a UE in SC or DC connected to the C-PCell, and the CU determines to use a particular C-SN configuration based on TEID(s) for the DL Data Delivery Status message, in accordance with the techniques of this disclosure.

Referring next to FIG. 6B, in a scenario 600B similar to 600A, the base station 104 again operates as an MN and the base station 106A operates as a candidate base station that includes both a C-CU 172, a C-DU 174B and optionally a C-DU 174A. Several events in the scenario 600B are similar to events in the scenarios 600A. The differences between the scenarios of FIG. 6B and FIG. 6A are described below.

The MN 104 can perform 620B a CHO configuration procedure with the C-DU 174B and the UE 102 to configure the UE 102 a first C-MN configuration including a first C-DU configuration for a C-PCell (e.g., C-PCell 125A), similar to the CHO configuration procedure 620A. The MN 104 can perform 622B another CHO configuration procedure with the C-DU 174B and the UE 102 to configure the UE 102 a second C-MN configuration including a second C-DU configuration for another C-PCell (e.g., C-PCell 126A), similar to the CHO configuration procedure 620A. The MN 104 can perform the CHO configuration procedures 620B, 622B in parallel or sequentially.

Later in time, the UE 102 determines (or detects) 634B that a condition for connecting to a C-PCell 126A is met and initiates a random access procedure on the C-PCell 126A in response to the detection. In response to the determination, the UE 102 transmits 638B an RRC reconfiguration complete message to the C-DU 174B, which in turn the C-DU 174B sends 640B a UL RRC Message Transfer including the RRC reconfiguration complete message to the C-CU 172. The C-CU 172 determines 646B to use the second C-MN configuration (or the second C-DU configuration and/or second C-CU configuration) as a new S-MN configuration (as a new M-DU configuration and/or a new M-CU configuration) based on the UE ID(s) in the UL RRC Message Transfer message. In some implementation, the UE ID(s) are the gNB-CU UE F1AP ID and the gNB-DU UE F1AP ID as defined in 3GPP TS 38.401 or TS 38.473.

Based on the UE ID(s) in the UL RRC Message Transfer message 640B, the C-CU 172 does not select the first C-MN configuration (or the first C-DU configuration and/or the first C-CU configuration) for the C-PCell 125A. Thus, the C-CU 172 does not use the first C-MN configuration for the C-PCell 125A to communicate with the UE 102 while the UE 102 connects to the C-DU 174B on the C-PCell 126A, thereby avoiding a communication failure due to configuration mismatch.

Figure 7A:
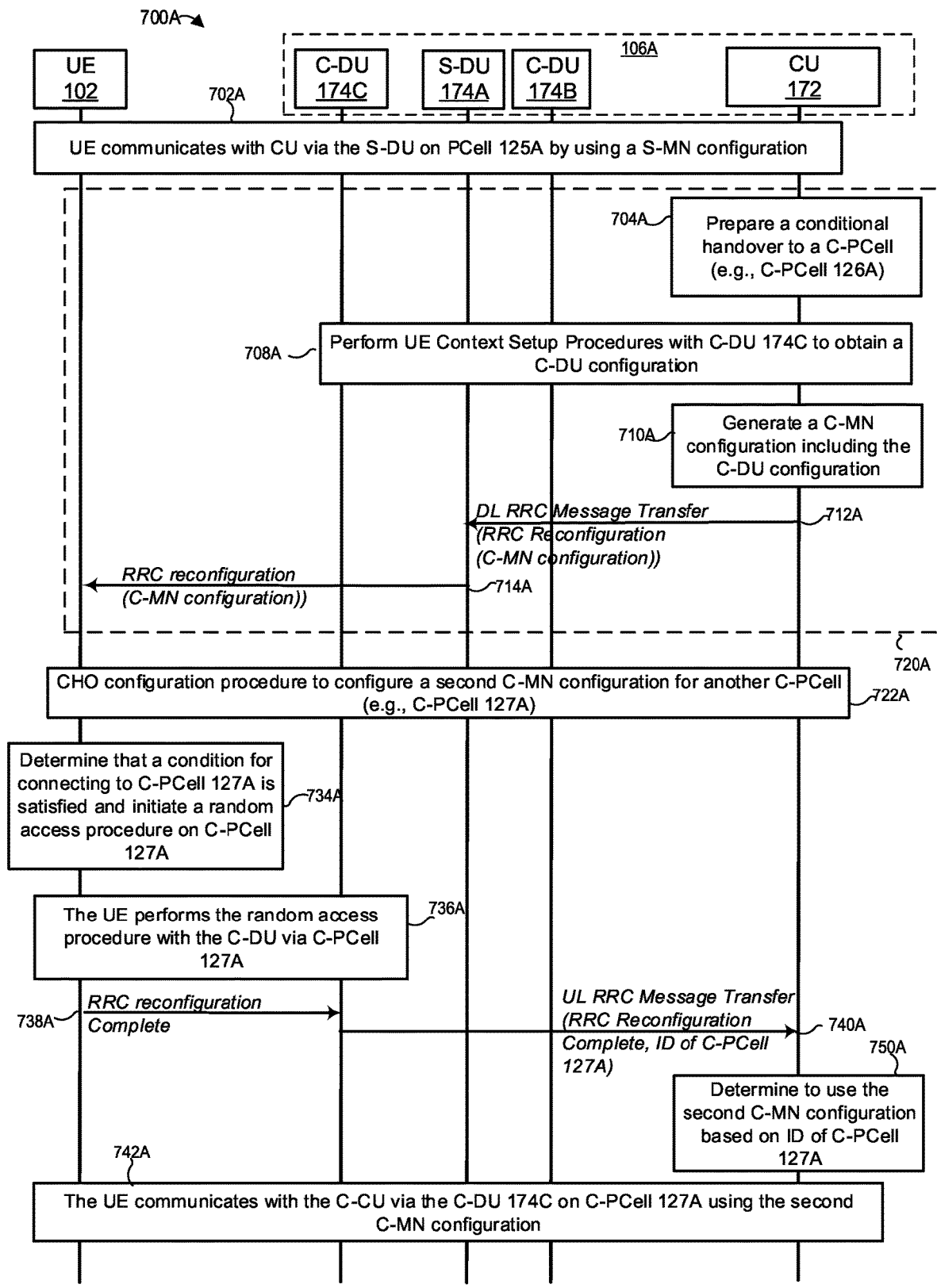
FIG. 7A is a messaging diagram of an example scenario in which a C-DU of a target base station sends an identity of a C-PSCell to a CU of the target base station upon detecting that a UE in SC or DC connected to the C-PCell, and the CU determines to use a particular C-SN configuration based on the identity of the C-PCell, in accordance with the techniques of this disclosure.

Referring next to FIG. 7A, in a scenario 700A, the base station 106A operates as a (master) base station that includes a CU 172, a source DU (referred to here as S-DU 174A), a candidate DU (referred to here as C-DU 174B) and optionally another C-DU 174C. Initially, the UE 102 communicates 702A data (e.g., uplink and/or downlink data PDUs) with the CU 172 via the S-DU 174A and PCell 125A, e.g., according to an S-MN configuration. Several events in the scenario 700A are similar to events in the scenarios 600A. The differences between the scenarios of FIG. 7A and FIG. 6A are described below.

The CU 172 at some point determines 704A that it should prepare a conditional handover to a C-PCell (e.g., C-PCell 126A) operated by the C-DU 174C for the UE 102. The CU 172 can make this determination based on one or more measurement results received from the UE 102, for example, or another suitable event. In response to this determination, the CU 172 performs 708A UE Context Setup Procedures with the C-DU 174C to obtain a C-DU configuration, similar to the procedure 306A in FIG. 3. The CU 172 generates 710A a first C-MN configuration including the obtained C-DU configuration. The CU 172 sends 712A a DL RRC Message Transfer message including an RRC Reconfiguration message, which includes the first C-MN configuration. The S-DU 174A transmits 714A the received RRC Reconfiguration message to the UE 102. The events 704A, 708A, 710A, 712A, and 714A are collectively referred to in FIG. 7A as the conditional handover (CHO) configuration procedure 720A for intra-base-station handover.

The CU 172 can perform 722A the CHO configuration procedure with the C-DU 174C and the UE 102 to configure the UE 102 a second C-MN configuration including a second C-DU configuration for another C-PCell (e.g., C-PCell 127A), similar to the CHO configuration procedure 720A. The CU 172 can perform the CHO configuration procedures 720A, 722A in parallel or sequentially.

In some implementations, the CU 172 can include a first C-CU configuration in the first C-MN configuration and a second C-CU configuration in the second C-MN configuration. The first C-CU configuration and the second C-CU configuration can have the same content or different contents. In other implementations, the CU 172 does not include a C-CU configuration in the first C-MN configuration and the CU 172 does not include a C-CU configuration in the second C-MN configuration. The first C-DU configuration and the second C-DU configuration can have some portions that are different.

Later in time, the UE 102 determines (or detects) 734A that a condition for connecting to a C-PCell 127A is met and initiates a random access procedure on the C-PCell 127A in response to the detection. For convenience, this discussion may refer to the condition or a configuration in the singular, but it will be understood that there may be multiple conditions, and that the conditional configuration can include one or multiple configuration parameters to specify the condition or the multiple conditions. In response to the determination, the UE 102 transmits 738A an RRC reconfiguration complete message to the C-DU 174C, which in turn the C-DU 174C sends 740A a UL RRC Message Transfer including the RRC reconfiguration complete message and an identity of the C-PCell 127A to the CU 172. The CU 172 determines 750A to use the second C-MN configuration (or the second C-DU configuration and/or the second C-CU configuration) as a new S-MN configuration (as a new M-DU configuration and/or a new M-CU configuration) based on the identity of the C-PCell 127A.

In response to the determination 734A, the UE 102 then performs 736A a random access procedure with the C-DU 174C via the C-PCell 127A, e.g., using one or more random access configurations in the second C-DU configuration. If the UE 102 successfully completes the random access procedure, the UE 102 communicates 742A with the C-DU 174C via the C-PCell 127A using the second C-DU configuration and communicates with the CU 172 via the C-DU 174C using the second C-CU configuration. The UE 102 can transmit 738A the RRC reconfiguration complete message during or after the random access procedure. In the contention-based random access procedure, the UE 102 can transmit the RRC reconfiguration complete message 738A in a Message 3 of the contention-based random access procedure. In case of the contention-free random access procedure, the UE 102 can transmit the RRC reconfiguration complete message 738A after the contention-free random access procedure. In some implementations, the UE 102 may disconnect from the PCell 125A to perform the random access procedure, i.e., to connect the C-PCell 127A. In other implementations, the UE 102 does not disconnect from the PCell 125A while performing the random access procedure. If the C-DU 174C identifies the UE 102 in the random access procedure, the C-DU 174C becomes DU 174C and communicates 742A with the UE 102 via the C-PCell 127A. The DU 174C can send a message (e.g., a DL Data Delivery Status message in FIG. 3C) to indicate to the CU 172 that the UE 102 is connected, after or response to identifying the UE 102 in the random access procedure.

In some implementations, the random access procedure can be a four-step random access procedure or a two-step random access procedure. The UE 102 can include a UE ID and the RRC reconfiguration complete message 738A in a Message A and transmit the Message A to the C-DU 174C in the two-step random access procedure. In other implementations, the random access procedure can be a contention-based random access procedure or a contention-free random access procedure. In the contention-based random access procedure, the UE 102 can include a UE ID and the RRC reconfiguration complete message 738A in a Message 3 and transmit the Message 3 to the C-DU 174C. The C-DU 174C can assign the UE ID in the second DU configuration. The UE ID can be a C-RNTI. In the contention-free random access procedure, the UE 102 can transmit a dedicated preamble to the C-DU 174C. The C-DU 174C can assign the dedicated preamble in the second DU configuration. The C-DU 174C can assign the UE ID in the second DU configuration. If the C-DU 174C receives the UE ID or the dedicated preamble, the C-DU 174C identifies the UE 102.

Based on the identity of the C-PCell 126A in the UL RRC Message Transfer message 740A, the CU 172 does not select the first C-MN configuration for the C-PCell 126A. Thus, the C-CU 172 does not use the first C-MN configuration to communicate with the UE 102 while the UE 102 connects to the C-DU 174C on the C-PCell 127A, thereby avoiding a communication failure due to configuration mismatch.

In some implementations, CU 172 can include at least one first security configuration parameter in the second C-MN configuration. In other implementations, the CU 172 can send the at least one first security configuration parameter with the first C-MN configuration at event 712A and the S-DU 174A forwards it at event 714A. The CU 172 can generate the at least one first security key (security key(s)) from the at least one first security configuration parameters and a security base key (e.g., $K_{MN}$ or $K_{NG\text{-}RAN*}$). For example, the first security key(s) can include a first ciphering key for encryption and decryption and/or include a first integrity key for integrity protection and check.

In other implementations, CU 172 can include at least one second security configuration parameter in the second C-MN configuration. In other implementations, the CU 172 can send the at least one second security configuration with the second C-MN configuration during procedure 722A at an event similar to event 712A, and the S-DU 174A can forward it at an event similar to event 714A. The CU 172 can generate at least one security key (security key(s)) from the at least one second security configuration parameter and a security base key (e.g., $K_{MN}$ or $K_{NG\text{-}RAN*}$). For example, the second security key(s) can include a second ciphering key for encryption and decryption and/or include a second integrity key for integrity protection and check. In one implementation, the CU 172 determines to use the at least one second security configuration parameter and the security base key to generate the security key(s) according to the identity of the C-PCell 127A. In another implementation, the CU 172 determines to use the second security key(s) according to the identity of the C-PCell 127A. The UE 102 can generate the second security key(s) (which is the same as the second security key(s) generated by the CU 172) from the at least one second security configuration parameter and the security base key. In one implementation, the UE 102 can generate the second security key(s) from the at least one second security configuration parameter and the security base key after event 734A or receiving the RRC reconfiguration message at event during the procedure 722A. Thus, the UE 102 communicates 742A with the CU 172 via the C-DU 174C using the second C-MN configuration and the second security key(s).

In some implementations, the first C-DU configuration can include multiple configuration parameters such as physical layer configuration parameters, MAC configuration parameters, RLC configuration parameters, and/or the one or more random access configurations needed by the UE 102 to perform 736A the random access procedure with the C-DU 174B on the C-PCell 126A. The second C-DU configuration can include multiple configuration parameters such as physical layer configuration parameters, MAC configuration parameters, RLC configuration parameters, and/or the one or more random access configurations needed by the UE 102 to perform 736A the random access procedure with the C-DU 174C on the C-PCell 127A. In other implementations, the first C-DU configuration can be CellGroupConfig information element (IE) that configures the C-PCell 126A and zero, one, or more C-SCells of the C-DU 174B. The second C-DU configuration can be CellGroupConfig IE that configures the C-PCell 127A and zero, one, or more C-SCells of the C-DU 174C.

In some implementations, the first C-CU configuration may include a radio bearer configuration and/or measurement configuration. The second C-CU configuration may include a radio bearer configuration and/or measurement configuration. For example, the radio bearer configuration can be a RadioBearerConfig IE, DRB-ToAddModList IE or SRB-ToAddModList IE, DRB-ToAddMod IE or SRB-ToAddMod IE. The measurement configuration can be a MeasConfig IE.

In some implementations, the first C-MN configuration can be an RRCReconfiguration message or an RRCReconfiguration-IEs conforming to 3GPP TS 38.331. The second C-MN configuration can be an RRCReconfiguration message or an RRCReconfiguration-IEs conforming to 3GPP TS 38.331. In other implementations, the first C-SN configuration can be an RRCConnectionReconfiguration message or RRCConnectionReconfiguration-IEs conforming to 3GPP TS 36.331. The second C-SN configuration can be an RRCConnectionReconfiguration message or RRCConnectionReconfiguration-IEs conforming to 3GPP TS 36.331. In some implementations, if the base station 106A is a gNB, the RRC reconfiguration and RRC reconfiguration complete messages are RRCReconfiguration and RRCReconfigurationComplete messages, respectively. In other implementations, if the SN 106A is an eNB or ng-eNB, the RRC reconfiguration and RRC reconfiguration complete messages are RRCConnectionReconfiguration and RRCConnectionReconfigurationComplete messages, respectively.

Figure 7B:
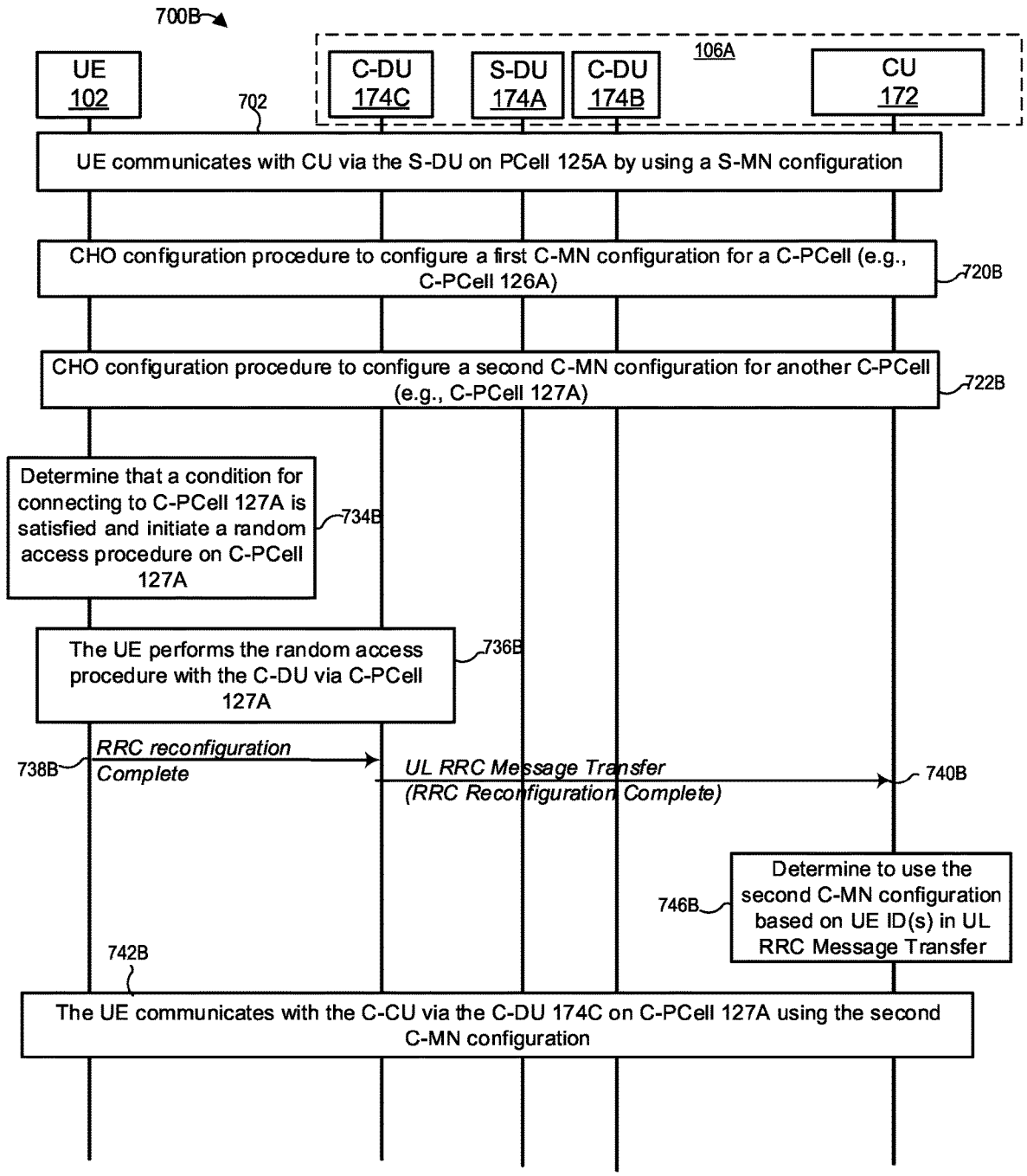
FIG. 7B is a messaging diagram of an example scenario in which a C-DU of a target base station sends a DL Data Delivery Status message to a CU of the target base station after detecting that a UE in SC or DC connected to the C-PCell, and the CU determines to use a particular C-SN configuration based on TEID(s) for the DL Data Delivery Status message, in accordance with the techniques of this disclosure.

Referring next to FIG. 7B, in a scenario 700B similar to 700A, the base station 106A operates as a (master) base station that includes both a CU 172, a S-DU 174A, a C-DU 174B and optionally another C-DU 174C. Several events in the scenario 700B are similar to events in the scenarios 700A. The differences between the scenarios of FIG. 7B and FIG. 7A are described below.

The CU 172 can perform 720B a CHO configuration procedure with the C-DU 174C and the UE 102 to configure the UE 102 a first C-MN configuration including a first C-DU configuration for a C-PCell (e.g., C-PCell 126A), similar to the CHO configuration procedure 720A. The CU 172 can perform 722B another CHO configuration procedure with the C-DU 174C and the UE 102 to configure the UE 102 a second C-MN configuration including a second C-DU configuration for another C-PCell (e.g., C-PCell 127A), similar to the CHO configuration procedure 720A. The CU 172 can perform the CHO configuration procedures 720B, 722B in parallel or sequentially.

Later in time, the UE 102 determines (or detects) 734B that a condition for connecting to a C-PCell 127A is met and initiates a random access procedure on the C-PCell 127A in response to the detection. In response to the determination, the UE 102 transmits 738B an RRC reconfiguration complete message to the C-DU 174C, which in turn the C-DU 174C sends 740B a UL RRC Message Transfer including the RRC reconfiguration complete message to the CU 172. The CU 172 determines 746B to use the second C-MN configuration (or the second C-DU configuration and/or the second C-CU configuration) as a new S-MN configuration (as a new M-DU configuration and/or a new M-CU configuration) based on the UE ID(s) in the UL RRC Message Transfer message. In some implementation, the UE ID(s) are the gNB-CU UE F1AP ID and the gNB-DU UE F1AP ID as defined in 3GPP TS 38.401 or TS 38.473.

Based on the UE ID(s) in the UL RRC Message Transfer message 740B, the CU 172 does not select the first C-MN configuration for the C-PCell 126A. Thus, the CU 172 does not use the first C-MN configuration to communicate with the UE 102 while the UE 102 connects to the C-DU 174C on the C-PCell 127A, thereby avoiding a communication failure due to configuration mismatch.

Referring to FIG. 8, the candidate base station 106B in some cases can manage conditional configurations based on the Tunnel Endpoint ID(s) (TEID(s)) for DL Data Delivery Status frame in an inter-base-station conditional handover.

An example scenario 800 of FIG. 8 involves an inter-base-station condition handover procedure. The base station 104 in the scenario 800 operates as an MN (or source base station), the base station 106A operates as a candidate base station made up of a C-CU 172 and C-DU 174A and C-DU 174B. Several events in the scenario 800 are similar to events in the scenarios 600A. The differences between the scenarios of FIG. 8 and FIG. 6A are described below.

Initially, the UE 102 communicates 802 with the MN 104 and uses an S-MN configuration to communicate data (e.g., UL Data PDUs and/or DL Data PDUs). The MN 104 can determine 804 that it should initiate a conditional handover to a C-PCell (e.g., C-PCell 125A, in response to one or more measurement results received from the UE 102 or from measurements on signals received from the UE 102). The MN 104 can make the determination to perform the conditional handover based on one or more measurement results received from the UE, e.g., if the one or more measurement results are above a first threshold. The MN 104 can make this determination to perform the conditional handover based on one or more measurement results received from the UE, e.g., if the one or more measurement results are above the first threshold or a second threshold. The second threshold can be different from the first threshold.

In response to the determination of the event 804, the MN 104 transmits 806 a Handover Request message which includes the target Cell ID (e.g. CGI of the C-PCell 125A) and Security Information to the C-CU 172. The C-CU 172 performs 808 UE Context Setup procedures with C-DU 174B to obtain a C-DU configuration for the C-PCell, similar to the procedure 306A in FIG. 3. In some implementations, the C-CU 172 determines the C-DU to perform the UE Context Setup procedures based on the Cell ID. The C-CU 172 generates 810 a first C-MN configuration including the first C-DU configuration. In response to event 806, the C-CU 172 transmits 812 a Handover Response message including an RRC Reconfiguration message which further includes the first C-MN configuration. The MN 104 then transmits 814 the RRC Reconfiguration message to the UE 102. The events 804, 806, 808, 810, 812, and 814 are collectively referred to in FIG. 8 as the CHO configuration procedure 820. In some implementations, the Handover Request message is a Handover Request message as defined in 3GPP TS 38.423 or TS 36.423 with an indication of conditional operation, and the Handover Response message is a Handover Request Acknowledge message as defined in 3GPP TS 38.423 or TS 36.423. In some implementations, the UE Context Setup procedures are as defined in 3GPP TS 38.401 and TS 38.473.

At a later time, the MN 104 can determine to configure 822 the UE 102 with another CHO configuration procedure to configure a second C-MN configuration for another C-PCell (e.g., C-PCell 126A) operated by the C-DU 174B, similar to the procedure 820. The MN 104 can perform the CHO configuration procedures 820, 822 in parallel or sequentially.

Later in time, the UE 102 determines (or detects) 834 that a condition for connecting to a C-PSCell 126A is met and initiates a random access procedure on the C-PSCell 126A in response to the detection. In response to the determination 834, the UE 102 then performs 836 the random access procedure with the C-DU 174B via the C-PCell 126A, e.g., using one or more random access configurations included in the second C-MN configuration. As soon as the C-DU 174B detects the successful RACH access by the UE 102 for the corresponding data radio bearer(s), the C-DU 174B sends 837 a DL Data Delivery Status frame to the C-CU 172. The C-CU 172 determines 850 to use the second C-MN configuration (or the second C-DU configuration and/or the second C-CU configuration) as a new S-MN configuration (as a new M-DU configuration and/or a new M-CU configuration) based on the TEID(s) for the DL Data Delivery Status frame. The UE 102 transmits 838 an RRC Reconfiguration Complete message to the C-DU 174B. The C-DU 174B transmits 840 the RRC Reconfiguration Complete message in a UL RRC Message Transfer message to the C-CU 172. The UE 102 can transmit 838 the RRC reconfiguration complete message during or after the random access procedure. In the contention-based random access procedure, the UE 102 can transmit the RRC reconfiguration complete message 838 in a Message 3 of the contention-based random access procedure. In case of the contention-free random access procedure, the UE 102 can transmit the RRC reconfiguration complete message 838 after the contention-free random access procedure. The UE communicates 842 with the C-CU 172 via the C-DU 174B via the C-PCell 126A in accordance with the configurations in the second C-MN configuration. To access the C-PCell, the UE 102 in some implementations disconnects from the PCell hosted by MN 104.

Based on the TEID(s) for the DL Data Delivery Status frame 837, the C-CU 172 does not select the first C-MN configuration for the C-PCell 125A. Thus, the C-CU 172 does not use the first C-MN configuration to communicate with the UE 102 while the UE 102 connects to the C-DU 174C on the C-PCell 126A, thereby avoiding a communication failure due to configuration mismatch.

In some implementations, C-CU 172 can include at least one first security configuration parameter in the second C-MN configuration. In other implementations, the C-CU 172 can send the at least one first security configuration parameter with the first C-MN configuration at event 812 and the MN 104 forwards it at event 814. The C-CU 172 can generate the at least one first security key (security key(s)) from the at least one first security configuration parameters and a security base key (e.g., $K_{MN}$ or $K_{NG\text{-}RAN^*}$). For example, the first security key(s) can include a first ciphering key for encryption and decryption and/or include a first integrity key for integrity protection and check.

In other implementations, C-CU 172 can include at least one second security configuration parameter in the second C-MN configuration. In other implementations, the C-CU 172 can send the at least one second security configuration with the second C-MN configuration during procedure 822 at an event similar to event 812, and the MN 104 can forward it at an event similar to event 814. The C-CU 172 can generate at least one security key (security key(s)) from the at least one second security configuration parameter and a security base key (e.g., $K_{NG\text{-}RAN^*}$). For example, the second security key(s) can include a second ciphering key for encryption and decryption and/or include a second integrity key for integrity protection and check. In one implementation, the C-CU 172 determines to use the at least one second security configuration parameter and the security base key to generate the security key(s) according to the identity of the C-PCell 126A. In another implementation, the C-CU 172 determines to use the second security key(s) according to the identity of the C-PCell 126A. The UE 102 can generate the second security key(s) (which is the same as the second security key(s) generated by the C-CU 172) from the at least one second security configuration parameter and the security base key. In one implementation, the UE 102 can generate the second security key(s) from the at least one second security configuration parameter and the security base key after event 834 or receiving the RRC reconfiguration message during the procedure 822. Thus, the UE 102 communicates 842 with the C-CU 172 via the C-DU 174B using the second C-MN configuration and the second security key(s).

In some implementation, the TEID is as defined in 3GPP TS 29.281 for General Packet Radio System (GPRS) Tunnelling Protocol User Plane (GTPv1-U). In some implementations, the DL Data Delivery Status frame is as defined in 3GPP TS 38.425 and the transmission of the frame is as defined in 3GPP TS 38.401 and TS 38.470. The UL RRC Message Transfer message in some implementations is as defined in 3GPP TS 38.473.

Now referring to FIG. 9, the base station 106A in some cases can manage security configurations based on the TEID(s) for DL Data Delivery Status frame in an intra-base-station conditional handover.

An example scenario 900 of FIG. 9 involves an intra-base-station condition handover procedure. In a scenario 900 similar to 700A, the base station 106A operates as a (master) base station that includes both a CU 172, a S-DU 174A, a C-DU 174B and a another C-DU 174C. Several events in the scenario 900 are similar to events in the scenarios 700A and 800. The differences between the scenarios of FIG. 9, FIG. 7A, and FIG. 8 are described below.

Initially, the UE 102 communicates 902 with the CU 172 via the S-DU 174A on PCell 125A and uses an S-MN configuration to communicate data (e.g., UL Data PDUs and/or DL Data PDUs). The CU 172 can determine 904 that it should initiate an intra-base-station (or, inter-DU) conditional handover to a C-PCell (e.g., C-PCell 126A, in response to one or more measurement results received from the UE 102 or from measurements on signals received from the UE 102). The CU 172 can make the determination to perform the conditional handover based on one or more measurement results received from the UE, e.g., if the one or more measurement results are above a first threshold. The CU 172 can make this determination to perform the conditional handover based on one or more measurement results received from the UE, e.g., if the one or more measurement results are above the first threshold or a second threshold. The second threshold can be different from the first threshold.

In response to the determination of the event 904, the CU 172 performs 908 UE Context Setup procedures with C-DU 174C to obtain a C-DU configuration, similar to the procedure 306A in FIG. 3. The CU 172 generates 910 a first C-MN configuration including a first C-DU configuration. The CU 172 transmits 912 a DL RRC Message Transfer message including an RRC Reconfiguration message which further includes the first C-MN configuration to the S-DU 174A. The S-DU 174A then transmits 914 the RRC Reconfiguration message to the UE 102. The events 904, 906, 910, 912, and 914 are collectively referred to in FIG. 9 as the CHO configuration procedure 920 for intra-base-station handover.

The CU 172 later can determine to configure 922 the UE 102 with another CHO configuration procedure to configure a second C-MN configuration for another C-PCell (e.g., C-PCell 127A) operated by C-DU 174C, similar to event 920. The CU 172 can perform the CHO configuration procedures 920, 922 in parallel or sequentially.

The UE 102 later determines 934 that a condition for connecting to C-PCell 127A is satisfied and initiates a random access procedure on C-PCell 127A. The UE 102 then performs 936 the random access procedure with the C-DU 174C via the C-PCell 127A, e.g., using one or more random access configurations included in the second C-MN configuration. As soon as the C-DU 174C detects the successful RACH access by the UE 102 for the corresponding data radio bearer(s), the C-DU 174C sends 937 a DL Data Delivery Status frame to the CU 172, similar to the event 345C. The CU 172 determines 950 to use the second C-MN configuration (or the second C-DU configuration and/or the second C-CU configuration) as a new S-MN configuration (as a new M-DU configuration and/or a new M-CU configuration) based on the TEID(s) for the DL Data Delivery Status frame, similar to the event 346C. The UE 102 transmits 938 an RRC Reconfiguration Complete message to the C-DU 174C. The C-DU 174C transmits 940 the RRC Reconfiguration Complete message in a UL RRC Message Transfer message to the CU 172. The UE 102 can transmit 938 the RRC reconfiguration complete message during or after the random access procedure. In the contention-based random access procedure, the UE 102 can transmit the RRC reconfiguration complete message 938 in a Message 3 of the contention-based random access procedure. The UE 102 can include a UE ID in the Message 3. In case of the contention-free random access procedure, the UE 102 can transmit the RRC reconfiguration complete message 938 after the contention-free random access procedure. The UE communicates 942 with the CU 172 via the C-DU 174C via the C-PCell 127A in accordance with the configurations in the second C-MN configuration. To access the C-PCell, the UE 102 in some implementations disconnects from the PCell 125A hosted by S-DU 174A. In other implementations, the UE 102 continues communication with the PCell 125A hosted by S-DU 174A, while perform the random access procedure on the C-PCell 127A.

Based on the TEID(s) for the DL Data Delivery Status frame 937, the CU 172 does not select the first C-MN configuration for the C-PCell 126A. Thus, the CU 172 does not use the first C-MN configuration to communicate with the UE 102 while the UE 102 connects to the C-DU 174C on the C-PCell 127A, thereby avoiding a communication failure due to configuration mismatch.

In some implementations, CU 172 can include at least one first security configuration parameter in the second C-MN configuration. In other implementations, the CU 172 can send the at least one first security configuration parameter with the first C-MN configuration at event 912 and the S-DU 174A forwards it at event 914. The CU 172 can generate the at least one first security key (security key(s)) from the at least one first security configuration parameters and a security base key (e.g., $K_{MN}$ or $K_{NG\text{-}RAN^*}$). For example, the first security key(s) can include a first ciphering key for encryption and decryption and/or include a first integrity key for integrity protection and check.

In other implementations, CU 172 can include at least one second security configuration parameter in the second C-MN configuration. In other implementations, the CU 172 can send the at least one second security configuration with the second C-MN configuration during the procedure 922 at an event similar to event 912, and the S-DU 174A can forward it at an event similar to event 914. The CU 172 can generate at least one security key (security key(s)) from the at least one second security configuration parameter and a security base key (e.g., $K_{NG\text{-}RAN^*}$). For example, the second security key(s) can include a second ciphering key for encryption and decryption and/or include a second integrity key for integrity protection and check. In one implementation, the CU 172 determines to use the at least one second security configuration parameter and the security base key to generate the security key(s) according to the identity of the C-PCell 127A. In another implementation, the CU 172 determines to use the second security key(s) according to the identity of the C-PCell 127A. The UE 102 can generate the second security key(s) (same as the second security key(s) generated by the CU 172) from the at least one second security configuration parameter and the security base key. In one implementation, the UE 102 can generate the second security key(s) from the at least one second security configuration parameter and the security base key after event 934 or receiving the RRC reconfiguration message during the procedure 922. Thus, the UE 102 communicates 942 with the CU 172 via the C-DU 174C using the second C-MN configuration and the second security key(s).

In some implementation, the TEID is as defined in 3GPP TS 29.281 for General Packet Radio System (GPRS) Tunnelling Protocol User Plane (GTPv1-U). In some implementations, the DL Data Delivery Status frame is as defined in 3GPP TS 38.425 for NR user plane protocol and the transmission of the frame is as defined in 3GPP TS 38.401 and TS 38.470. The DL RRC Message Transfer and UL RRC Message Transfer message in some implementations are as defined in 3GPP TS 38.473.

Next, several example methods which a base station, a base station CU, or a UE can implement to support conditional configuration handling and management in conditional mobility scenarios are discussed with reference to FIGS. 10-17.

Figure 10:
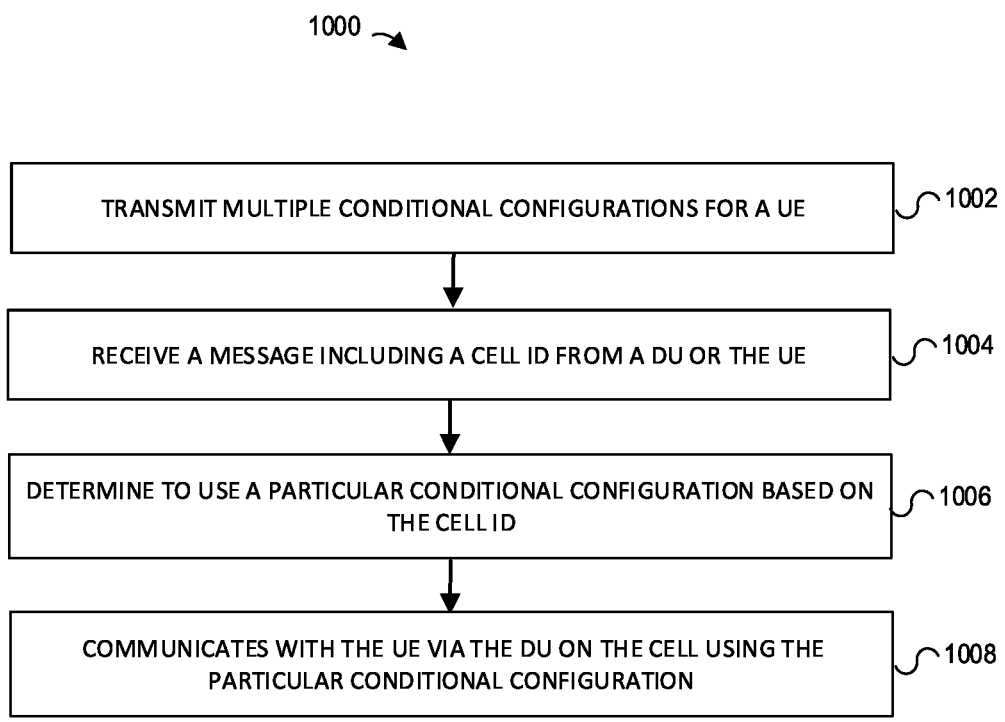
FIG. 10 is a flow diagram of an example method for preparing multiple conditional configurations for a UE and receiving a message including a cell ID from a DU or the UE and determining the particular conditional configuration based on the cell ID, which can be implemented in the base station CU of this disclosure.

Referring first to FIG. 10, an example method 1000 is depicted for determining to use a particular conditional configuration based on a received Cell ID related to conditional mobility to a UE, such as the UE 102, which can be implemented in a base station 106A such as the secondary base station of FIGS. 3A, 3B, 3D, the target secondary base station of FIGS. 4A and 4B, the (source) base station of FIGS. 5A, 5B, 5D, and 7A, and the candidate base station of FIG. 6A for example. In various implementations, the referred Cell ID is a cell global ID (CGI), and the base station or base station CU maintains a table for mapping between the CGI and a physical cell ID (PCI, e.g., as specified in 3GPP TS 36.423 or 38.423) or another suitable identifier of a particular cell in the wireless communication system 100 for the purpose of management of conditional configurations.

The method 1000 begins at block 1002, where the base station CU transmits multiple conditional configurations for a UE. At block 1004, the base station CU receives a message including a Cell ID from a DU (event 344B of FIG. 3B; event 339D of FIG. 3D; event 444B of FIG. 4B; event 544B of FIG. 5B; event 539D of FIG. 5D; event 640A of FIG. 6A; event 740A of FIG. 7A) or a UE (event 338A of FIG. 3A; event 438A of FIG. 4A; event 538A of FIG. 5A). At block 1006, the base station CU determines to use a particular conditional configuration based on the received Cell ID (event 340A of FIG. 3A; event 346B of FIG. 3B; event 340D of FIG. 3D; event 440A of FIG. 4A; event 446B of FIG. 4B; event 540A of FIG. 5A; event 546B of FIG. 5B; event 540D of FIG. 5D; event 650A of FIG. 6A; event 750A of FIG. 7A). As mentioned above, the determination may be made based on a mapping table of the Cell ID and a PCI maintained by the base station CU. The base station CU at block 1008 communicates with the UE via the DU on the Cell using the particular conditional configuration (event 348A of FIG. 3A; event 348B and 3B; event 348D of FIG. 3D; event 448A of FIG. 4A; event 448B of FIG. 4B; event 548A of FIG. 5A; event 548B of FIG. 5B; event 548D of FIG. 5D; event 642A of FIG. 6A; event 742A of FIG. 7A).

Figure 11:
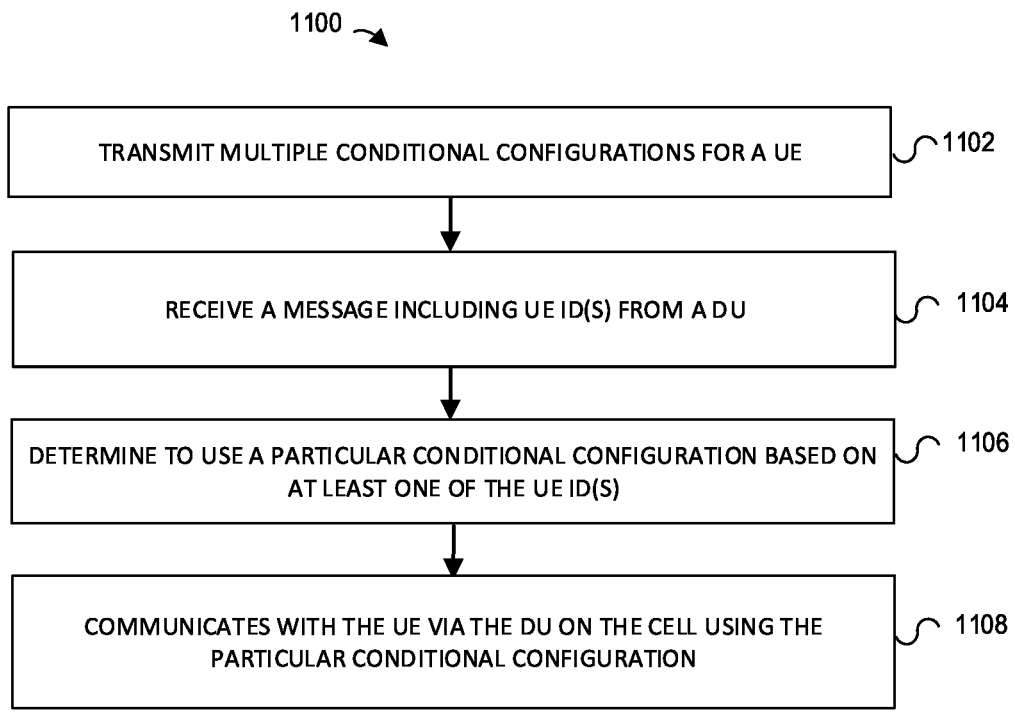
FIG. 11 is a flow diagram of an example method for preparing multiple conditional configurations for a UE and receiving a message including UE ID(s) from a DU and determining the particular conditional configuration based on at least one of the UE ID(s) and the DU's IP address, which can be implemented in the base station CU of this disclosure.

FIG. 11 illustrates an example method 1100 for determining a particular conditional configuration based on UE ID(s) and/or DU IP address from a message from DU related to conditional mobility to a UE, such as the UE 102, which can be implemented in a base station 106A such as the secondary base station of FIG. 3E, the (source) base station of FIGS. 5E and 7B, and the candidate base station of FIG. 6B for example. In some implementation, the UE ID(s) are the gNB-CU UE F1AP ID and the gNB-DU UE F1AP ID as defined in 3GPP TS 38.401 or TS 38.473.

The method 1100 begins at block 1102, where the base station CU transmits multiple conditional configurations for a UE. At block 1104, the base station CU receives a message including UE ID(s) from a DU (event 339E of FIG. 3E; event 539E of FIG. 5E; event 640B of FIG. 6B; event 740B of FIG. 7B). At block 1106, the base station CU determines to use a particular conditional configuration from at least one of the UE ID(s) and the DU's IP address (event 346E of FIG. 3E; event 546E of FIG. 5E; event 646B of FIG. 6B; event 746B of FIG. 7B). The base station CU at block 1108 communicates with the UE via the DU on the Cell using the particular conditional configuration (event 348E of FIG. 3E; event 548E of FIG. 5E; event 642B of FIG. 6B; event 742B of FIG. 7B).

Figure 12:
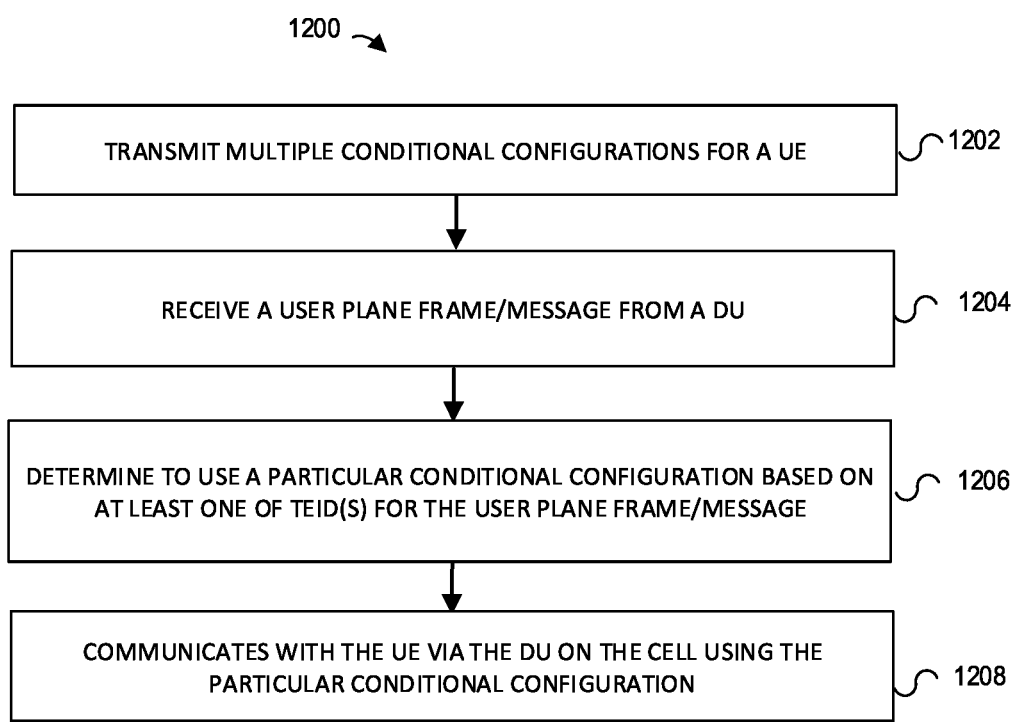
FIG. 12 is a flow diagram of an example method for preparing multiple conditional configurations for a UE and receiving a User Plane frame/message from a DU and determining the particular conditional configuration based on at least one of the TEID(s) for the User Plane frame/message and the DU's IP address, which can be implemented in the base station CU of this disclosure.

FIG. 12 illustrates an example method 1200 for determining a particular conditional configuration based on TEID(s) and/or the DU's IP address from a message from DU related to conditional mobility to a UE, such as the UE 102, which can be implemented in a base station 106A such as the secondary base station of FIGS. 3C and 3F, the target secondary base station of FIG. 4C, the (source) base station of FIGS. 5C, 5F, and 9, and the candidate base station of FIG. 8 for example. In some implementation, the TEID is as defined in 3GPP TS 29.281 for General Packet Radio System (GPRS) Tunnelling Protocol User Plane (GTPv1-U).

The method 1200 begins at block 1202, where the base station CU transmits multiple conditional configurations for a UE. At block 1204, the base station CU receives a User Plane frame/message from a DU (event 345C of FIG. 3C; event 345F of FIG. 3F; event 445C of FIG. 4C; event 545C of FIG. 5C; event 545F of FIG. 5F; event 837 of FIG. 8; event 937 of FIG. 9). At block 1206, the base station determines to use a particular conditional configuration from at least one of TEID(s) for the User Plane frame/message, and the DU's IP address (event 346C of FIG. 3C; event 346F of FIG. 3F; event 446C of FIG. 4C; event 546C of FIG. 5C; event 546F of FIG. 5F; event 850 of FIG. 8; event 950 of FIG. 9). The base station CU at block 1208 communicates with the UE via the DU on the Cell using the particular conditional configuration (event 348C of FIG. 3C; event 348F of FIG. 3F; event 448C of FIG. 4C; event 548C of FIG. 5C; event 548F of FIG. 5F; event 842 of FIG. 8; event 942 of FIG. 9).

Figure 13A:
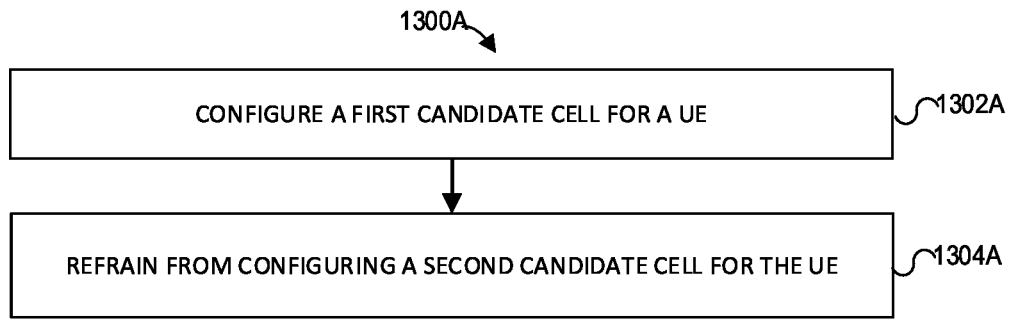
FIG. 13A is a flow diagram of an example method for configuring a candidate cell for a UE and refraining from configuring a second candidate cell for the UE to avoid a conditional configuration management issue, which can be implemented in the base station or base station CU of this disclosure.

FIG. 13A illustrates an example method 1300A for configuring a conditional configuration (e.g., a C-MN configuration, C-SN configuration or C-DU configuration) for a UE and avoiding the necessity of managing multiple conditional configurations, which can be implemented in a first network node such as the (C-)SN (or the CU of the (C-)SN) of FIGS. 3A-F, 4A-C and 5A-5F, or the candidate base station or (C-)MN (or the CU of the (C-)MN) of Figs. of FIGS. 6A-B, 7A-B, 8 and 9, for example.

The method 1300A begins at block 1302A, where the first network node configures a first candidate cell for a UE. At block 1304A, the first network node refrains from configuring a second candidate cell for the UE. Because there is only one candidate cell configured to a UE, second network node operating the candidate cell directly or indirectly via a child node does not need to manage multiple conditional configurations for the UE.

Figure 13B:
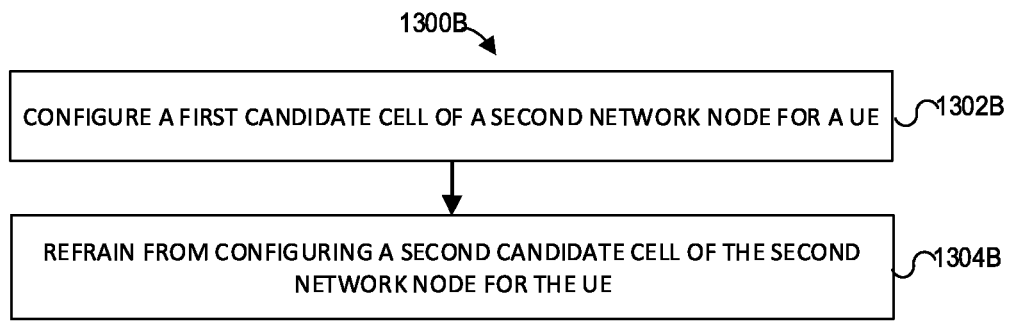
FIG. 13B is a flow diagram of an example method for configuring a candidate cell in a first network node for a UE and refraining from configuring a second candidate cell in the first network node for the UE to avoid a conditional configuration management issue, which can be implemented in the base station or base station CU of this disclosure.

FIG. 13B illustrates a similar example method 1300B for configuring a conditional configuration for a UE and avoiding the necessity of managing multiple conditional configurations associated to the same network node, which can be implemented in a first network node such as the (C-)SN (or the CU of the (C-)SN) of FIGS. 3A-F, 4A-C and 5A-5F or the candidate base station or (C-)MN (or the CU of the (C-)MN) of Figs. of FIGS. 6A-B, 7A-B, 8 and 9, for example.

The method 1300B begins at block 1302B, where a first network node configures a first candidate cell of a second network node for a UE. At block 1304B, the first network node refrains from configuring a second candidate cell of the second network node for the UE. The second network node can be a DU, which can be a M-DU, S-DU or C-DU, a (C-)MN or a (C-)SN of FIGS. 3A-F, 4A-C and 5A-5F, 6A-B, 7A-B, 8 and 9, for example. The first and second network nodes can be the same or different. Because there is only one candidate cell configured to a UE, second network node operating the candidate cell directly or indirectly via a child node does not need to manage multiple conditional configurations for the UE.

Unlike the method 1300A, the first network node with the method 1300B can configure a second candidate cell of a third network node for the UE.

Figure 14:
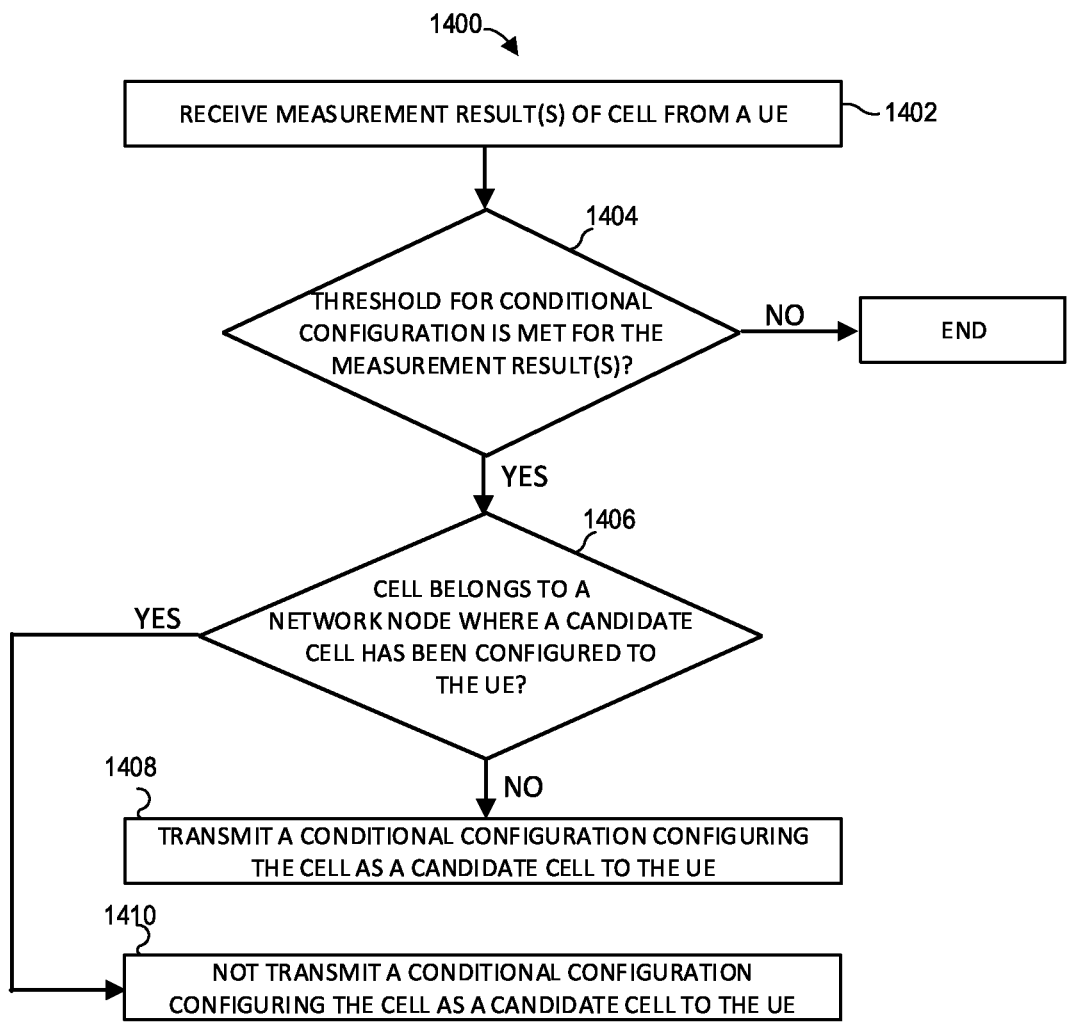
FIG. 14 is a flow diagram of an example method for initiating a conditional configuration depending on whether the measurement result meets a threshold and refraining from configuring a second candidate cell to a UE from the same candidate network node to avoid a conditional configuration management issue, which can be implemented in the base station or base station CU of this disclosure.

FIG. 14 depicts an example method 1400 for configuring a conditional base station configuration for a UE and avoiding the necessity of managing multiple conditional configurations, which can be implemented in a base station of FIGS. 3A-F, 4A-C, 5A-F, 6A-B, 7A-B, 8 and 9 for example.

The method 1400 begins at block 1402, where the base station receives measurement result(s) of a cell from a UE. At block 1404, the base station determines if the threshold for conditional configuration is met for the measurement result(s). The method ends when the threshold is not met. Otherwise, the flow proceeds to block 1406, where the base station further determines if the cell belongs to a network node where a candidate cell has been configured to the UE. If the cell does belong to a network node where a candidate cell has been configured to the UE, the flow proceeds to block 1410 where the base station does not transmit a conditional configuration which configures the cell as a candidate cell to the UE. Otherwise, the flow proceeds to block 1408 where the base station transmit a conditional configuration which configures the cell as a candidate cell to the UE.

Figure 15:
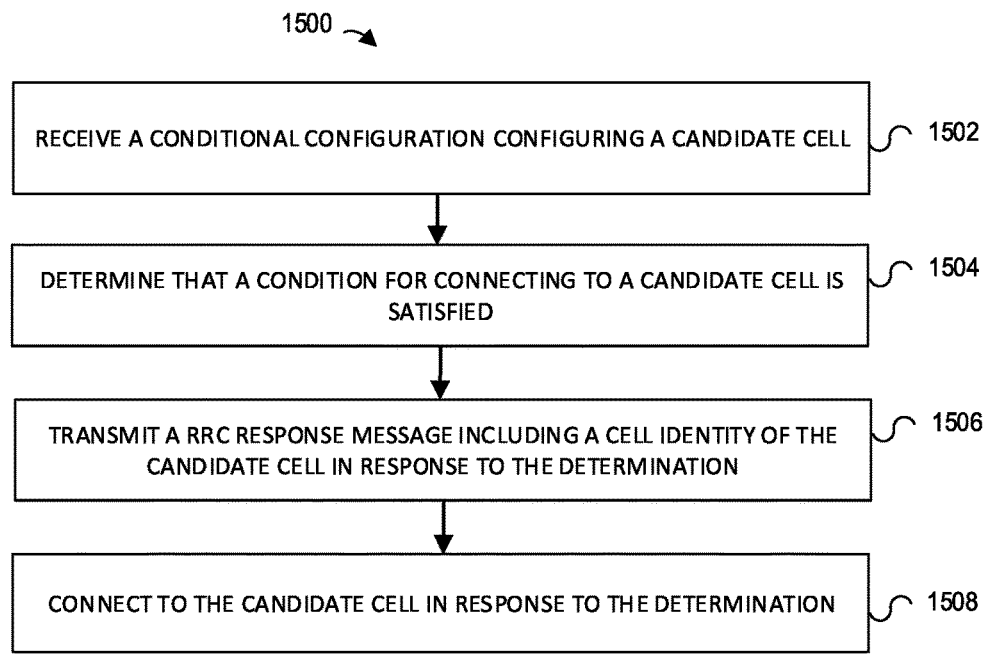
FIG. 15 is a flow diagram of an example method for applying a conditional configuration when the condition is satisfied and including the cell identity in the RRC response message to aid conditional configuration management at the candidate base station, which can be implemented in the UE of this disclosure.

Now referring to FIG. 15, an example method 1500 is depicted for performing a conditional mobility and informing a network node of a candidate cell ID, which can be implemented in a UE such as the UE 102 discussed above. According to this method, the UE determines whether a condition for connecting a candidate cell is satisfied and then transmits an RRC response message to the candidate base station including a cell ID of the configured candidate cell based on this determination. The network node can be a M-CU, S-CU, C-CU, (C-)MN or a (C-)SN, for example.

The method 1500 begins at block 1502, where the UE receives a conditional configuration configuring a candidate cell. The UE at block 1504 determines that a condition for connecting to a candidate cell is satisfied. At block 1506, the UE transmits an RRC response message including a cell identity of the candidate cell in response to the determination at block 1504 (event 336A of FIG. 3A; event 436A of FIG. 4A; event 536A of FIG. 5A for example). The UE at block 1508 connects to the candidate cell in response to the determination of block 1504.

Figure 16:
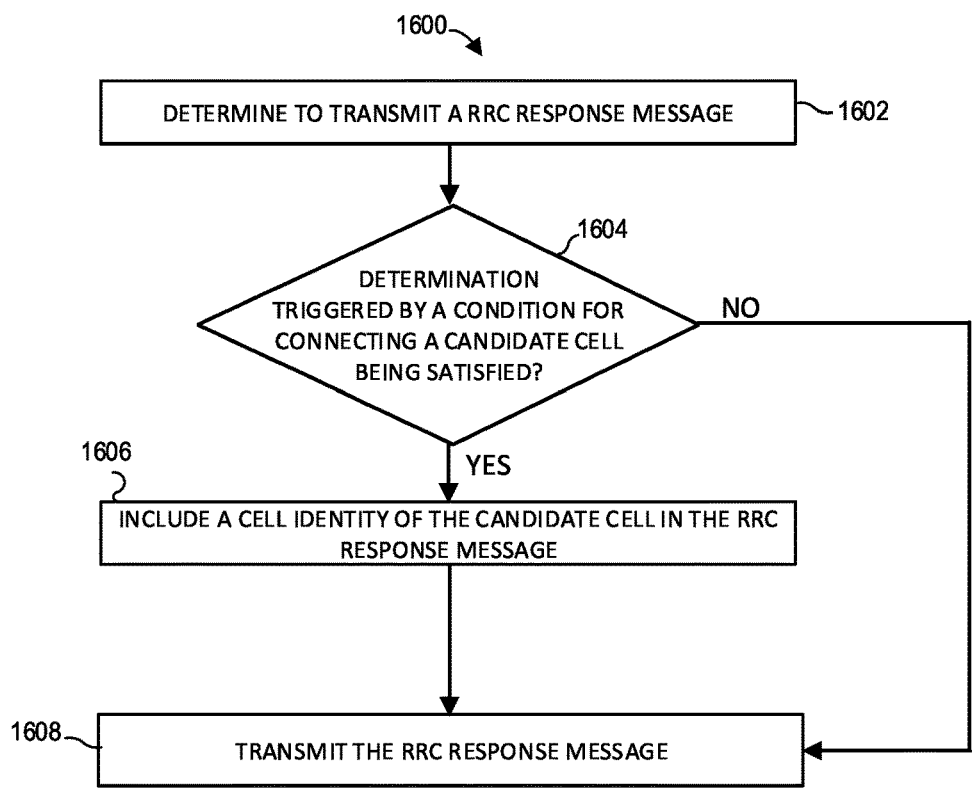
FIG. 16 is a flow diagram of an example method for transmitting an RRC response message and including the cell identity in the RRC response message to aid conditional configuration management at the candidate base station, which can be implemented in the UE of this disclosure.

Next, FIG. 16 illustrates a similar example method 1600 for a conditional mobility and informing a network node of a candidate cell ID, which can be implemented in a UE such as the UE 102 discussed above. The network node can be a M-CU, S-CU, C-CU, (C-)MN or a (C-)SN, for example.

The method 1600 begins at block 1602, where the UE determines to transmit an RRC response message. At block 1604, if the determination at block 1602 is triggered by a condition for connecting a candidate cell being satisfied, the flow proceeds to block 1606 where the UE includes a cell identity of the candidate cell in the RRC response message and then the UE transmits the RRC response message at block 1608 (event 336A of FIG. 3A; event 436A of FIG. 4A; event 536A of FIG. 5A for example). If, at block 1604, the determination at block 1602 is NOT triggered by a condition for connecting a candidate cell being satisfied, the flow proceeds directly to block 1608 where the UE transmits the RRC response message.

Figure 17:
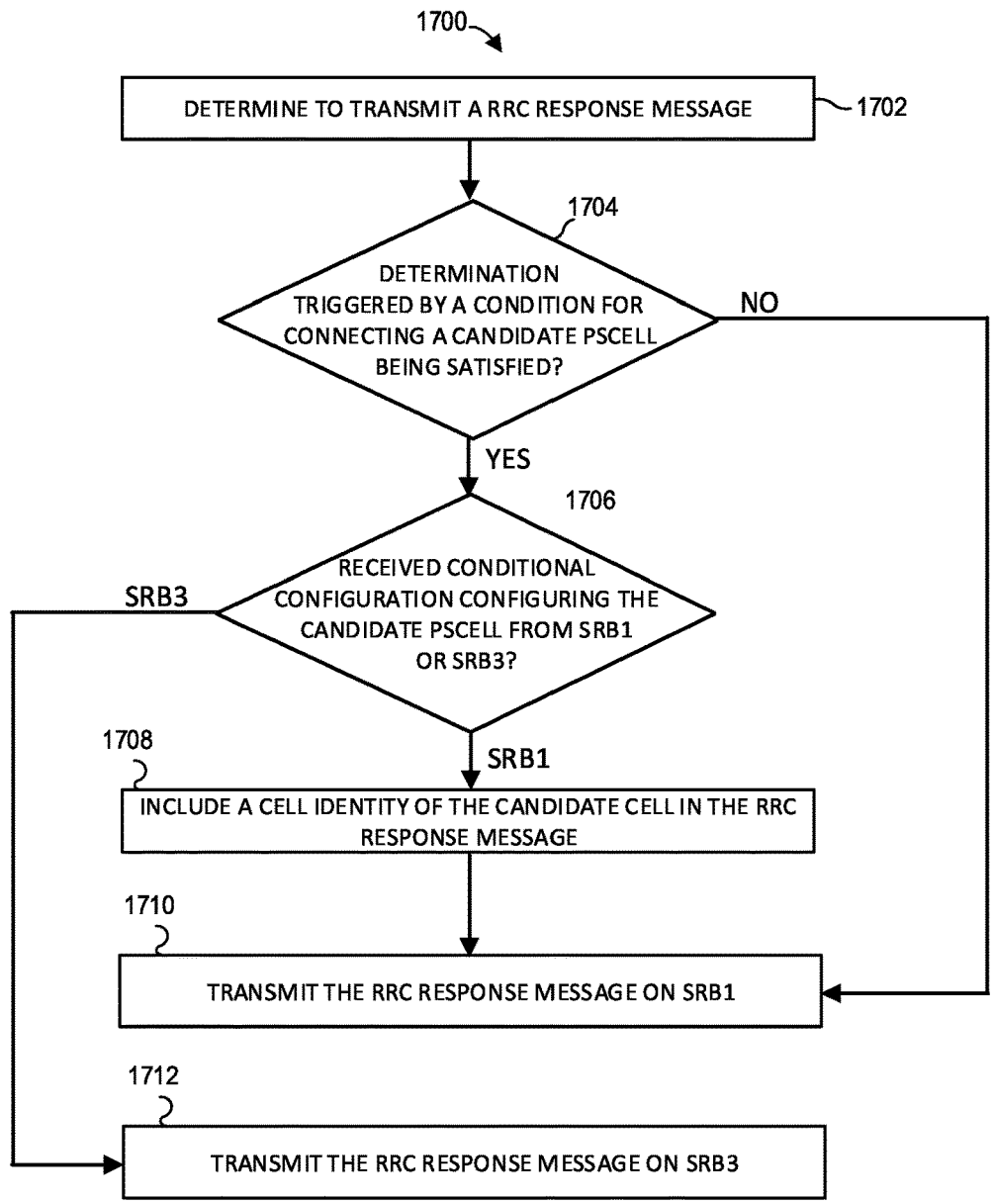
FIG. 17 is a flow diagram of an example method for transmitting an RRC response message to a candidate secondary base station and determining whether to include the cell identity in the RRC response message based on the SRBs, which can be implemented in the UE of this disclosure.

FIG. 17 illustrates another example method 1700 for a conditional mobility and informing a network node of a candidate cell ID, which can be implemented in a UE such as the UE 102 discussed above. The network node can be a M-CU, S-CU, C-CU, (C-)MN or a (C-)SN, for example.

The method 1700 begins at block 1702, where the UE determines to transmit an RRC response message. At block 1704, if the determination at block 1702 is triggered by a condition for connecting a candidate PSCell being satisfied, the flow proceeds to block 1706 where the UE determines whether the conditional configuration configuring the candidate PSCell is received from SRB1 or SRB3. If it is from SRB3, the flow proceeds to block 1712, where the UE transmits the RRC response message on SRB3. Otherwise, if it is from SRB1, the flow proceeds to block 1708 where the UE includes a cell identity of the candidate cell in the RRC response message and then the UE transmits the RRC message on SRB1 (event 336A of FIG. 3A; event 436A of FIG. 4A; event 536A of FIG. 5A for example). If at block 1704, the determination at block 1702 is NOT triggered by a condition for connecting a candidate PSCell being satisfied, the flow proceeds directly to block 1710 where the UE transmits the RRC response message on SRB1.

Figure 18:
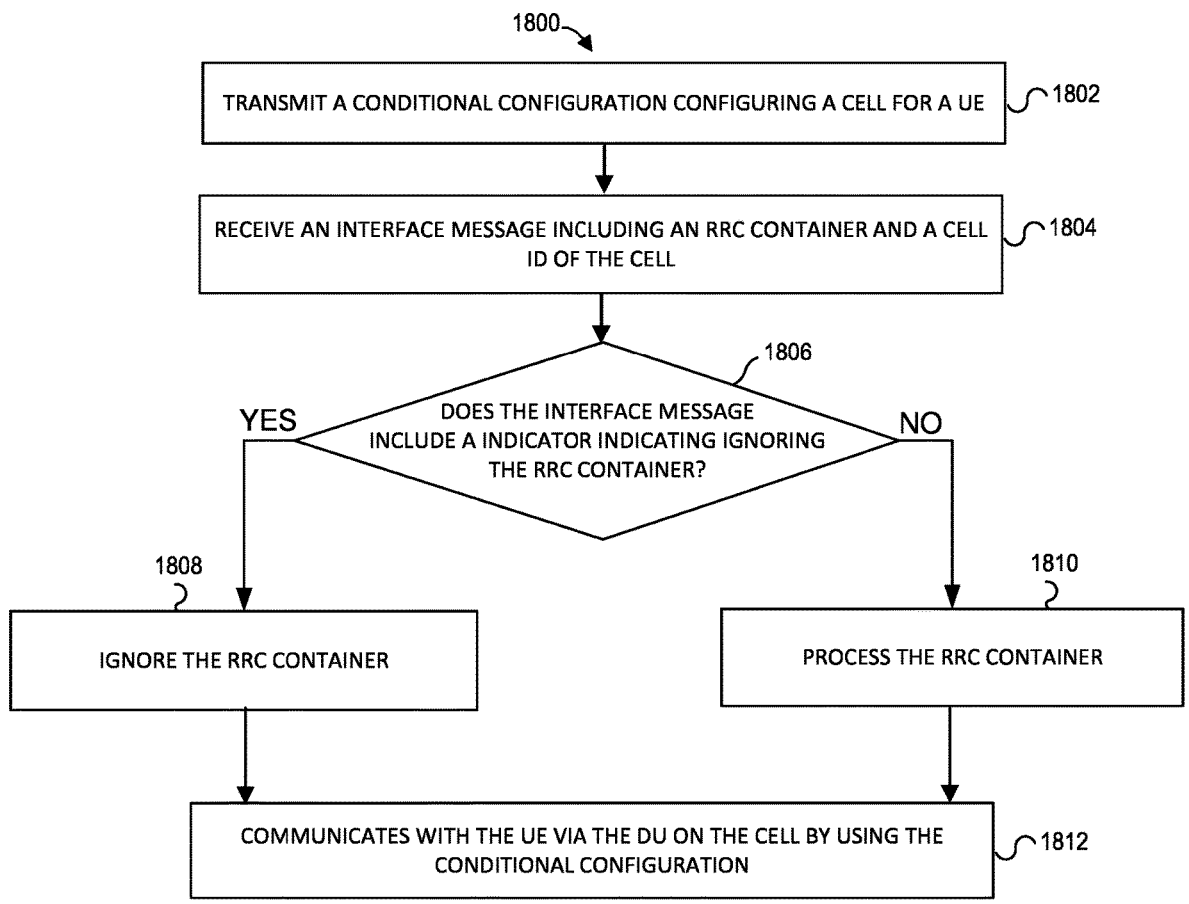
FIG. 18 is a flow diagram of an example method for processing a message for conditional mobility for a UE, which can be implemented in the base station CU of this disclosure.

FIG. 18 illustrates another example method 1800 for processing a message for a conditional mobility to a UE, which can be implemented in a first network node such as the (C-)SN (or the CU of the (C-)SN) of FIGS. 3B, 4B and 5B.

The method 1800 begins at block 1802, where the base station CU transmits a conditional configuration configuring a cell for a UE (event 320B of FIG. 3B). At block 1804, the base station CU receives an interface message including an RRC container and a cell ID of the cell for the UE from a DU (event 344B of FIG. 3B; event 444B of FIG. 4B; event 544B of FIG. 5B). At block 1806, the base station CU determines whether the interface message includes an indicator indicating ignoring the RRC container. If the interface message includes the indicator, the base station CU at block 1808 ignores the RRC container. If the interface message does not include the indicator, the base station CU at block 1810 processes the RRC container, i.e., decodes an RRC message in the RRC container and process content in the RRC message. The base station CU at block 1812 communicates with the UE via the DU on the cell using the conditional configuration (event 348B and 3B; event 448B of FIG. 4B; event 548B of FIG. 5B). In some implementations, the interface message can be a UL RRC Message Transfer message.

Figure 19:
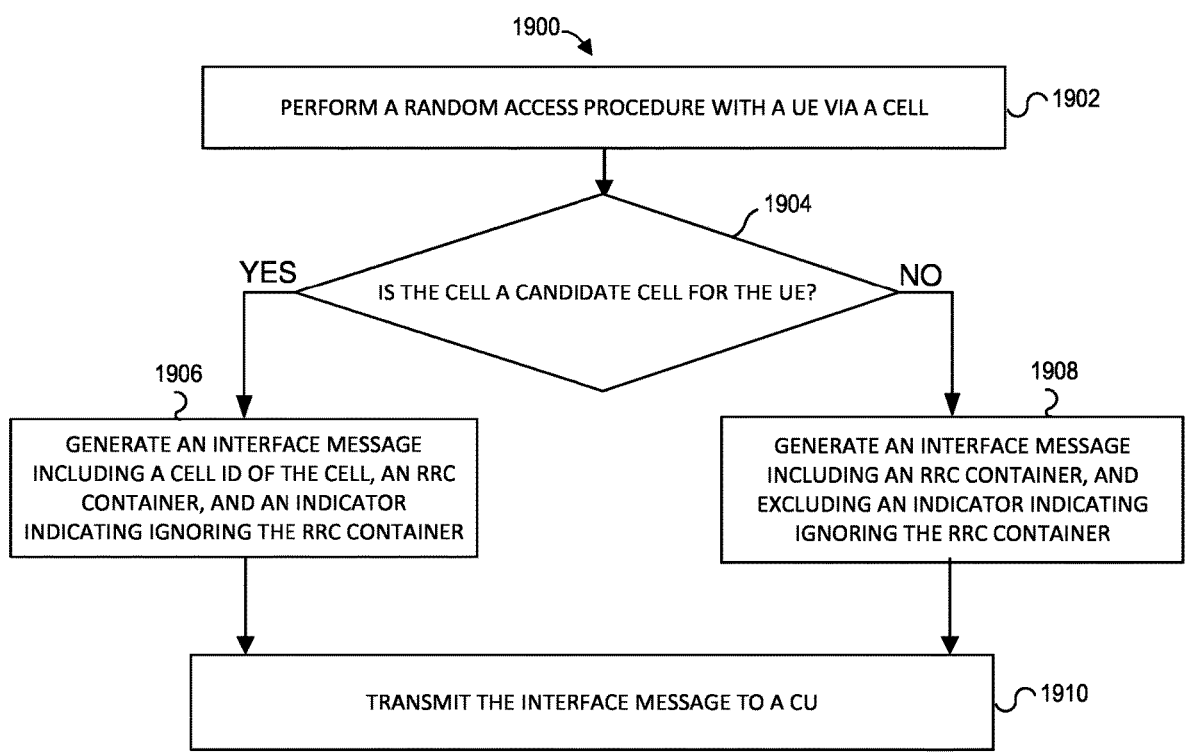
FIG. 19 is a flow diagram of an example method for transmitting a message for conditional mobility for a UE, which can be implemented in the base station DU of this disclosure.

FIG. 19 illustrates another example method 1900 for processing a message for a conditional mobility to a UE, which can be implemented in a first network node such as (C-) SN (or the DU of the (C-)SN)) of FIGS. 3B, 4B and 5B.

The method 1900 begins at block 1902, where the base station DU performs a random access procedure with a UE via a cell (event 342B of FIG. 3B; event 442B of FIG. 4B; event 542B of FIG. 5B). At block 1904, the base station DU determines whether the cell is a candidate cell for the UE. If the cell is a candidate cell, the base station DU at block 1906 generates an interface message including a cell ID of the cell, an RRC container IE and an indicator indicating ignoring the RRC container IE. If the cell is not a candidate cell, the base station DU at block 1908 generates an interface message including an RRC container IE and excluding an indicator indicating ignoring the RRC container IE. The base station DU at block 1910 transmits the interface message to a base station CU (event 344B and 3B; event 444B of FIG. 4B; event 544B of FIG. 5B). In some implementations, the interface message can be a UL RRC Message Transfer message.

In some implementation, the base station DU can store a candidate cell identity for the UE when performing the UE Context Setup procedure or a UE Context Modification procedure with the CU for preparing a conditional PSCell change. If the cell ID of the cell is the same as the candidate cell ID, the base station DU can determine the cell is the candidate cell. Otherwise, the base station DU can determine the cell is not the candidate cell. In other implementations, the base station DU can store a C-DU configuration for the UE. The C-DU configuration includes a UE identifier. If the base station DU receives the UE identifier from the UE on the cell, the base station DU can determine the cell is the candidate cell for the UE. Otherwise, the base station can determine the cell is not the candidate cell for the UE.

The following description may be applied to the description above.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for handling mobility between base stations through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

The following list of examples reflects additional embodiments explicitly contemplated by the present disclosure Example 1. A method in a central unit (CU) of a distributed base station for configuring a connection with a UE, the method comprising: providing, by processing hardware to the UE, a conditional configuration for a cell of a distributed unit (DU) of the base station; receiving, by the processing hardware, an identifier of the cell of the DU; determining, by the processing hardware, that the UE connects to the cell based on the identifier of the cell; and communicating with the UE in accordance with the conditional configuration for the cell.

Example 2. The method according to example 1, wherein the identifier of the cell is a cell global identifier (CGI) and further comprising: storing, by the processing hardware, a mapping of the CGI and corresponding physical cell identifiers (PCI); and determining, by the processing hardware, that the UE connects to the cell based on the received CGI and the stored mapping.

Example 3. The method according to any of the preceding examples, wherein the identifier of the cell of the DU is received from the DU.

Example 4. The method according to any of the preceding examples, wherein the identifier of the cell of the DU is received from the UE.

Example 5. The method according to any of the preceding examples, wherein the cell is a first cell, the conditional configuration is a first conditional configuration, and further comprising: providing, by processing hardware to the UE, a second conditional configuration for a second cell of the DU; and determining, by the processing hardware, that the UE selected the first conditional configuration based on the identifier of the first cell.

Example 6. The method according to any of the preceding examples, wherein receiving an identifier of the cell of the DU includes: receiving, by the processing hardware from the DU, a status message or an F1 Application Protocol (AP) message including the identifier of the cell of the DU.

Example 7. The method according to any of the preceding examples, wherein the identifier is a tunnel endpoint identifier (TEID).

Example 8. The method according to any of the preceding examples, wherein the cell is a first cell, the conditional configuration is a first conditional configuration, providing the first conditional configuration for the first cell of the DU includes providing a first TEID and further comprising: providing, by processing hardware to the UE, a second conditional configuration for a second cell of the DU including a second TEID; wherein: receiving the status message includes receiving, by the processing hardware, the status message with the first TEID, and determining that the UE connects to the first cell includes determining, by the processing hardware, that the UE connects to the first cell based on receiving the first TEID.

Example 9. The method according to any of the preceding examples, further comprising: storing, by the processing hardware, one or more associations between particular TEIDs and particular conditional configurations; and determining, by the processing hardware, the particular conditional configuration that the UE selected based on the one or more stored associations and the received TEID.

Example 10. The method according to any of the preceding examples, wherein: providing the first conditional configuration for the first cell of the DU further includes obtaining, by the processing hardware, a first TEID; and providing the second conditional configuration for the second cell of the DU further includes obtaining, by the processing hardware, a second TEID.

Example 11. A method in a central unit (CU) of a distributed base station for configuring a connection with a UE, the method comprising: receiving, by processing hardware, measurement results from the UE; determining, by the processing hardware based on the measurement results, that a condition has been satisfied for initiating a conditional configuration for a cell of a distributed unit (DU) of the base station; in response to determining that the condition has been satisfied, generating, by the processing hardware, the conditional configuration for the cell of the DU; providing, by the processing hardware to the UE, the conditional configuration for the cell of DU; and refraining from configuring additional conditional configuration for additional cells of the DU.

Example 12. The method according to example 11, further comprising: receiving, by the processing hardware, additional measurement results from the UE; determining, by the processing hardware based on the measurement results, that a condition has been satisfied for initiating an additional conditional configuration for an additional cell; determining, by the processing hardware, whether the additional cell belongs to the DU; and in response to determining that the additional cell belongs to the DU, refraining from generating the additional conditional configuration.

Example 13. The method according to either one of example 11 or example 12, further comprising: in response to determining that the additional cell does not belong to the DU, generating, by the processing hardware, the additional conditional configuration.

Example 14. A method in a distributed unit (DU) of a distributed base station for configuring a connection with a UE, the method comprising: receiving, by processing hardware from a central unit (CU) of the base station, a request message to obtain a conditional configuration for connecting to a cell of the DU; providing, by the processing hardware to the CU, the conditional configuration for the cell; performing, by the processing hardware, a random access procedure with a UE to connect the UE to the cell; and providing, by the processing hardware to the CU, an identifier of the cell of the DU to indicate to the CU that the UE is connected to the cell corresponding to the conditional configuration.

Example 15. The method according to example 14, wherein the identifier of the cell is a cell global identifier (CGI).

Example 16. The method according to either example 14 or example 15, wherein providing an identifier of the cell includes: providing, by the processing hardware to the CU, a CU to DU interface message including the identifier of the cell.

Example 17. The method according to any one of examples 14-16, wherein the CU to DU interface message is an F1 Application Protocol (AP) message.

Example 18. The method according to any one of examples 14-17, wherein the F1 AP message does not include a radio resource control (RRC) message.

Example 19. The method according to any one of examples 14-18, wherein the cell is a first cell, the conditional configuration is a first conditional configuration, and further comprising: providing, by processing hardware to the CU, a second conditional configuration for a second cell of the DU; and in response to performing the random access procedure with the UE to connect the UE to the first cell, providing, by the processing hardware to the CU, an identifier of the first cell of the DU to indicate to the CU that the UE is connected to the first cell corresponding to the first conditional configuration.

Example 20. The method according to any of the preceding examples, wherein the distributed base station is a node in a radio access network (RAN) that operates in multi-radio dual connectivity (MR-DC), and wherein the first and second conditional configurations are provided for a candidate primary secondary cell (C-PSCell) of an SN in a conditional PSCell addition or change (CPAC) configuration procedure.

Example 21. The method according to any of the preceding examples, wherein the distributed base station is a node in a radio access network (RAN) that operates in multi-radio dual connectivity (MR-DC), and wherein the first and second conditional configurations are provided for a candidate secondary node (C-SN) in a conditional SN addition or change (CSAC) configuration procedure.

Example 22. The method according to any of the preceding examples, wherein the distributed base station includes a first DU operating as a master DU in MR-DC and a second DU operating as a secondary DU in MR-DC.

Example 23. The method according to any of the preceding examples, wherein the distributed base station is a node in a radio access network (RAN) that operates in single connectivity (SC), and wherein the first and second conditional configurations are provided for a conditional handover (CHO) procedure.

Example 24. The method according to any of the preceding examples, wherein the distributed base station includes a first DU operating as a source DU in SC and a second DU operating as a candidate DU.

Example 25. A base station comprising processing hardware and configured to implement a method according to any of the preceding claims.

Example 26. A method in a UE for configuring a connection with a distributed unit (DU) of a base station, the method comprising: receiving, by processing hardware from a central unit (CU) of the base station, a first conditional configuration for a first cell of a DU of the base station; receiving, by the processing hardware from the CU, a second conditional configuration for a second cell of the DU; selecting, by the processing hardware, the second conditional configuration in response to determining that a condition for the second conditional configuration is satisfied; and connecting, by the processing hardware, to the second cell of the DU in response to the selection.

Example 27. The method according to example 26, further comprising: transmitting, by the processing hardware, a radio connection reconfiguration complete message including an identifier of the second cell of the DU.

Example 28. The method according to either one of example 26 or example 27, further comprising: transmitting, by the processing hardware, a radio connection reconfiguration complete message including a UE identifier for identifying the selected conditional configuration, wherein the radio connection reconfiguration complete message does not include an identifier of the second cell of the DU.

Example 29. The method according to any one of examples 26-28, wherein: receiving the first conditional configuration for the first cell of the DU further includes receiving, by the processing hardware, a first UE identifier; receiving the second conditional configuration for the second cell of the DU further includes receiving, by the processing hardware, a second UE identifier; wherein the processing hardware transmits the radio connection reconfiguration complete message with the second UE identifier.

Example 30. The method according to any one of examples 26-29, wherein transmitting the radio connection reconfiguration complete message includes transmitting, by the processing hardware, the radio connection reconfiguration complete message including a radio network temporary identifier (RNTI).

Example 31. The method according to any one of examples 25-30, further comprising: transmitting, by the processing hardware, a radio connection reconfiguration message, wherein the radio connection reconfiguration complete message does not include an identifier of the second cell of the DU.

Example 32. The method according to any one of examples 26-31, wherein the UE operates in multi-radio dual connectivity (MR-DC), and wherein the first and second conditional configurations are provided for a candidate primary secondary cell (C-PSCell) of an SN in a conditional PSCell addition or change (CPAC) configuration procedure.

Example 33. The method according to any one of examples 26-32, wherein the UE operates in multi-radio dual connectivity (MR-DC), and wherein the first and second conditional configurations are provided for a candidate secondary node (C-SN) in a conditional SN addition or change (CSAC) configuration procedure.

Example 34. The method according to any one of examples 26-33, wherein the UE operates in single connectivity (SC), and wherein the first and second conditional configurations are provided for a conditional handover (CHO) procedure.

Example 35. A user equipment (UE) comprising processing hardware and configured to implement a method according to any one of examples 26-34.

What is claimed is:

1. A method performed by a central unit, CU, of a distributed base station of a radio access network, RAN, for configuring a connection with a UE, the method comprising:
providing, by the CU to the UE,
a first conditional configuration to be applied, when a first condition is satisfied, for UE communications with the RAN via a first cell of a distributed unit, DU, of the distributed base station, and
a second conditional configuration to be applied, when a second condition is satisfied, for UE communications with the RAN via a second cell of the DU;
receiving, by the CU, an identifier of the first cell of the DU in a message from the DU;
determining, by the CU, that the UE is connected to the first cell based on the identifier of the first cell; and
communicating with the UE via the DU in accordance with the first conditional configuration for the first cell in response to determining that the UE is connected to the first cell based on the identifier of the first cell.

2. The method of claim 1, wherein the identifier of the first cell is a cell global identifier, CGI.

3. The method of claim 2, further comprising:
storing, by the CU, a mapping of CGIs and corresponding physical cell identifiers, PCI; and
determining, by the CU, that the UE is connected to the first cell based on the received CGI and the stored mapping.

4. The method of claim 1, wherein the receiving of the identifier of the first cell of the DU includes:
receiving, by the CU from the DU, a status message or an F1 Application Protocol, AP, message including the identifier of the first cell of the DU.

5. The method of claim 1, wherein the identifier is a tunnel endpoint identifier, TEID.

6. The method of claim 5, wherein the providing of the first conditional configuration for the first cell of the DU includes providing a first TEID,
the providing of the second conditional configuration for the second cell of the DU includes providing a second TEID, and
when the status message includes the first TEID, the CU determines that the UE is connected to the first cell.

7. The method of claim 6, further comprising:
storing, by the CU, one or more associations between one or more TEIDs and one or more conditional configurations, respectively; and
determining, by the CU, that the UE uses a particular one among the one or more conditional configurations based on the one or more stored associations and the received TEID, which is among the one or more TEIDs.

8. A method performed by a distributed unit, DU, of a distributed base station of a radio access network, RAN, for configuring a connection with a UE, the method comprising:
receiving, by the DU from a central unit, CU, of the distributed base station, a request message to obtain a first conditional configuration to be applied for connecting the UE to a first cell of the DU when a first condition is satisfied;
providing, by the DU to the CU, the first conditional configuration for the first cell;
providing, by the DU to the CU, a second conditional configuration to be applied for connecting the UE to a second cell of the DU when a second condition is satisfied;
performing, by the DU, a random access procedure with a UE to connect the UE to the first cell; and
providing, by the DU to the CU, an identifier of the first cell of the DU to indicate to the CU that the UE is connected to the first cell corresponding to the first conditional configuration, so that the CU communicates with the UE in accordance with the first conditional configuration for the first cell.

9. The method of claim 8, wherein the identifier of the first cell is a cell global identifier, CGI.

10. The method of claim 8, wherein the providing the identifier of the first cell includes:
providing, by the DU to the CU, a DU to CU interface message including the identifier of the first cell.

11. The method of claim 10, wherein the DU to CU interface message is an F1 Application Protocol, AP, message.

12. A central unit, CU, of a distributed base station comprising processing hardware and a radio access network, RAN, communication interface, and configured to:
provide, to a UE,
a first conditional configuration to be applied, when a first condition is satisfied, for UE communications with the RAN via a first cell of a distributed unit, DU, of the distributed base station, and
a second conditional configuration to be applied, when a second condition is satisfied for UE communications with the RAN via a second cell of the DU;
receive an identifier of the first cell of the DU in a message from the DU;
determine that the UE is connected to the first cell based on the identifier of the first cell; and
communicate with the UE via the DU in accordance with the first conditional configuration for the first cell in response to determining that the UE is connected to the first cell based on the identifier of the first cell.

13. The CU of claim 12, wherein the identifier of the first cell is a cell global identifier, CGI.

14. The CU of claim 12, wherein the CU is further configured to:
store a mapping of CGI and corresponding physical cell identifiers, PCI; and
determine that the UE is connected to the first cell based on the received CGI and the stored mapping.

15. The CU of claim 12, wherein to receive an identifier of the first cell of the DU, the CU is configured to:
receive, from the DU, a status message or an F1 Application Protocol, AP, message including the identifier of the first cell of the DU.

* * * * *